United States Patent
Asamura et al.

(10) Patent No.: US 9,185,431 B2
(45) Date of Patent: Nov. 10, 2015

(54) MOTION DETECTION DEVICE AND METHOD, VIDEO SIGNAL PROCESSING DEVICE AND METHOD AND VIDEO DISPLAY DEVICE

(75) Inventors: Masako Asamura, Tokyo (JP); Yoshiki Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 841 days.

(21) Appl. No.: 13/360,129

(22) Filed: Jan. 27, 2012

(65) Prior Publication Data

US 2012/0207218 A1 Aug. 16, 2012

(30) Foreign Application Priority Data

Feb. 16, 2011 (JP) .................................. 2011-30951

(51) Int. Cl.
| | | |
|---|---|---|
| H04N 7/32 | (2006.01) | |
| H04N 7/26 | (2006.01) | |
| H04N 19/86 | (2014.01) | |
| H04N 19/139 | (2014.01) | |
| H04N 19/117 | (2014.01) | |

(52) U.S. Cl.
CPC ............. *H04N 19/86* (2014.11); *H04N 19/117* (2014.11); *H04N 19/139* (2014.11)

(58) Field of Classification Search
CPC ....... G06F 19/18; G06F 19/24; H04N 19/117; H04N 19/139; H04N 19/86
See application file for complete search history.

(56) References Cited

U.S. PATENT DOCUMENTS

| | | | |
|---|---|---|---|
| 5,610,658 A | 3/1997 | Uchida et al. | |
| 6,400,762 B2 * | 6/2002 | Takeshima | 375/240.01 |
| 7,054,367 B2 * | 5/2006 | Oguz et al. | 375/240.23 |
| 2002/0008785 A1* | 1/2002 | Yamaguchi et al. | 348/699 |
| 2002/0141503 A1* | 10/2002 | Kobayashi et al. | 375/240.27 |
| 2006/0119740 A1* | 6/2006 | Nishi | 348/663 |
| 2010/0002774 A1* | 1/2010 | Kondo et al. | 375/240.16 |

FOREIGN PATENT DOCUMENTS

| | | | |
|---|---|---|---|
| JP | 6-337934 A | 12/1994 | |
| JP | 6-348848 A | 12/1994 | |
| JP | 7-264603 A | 10/1995 | |
| JP | 2596166 B2 | 1/1997 | |
| JP | 10-112845 A | 4/1998 | |
| JP | 2000-134632 A | 5/2000 | |
| JP | 2009-8738 A | 1/2009 | |
| JP | 2009-265688 A | 11/2009 | |
| JP | 2010-130155 A | 6/2010 | |

* cited by examiner

*Primary Examiner* — Dave Czekaj
*Assistant Examiner* — Md Haque
(74) *Attorney, Agent, or Firm* — Birch, Stewart, Kolasch & Birch, LLP

(57) ABSTRACT

In a motion detection device that detects motion from two frames of a video signal, a pattern matching detector determines pattern similarity between pixel blocks centered on a pixel of interest in the two frames to detect pattern motion. An edge detector detects edge presence and direction in a vicinity of the pixel of interest. A frame difference detector generates a smoothed frame difference signal for the pixel of interest. The smoothing is carried out within appropriate extents selected according to the detected pattern motion and edge direction. A motion information corrector generates motion information for the pixel of interest from the frame difference signal. Appropriate selection of the smoothing extent reduces motion detection mistakes. The motion information is useful in motion adaptive video signal processing.

13 Claims, 27 Drawing Sheets

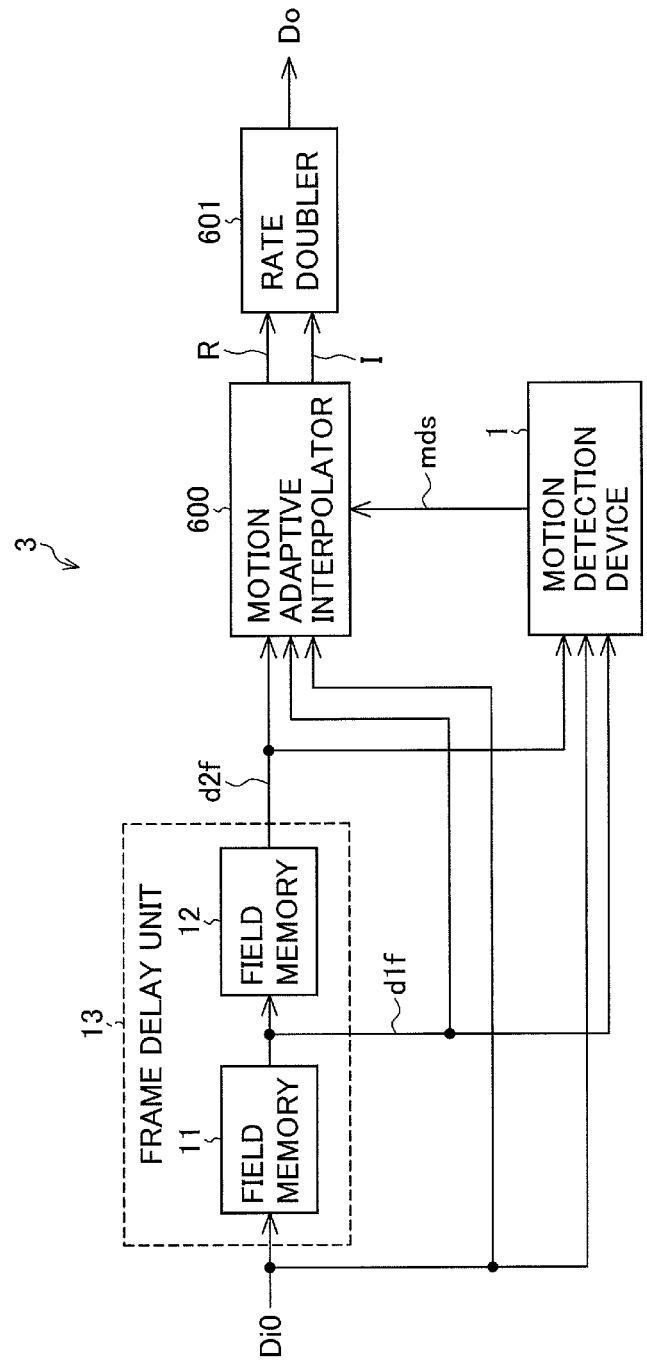

MOTION DETECTION DEVICE AND METHOD, VIDEO SIGNAL PROCESSING DEVICE AND METHOD AND VIDEO DISPLAY DEVICE

BACKGROUND OF THE INVENTION

1. Field of the Invention

The present invention relates to a motion detection device and method for use in motion adaptive signal processing of a video signal. The invention also relates to video signal processing devices and processing methods using the above motion detection device and method, and to a video display device using the processed video signal.

2. Description of the Related Art

Video signals are processed to enhance their displayed picture quality. The enhancement can be increased by detecting local image motion in the input video signal and carrying out motion adaptive signal processing. This is done by switching adaptively between processing suitable for still pictures and processing suitable for moving pictures, depending on whether the picture is locally still or moving. The two main types of motion adaptive signal processing carried out on television video signals are motion adaptive line interpolation and a type of three-dimensional (3D) noise reduction (NR) in which the strength of the noise reduction is controlled according to motion. Both of these types of signal processing are effective in improving picture quality.

Motion adaptive line interpolation is carried out when an interlaced television signal is enhanced by conversion to progressive scanning. In the interlaced-to-progressive scan conversion process (also called IP conversion), when the picture is detected to be still, inter-field interpolation is carried out by interleaving the lines of two temporally consecutive fields, thereby removing line flicker. When the picture is detected to be moving, intra-field interpolation is carried out by generating an interpolated signal from adjacent scanning lines in the same field.

In 3D noise reduction, each frame of the video signal is compared with the signal from one or more preceding frames and signal components that show no correlation across the plurality of frames are eliminated as noise. In infinite impulse response (IIR) noise reduction, the difference between the signal of the current frame and the noise-reduced signal of the preceding frame is multiplied by a coefficient and subtracted from the signal of the current frame. In finite impulse response (FIR) noise reduction, the noise is reduced by a filtering process in which the video signals of a plurality of temporally differing frames are multiplied by coefficients and added together. Both methods effectively remove noise components, which are uncorrelated on the time axis, from parts of the picture without motion. When motion is present, however, trails and ghosts appear and edges become blurred. To prevent these problems, a motion adaptive process is carried out by limiting the degree of noise reduction according to the amount of motion detected.

An effective way to obtain a motion signal indicating the amount of motion for motion adaptive signal processing purposes is to obtain a frame difference signal (frame-to-frame difference signal) by taking differences between the current input video signal (the current frame signal) and the signal of the immediately preceding frame (the preceding frame signal). When motion is detected only from frame-to-frame differences, however, detection errors occur. Part of a still picture may be incorrectly detected as moving, or part of a moving picture may be incorrectly detected as still. When motion adaptive signal processing is carried out, the accuracy of motion detection has a major impact on the quality of the displayed picture, so that motion detection processes that avoid such motion detection errors have been proposed.

In one of these proposed methods, motion is detected from the frame difference signal, after passing the frame difference signal through a vertical band-limiting low-pass filter (a vertical LPF), or using the spatial filter having a greater tap length vertically than horizontally, so as to carry out motion adaptive signal processing tailored to the spatial shape of the picture (see, for example, FIGS. 1 and 3 in Japanese Patent No. 2596166).

By applying a vertical filtering process to the frame difference signal or by detecting motion with a spatial filter having a longer vertical tap length as described above, the proposed method obtains a motion detection signal.

There is still the problem, however, that the frame-to-frame differences do not just reflect motion; they also include a noise component. Particularly at edges in the picture, the motion component and the noise component are intermixed, causing pixels that are actually still to be sometimes misrecognized as moving.

Moreover, when there is a slowly moving object or a moving object with a repetitive pattern of vertical or horizontal lines, calculation of differences between filtered frames can fail to detect motion, causing the picture to be incorrectly classified as still, because the calculated differences may be very small.

Thus in a picture that is even slightly unsteady or includes noise, frame differences due to the unsteadiness or noise affect motion detection by causing still pictures to be misrecognized as moving, and in a picture with slowly moving objects or moving objects with repetitive patterns, filtering of the frame difference signal can make it impossible to obtain values from which motion can be detected, so that the motion fails to be recognized.

These motion detection errors lead to degraded picture quality by causing flicker, blur, combing, and other problems. Combing is a problem in which the picture splits up in a comb-like pattern.

The present invention addresses the above problems with the object of providing a motion detection device and method that can perform highly accurate motion detection, without mistakenly detecting still parts as moving or moving parts as still, thereby reducing such forms of picture quality degradation as flicker, blur, and combing in the results of motion adaptive signal processing, and with the further objects of providing a video signal processing device, a video signal processing method, and a video display device using the above motion detection device and method.

SUMMARY OF THE INVENTION

The invention provides a motion detection device for detecting motion in a video signal including temporally differing first and second frames. The motion detection device includes a pattern matching detector, an edge detector, a frame difference detector, and a motion information corrector.

The pattern matching detector calculates pattern similarity between a pixel block in the first frame and a pixel block in the second frame and generates a moving block coefficient indicating block movement based on the similarity. The pixel block in the first frame is centered on a pixel of interest at which motion is to be detected. The pixel block in the second frame is positioned at a pixel position corresponding to the pixel of interest.

The edge detector detects edges in a vicinity of the pixel of interest from the video signal in the first and second frames, and generates at least one edge decision coefficient indicating a degree of edge presence.

The frame difference detector uses the moving block coefficient and the edge decision coefficient to select an extent of horizontally aligned pixels including the pixel of interest or an extent of vertically aligned pixels including the pixel of interest, performs a smoothing process within the selected extent, and performs a frame-to-frame difference calculation before or after the smoothing process, thereby generating a frame difference signal for the pixel of interest.

The motion information corrector generates motion information for the pixel of interest from the frame difference signal generated by the frame difference detector.

The invention also provides a video signal processing device for performing motion adaptive scanning line interpolation based on a motion detection signal output by the above-mentioned motion detection device to convert an interlaced scanning video signal to a progressive video signal. The video signal processing device includes a motion adaptive interpolator and a rate doubler. The motion adaptive interpolator receives the motion detection signal output from the motion detection device and generates a scanning line interpolation signal responsive to the result of motion detection for each pixel. The rate doubler uses the scanning line interpolation signal generated by the motion adaptive interpolator to generate the progressive video signal.

The invention provides another video signal processing device for performing three dimensional noise reduction based on the motion detection signal output by the above-mentioned motion detection device to eliminate noise components lacking frame-to-frame correlation from the video signal. This video signal processing device includes a motion adaptive noise reducer that uses the motion detection signal to control the noise reduction effect.

The invention also provides a video display device including either of the above-mentioned video signal processing devices, a display unit for displaying a video picture, and a display processor for causing the display unit to display the video picture responsive to a video signal output by the video signal processing device.

The motion detection device according to the invention can detect motion with high accuracy, so that still parts of the picture are not incorrectly detected as moving and moving parts are not incorrectly detected as still.

By using this motion detection result, the video signal processing devices according to the invention can perform motion adaptive processing without picture degradation due to flicker, blur, or combing.

By displaying a video signal processed by either of the above-mentioned video signal processing devices, the video display device according to the invention can display a video picture of high quality.

BRIEF DESCRIPTION OF THE DRAWINGS

In the attached drawings:

FIG. 21 is a block diagram showing an exemplary configuration of a motion adaptive processor used as the video signal processing device in a third embodiment of the invention;

DETAILED DESCRIPTION OF THE INVENTION

The motion detection device according to the invention detects motion in a video signal from temporally differing first and second frames of the video signal. The video signal processing devices according to the invention use the above-mentioned motion detection device to process a video signal. The display device according to the invention displays a video signal processed by the above-mentioned video signal processing device.

The various units described in this application may be implemented as electrical circuits (hardware), or as software, in the form of a programmed computing device.

First Embodiment

Figure 1:
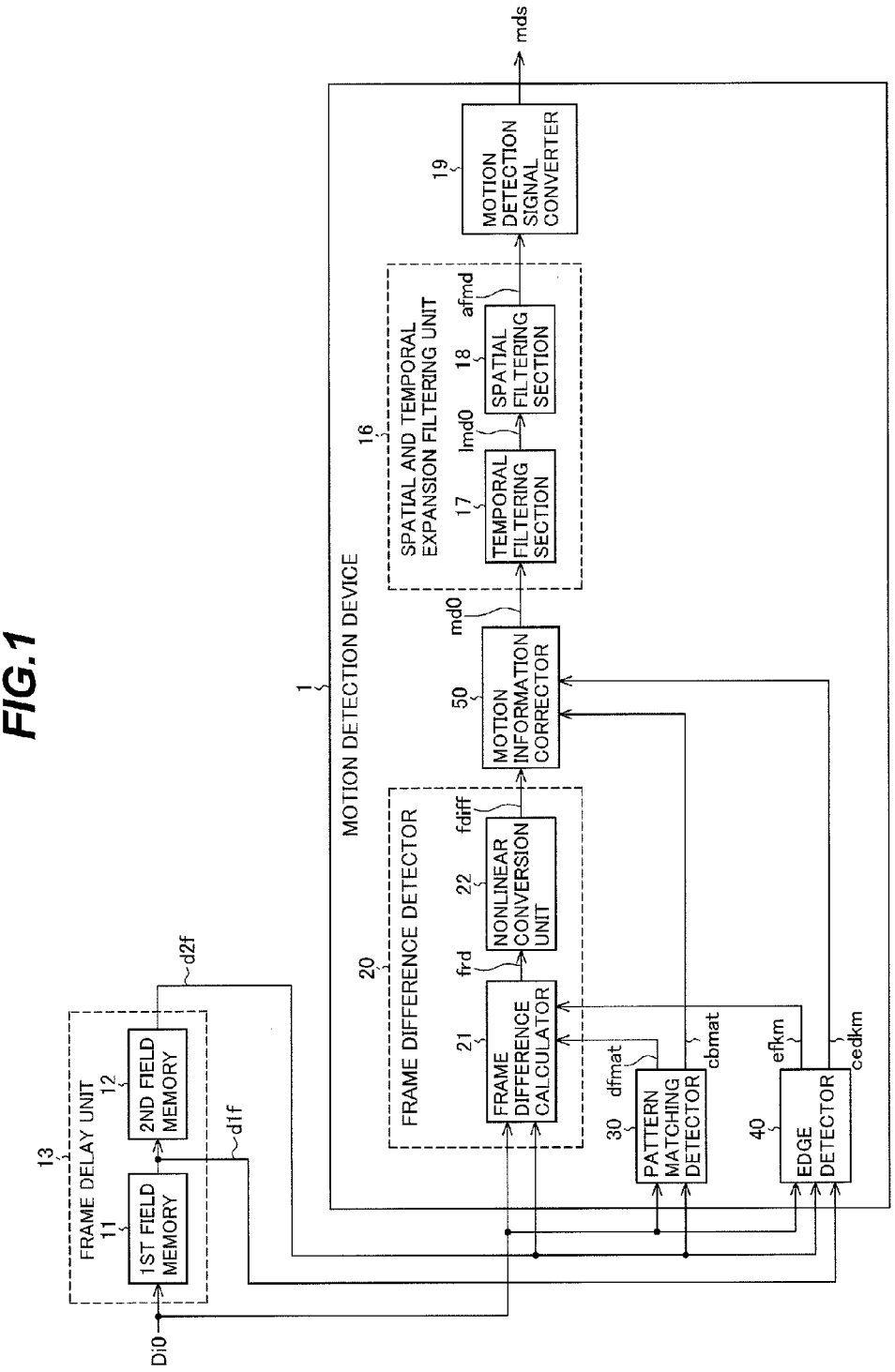
FIG. 1 is a block diagram showing an exemplary configuration of a video signal processing device in a first embodiment of the invention.

FIG. 1 is a block diagram showing the configuration of a video signal processing device of a first embodiment of the invention (device for implementing the video signal processing method of the first embodiment of the invention). The device is configured to detect image motion pixel by pixel from the video signals of a first frame and a temporally differing second frame: for example, from the video signal of the current frame and the video signal the preceding frame.

The video signal processing device of the first embodiment in FIG. 1 sequentially receives an interlaced input video signal Di0 indicating the values of the individual pixels constituting an input video picture. As shown in FIG. 1, the video signal processing device includes a frame delay unit 13 and a motion detection device 1.

The frame delay unit 13 includes first and second field memories 11, 12 that output a signal d1f delayed by one field (a one-field delayed signal) and a signal d2f delayed by one frame (a one-frame delayed signal), respectively. The first and second field memories 11, 12 function as field delay units, outputting the one-field delayed signal d1f and one-frame delayed signal d2f by delaying the input video signal by one field each. Fields are delimited by successive vertical synchronizing signals in the interlaced signal.

The input video signal Di0, the one-field delayed signal d1f, and the one-frame delayed signal d2f span two temporally differing frames. In the detailed examples that follow, the input video signal Di0 may be referred to as the current frame signal or the input frame signal, the one-frame delayed signal d2f as the signal of the preceding frame, and the one-field delayed signal d1f as the signal of the preceding field.

The motion detection device 1 uses the input video signal (current frame signal) Di0, the one-frame delayed signal (the signal of the preceding frame) d2f, and the one-field delayed signal (the signal of the preceding field) d1f to output a motion detection signal mds that indicates degrees of motion based on frame-to-frame differences.

The motion detection device 1 includes a spatial and temporal expansion filtering unit 16, a motion detection signal converter 19, a frame difference detector 20, pattern matching detector 30, an edge detector 40, and a motion information corrector 50.

The pattern matching detector 30 performs a pattern matching operation in which it calculates a pattern similarity between two pixel blocks, one in the current frame signal Di0, the other in the one-frame delayed signal d2f. This operation generates first and second moving block coefficients dfmat, cbmat indicative of pixel block motion.

The edge detector 40 receives the current frame signal Di0, the one-frame delayed signal d2f, and the one-field delayed signal d1f, detects edges in the image in the vicinity of a pixel of interest in the video signal, and outputs first and second edge decision coefficients efkm, cedkm.

The frame difference detector 20 receives the current frame signal Di0 and the one-frame delayed signal d2f, selects a smoothing extent responsive to the first moving block coefficient dfmat from the pattern matching detector 30 and the first edge decision coefficients efkm from the edge detector 40, performs a smoothing process within the selected extent, detects a smoothed frame-to-frame difference, and outputs a frame difference signal fdiff representing the difference between the frames at the same pixel.

The motion information corrector 50 modifies the frame difference signal fdiff from the frame difference detector 20, responsive to the second moving block coefficients cbmat from the pattern matching detector 30 and the second edge decision coefficients cedkm from the edge detector 40, to obtain motion information md0.

The spatial and temporal expansion filtering unit 16 performs processes such as spatial and temporal filtering and isolated point removal on the motion information signal md0, modifies the motion information in the spatial and temporal directions, and outputs a motion signal afmd. The motion detection signal converter 19 converts the motion signal afmd from the spatial and temporal expansion filtering unit 16 to the motion detection signal mds indicating the degree of motion in the video signal.

The frame difference detector 20 includes a frame difference calculator 21 and a nonlinear conversion unit 22. The frame difference calculator 21 switches the smoothing extent responsive to the moving block coefficient dfmat from the pattern matching detector 30 and edge decision coefficients efkm from the edge detector 40 and calculates a frame difference frd between the current frame signal and the one-frame delayed signal. The nonlinear conversion unit 22 performs a nonlinear conversion on the value of the frame difference to obtain a difference signal representing motion and outputs it as the frame difference signal fdiff.

The spatial and temporal expansion filtering unit 16 includes a temporal filtering section 17, which modifies the motion information signal md0 by performing a filtering process that stretches the motion information in the temporal direction and outputs the modified signal fmd0, and a spatial filtering section 18, which modifies this signal by performing processes such as a filtering process that stretches the motion information in the horizontal or vertical spatial direction and a process to remove isolated points. The modified signal from the spatial filtering section 18 is output as the motion signal afmd.

In the description below, the first embodiment detects motion in the video signal between the current frame signal and the one-frame delayed signal.

As noted above, the first and second field memories 11, 12 constituting the frame delay unit 13 are memory devices that output the video signal with a one-field delay. The first field memory 11 delays the input video signal Di0 by one field and outputs the one-field delayed signal d1$f$. The second field memory 12 delays the one-field delayed signal d1$f$ from the first field memory 11 by one field and outputs a two-field delayed signal (the one-frame delayed signal) d2$f$.

Since the input video signal Di0 is interlaced, although the pixels of the one-frame delayed signal d2$f$ output from the frame delay unit 13 are disposed in the same positions as the pixels in the input video signal Di0, the pixels in the one-field delayed signal d1$f$ output from the first field memory 11 are half a line above or below the pixels in the input video signal Di0. The input video signal Di0 and the one-frame delayed signal d2$f$ are thus mutually in phase while the input video signal Di0 and the one-field delayed signal d1$f$ are mutually out of phase.

The input video signal Di0 is input to the motion detection device 1 as the current frame signal, while the one-frame delayed signal d2$f$ and one-field delayed signal d1$f$ from the frame delay unit 13 are input as the signals of the preceding frame and preceding field. The motion detection device 1 detects motion of the video signal for each pixel between the current frame signal Di0 and the signal of the preceding frame, and outputs the motion detection signal mds indicating the degree of motion from the detection results.

The motion detection device 1 switches the extent of the smoothing processing performed in the determination of the difference between frames responsive to pattern motion and edge direction in the image, using the moving block coefficients obtained from pattern matching of pixel blocks in the current frame signal Di0 and the one-frame delayed signal d2$f$ and the edge decision coefficients obtained by edge detection, thereby obtaining a frame difference signal that has been smoothed within an appropriate extent. The motion detection device 1 then further modifies the frame difference signal responsive to pattern motion and edge directions, and generates motion information modified so as to facilitate motion detection at edges and in patterns where moving areas tend to be misrecognized as still. These modifications prevent motion from being mistakenly detected or missed and enable the motion detection device 1 to output a motion detection signal mds indicating the degree of motion with high accuracy.

The current frame signal Di0 and one-frame delayed signal d2$f$ are input to the pattern matching detector 30 in the motion detection device 1.

The pattern matching detector 30 performs a pattern matching operation that calculates the pattern similarity between two pixel blocks, one in the current frame signal Di0, the other in the one-frame delayed signal d2$f$ input as the signal of the preceding frame, and outputs the moving block coefficients dfmat, cbmat that indicate pixel block motion. The output moving block coefficients dfmat, cbmat are obtained from the results of pattern matching performed for a pixel block centered on the pixel of interest at which motion is being detected; a large similarity value indicates different patterns in the pixel blocks, indicating that the image in the pixel blocks is moving, and could be described as indicating motion of the block pattern (referred to as a moving pattern below) in a pixel block.

The pattern matching detector 30 is configured as shown, for example, in FIGS. 2A to 2E. The illustrated pattern matching detector 30 performs pattern matching between pixel blocks in the one-frame delayed signal d2$f$ and the current frame signal Di0, and generates moving block coefficients dfmat, cbmat indicating motion of the pixel block centered on the pixel of interest P0 in the current frame signal Di0.

As shown, the pattern matching detector 30 includes a block matching operation unit 301, a matching vertical high frequency component generator 308, a matching horizontal high frequency component generator 309, and first, second, and third moving block coefficient conversion units 311, 312, 313. As shown in FIG. 2B, the matching vertical high frequency component generator 308 includes a horizontal block matching operation unit 303, and a matching vertical high frequency component extractor 304. As shown in FIG. 2C, the matching horizontal high frequency component generator 309 includes a vertical block matching operation unit 306, a matching horizontal high frequency component extractor 307.

Figure 3:
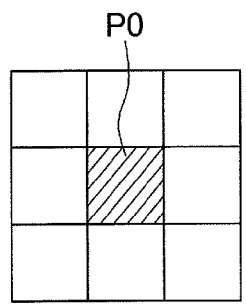
FIG. 3 shows pixels constituting an exemplary pixel block used in pattern matching in the pattern matching detector in the first embodiment.

The range over which pattern matching is carried out by the pattern matching detector 30 is, for example, the block of nine pixels shown in FIG. 3, extending three lines vertically and three pixels horizontally (three rows and three columns), centered on the pixel of interest P0 in the current frame Di0. This pixel block will be denoted b0 and will also be referred to as the pixel block of interest. Pattern matching is carried out on this block b0 and a pixel block b2 (the reference pixel block) centered on a pixel Pf2 (the central reference pixel) in the same frame position in the one-frame delayed signal d2$f$.

Figure 4A:
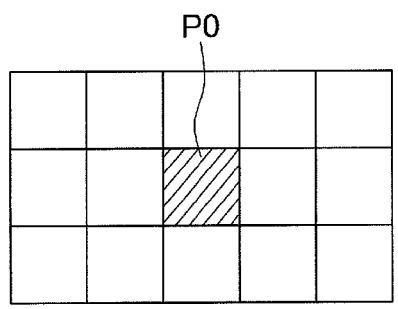
FIGS. 4A and 4B show other examples of pixel blocks that may be used in pattern matching in the pattern matching detector in the first embodiment.
Figure 4B:
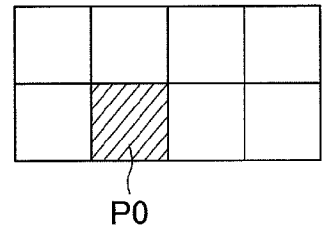

The pattern matching range is not limited to a block of nine pixels as shown in FIG. 3. In general, the block may include V lines vertically and H pixels horizontally (V≥2, H≥2). For example it may be a fifteen-pixel block including three lines vertically and five pixels horizontally (three rows, five columns) as shown in FIG. 4A, or an eight-pixel block including two lines vertically and four pixels horizontally (two rows, four columns) as shown in FIG. 4B. The more pixels are included in the pixel block, the broader the range over which similarity can be calculated becomes, so that more stable values are obtained.

The more pixels there are and the broader the range on which the calculation is performed becomes, however, the broader becomes the range affected by pixel block motion.

Figure 5:
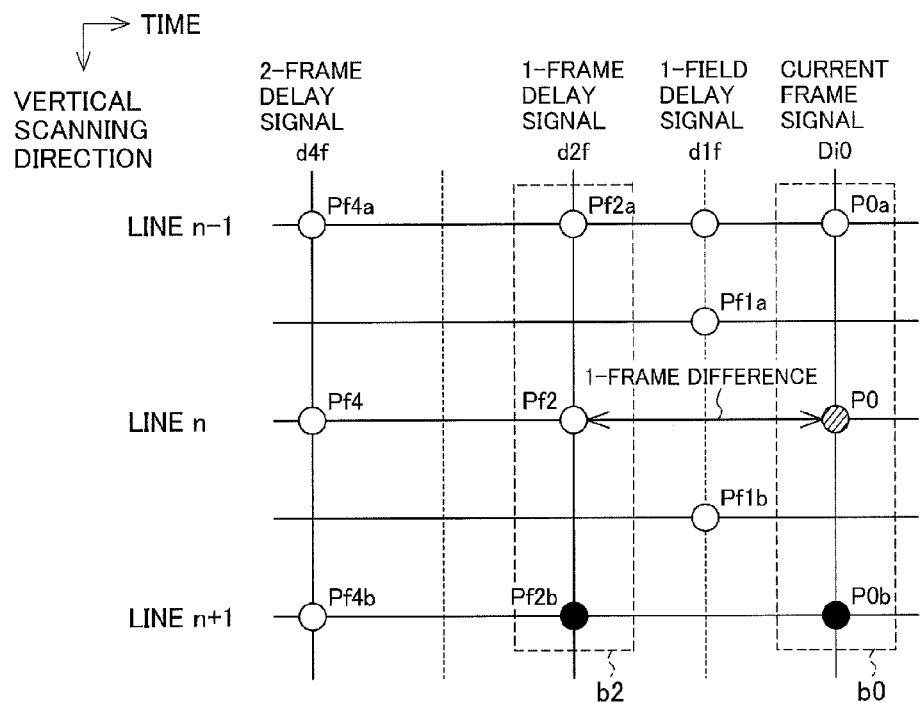
FIG. 5 illustrates positional and temporal relationships and relationships between pixels in the current frame signal and the delayed signals when the video signal processing device in the first embodiment receives an interlaced input signal.

FIG. 5 illustrates the temporal relation between the signals in the same line in the current frame signal Di0 and the one-frame delayed signal d2$f$ and positional relations in the vertical scanning direction (the direction of higher and lower lines on the display screen) in each frame. Also shown are the positional relationships of the pixel of interest P0 and pixel block of interest b0 on which pattern matching is carried out in the pattern matching detector 30 and the corresponding central reference pixel Pf2 and reference block b2 in the frame in the one-frame delayed signal d2$f$.

In FIG. 5, earlier frames are shown closer to the left edge, and pixels in each frame displayed in higher positions on the screen are shown closer to the top. Whereas the current frame signal Di0 is the signal of the current frame (the latest frame), the one-field delayed signal d1$f$ is the signal of the frame one field before, the one-frame delayed signal d2$f$ is the signal of the frame one frame before, and the two-frame delayed signal d4$f$ is the signal of the frame two frames before. The frame one frame before the current frame may be referred to as the immediately preceding frame. The frames are denoted by the same reference characters as the corresponding signals (Di0, d2$f$, d1$f$).

Figure 6A:
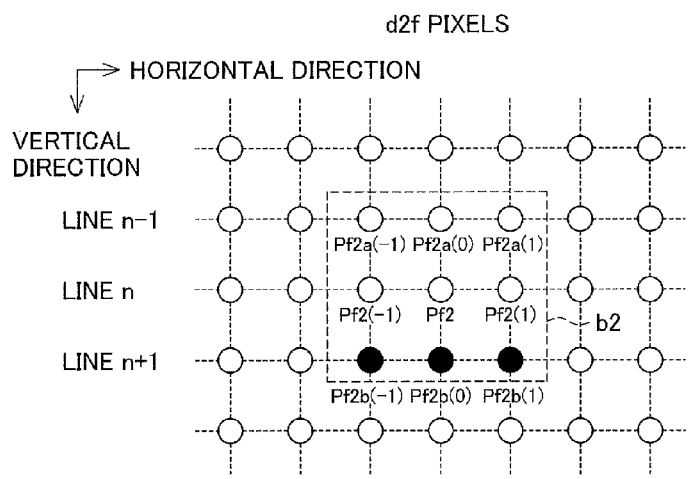
FIGS. 6A and 6B illustrate positional relationships between pixels in the current frame signal and the one-frame delayed signal in the first embodiment.
Figure 6B:
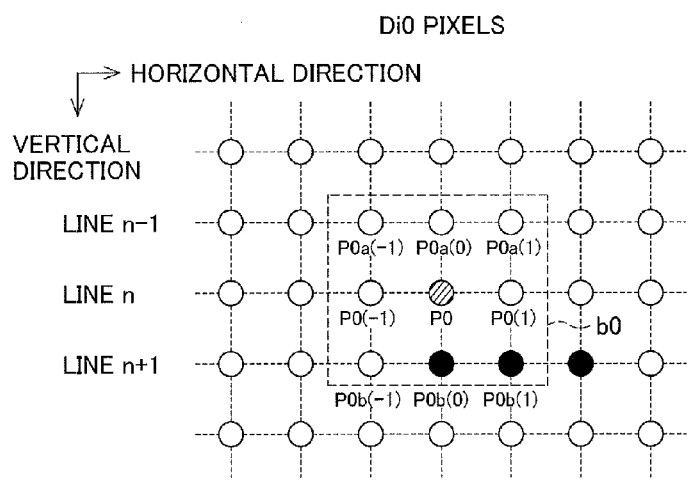

FIGS. 6A and 6B illustrate vertical and horizontal positional relationships between pixels in the current frame signal Di0 and the one-frame delayed signal d2$f$. These drawings show relationships between the pixel of interest P0 and the pixel block of interest b0 in the current frame Di0 and the corresponding central reference pixel Pf2 and the corresponding reference block b2 in the one-frame delayed signal d2$f$ (immediately preceding frame d2$f$).

Figure 2A:
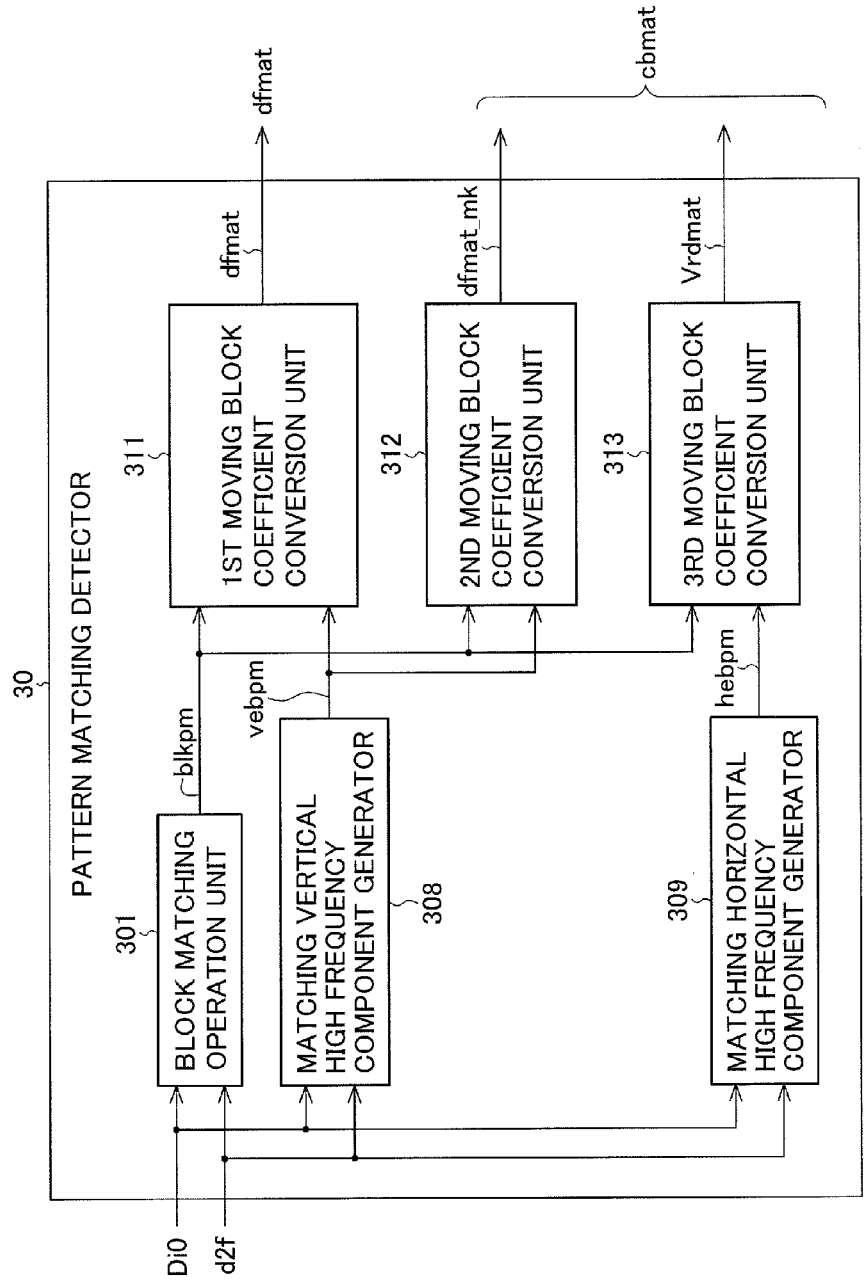
FIG. 2A is a block diagram showing an exemplary configuration of the pattern matching detector used in the video signal processing device in the first embodiment.
Figure 2B:
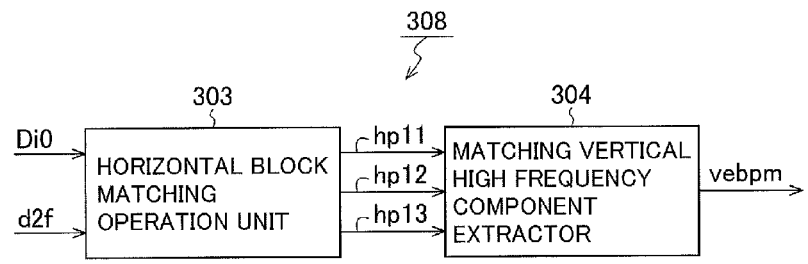
FIG. 2B is a block diagram showing an exemplary configuration of the matching vertical high frequency component generator used in the pattern matching detector in FIG. 2A.
Figure 2C:
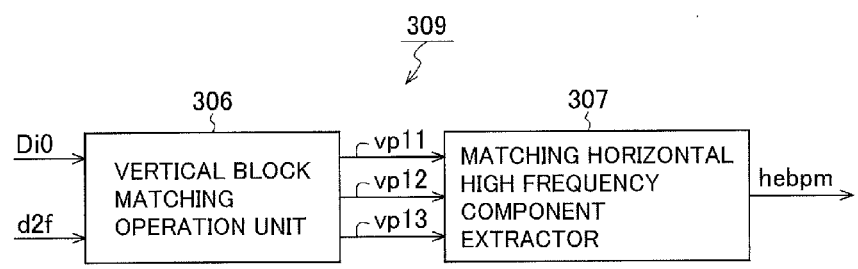
FIG. 2C is a block diagram showing an exemplary configuration of the matching horizontal high frequency component generator used in the pattern matching detector in FIG. 2A.

The pattern matching detector 30 in FIG. 2A detects moving block coefficients indicating motion in the pixel block b0 centered on the pixel of interest P0 by pattern matching of pixel blocks between the current frame signal Di0 and the signal d2$f$ of the frame one frame before. In FIGS. 5, 6A, and 6B, the result of pattern matching between the pixel block of interest b0 in the current frame Di0 and the reference pixel block b2 in the corresponding position in the immediately preceding frame d2$f$ is obtained as a pattern similarity.

In FIGS. 2A to 2C, the current frame signal Di0 and the one-frame delayed signal d2$f$ input to the pattern matching detector 30 are input to the block matching operation unit 301, horizontal block matching operation unit 303, and vertical block matching operation unit 306.

The block matching operation unit 301 extracts the pixel block of interest b0 (see FIGS. 5 and 6B) centered on the pixel of interest P0 in the current frame Di0 and the reference pixel block b2 (see FIGS. 5 and 6A) centered on the pixel Pf2 in the position corresponding to the pixel P0 in the immediately preceding frame d2$f$, performs pattern matching between the pixel blocks, and obtains a block matching quantity blkpm indicating the pattern similarity.

The pattern similarity between pixel blocks determined by pattern matching is obtained by calculating all absolute differences in pixel value between pixels in corresponding positions in the pixel blocks and obtaining a value based on the simple sum or a weighted sum of the absolute values (also referred to as a sum of absolute differences) or by calculating a simple mean or weighted mean of the absolute differences.

More specifically, the block matching operation unit 301 calculates the absolute difference in pixel value between the pixels in the pixel block of interest b0 in the current frame Di0 and the pixels in the corresponding positions in the reference pixel block b2 in the immediately preceding frame d2$f$, as given by equations (1) to (9) below:

$$d1 = |P0a(-1) - Pf2a(-1)| \tag{1}$$

$$d2 = |P0a(0) - Pf2a(0)| \tag{2}$$

$$d3 = |P0a(1) - Pf2a(1)| \tag{3}$$

$$d4 = |P0(-1) - Pf2(-1)| \tag{4}$$

$$d5 = |P0 - Pf2| \tag{5}$$

$$d6 = |P0(1) - Pf2(1)| \tag{6}$$

$$d7 = |P0b(-1) - Pf2b(-1)| \tag{7}$$

$$d8 = |P0b(0) - Pf2b(0)| \tag{8}$$

$$d9 = |P0b(1) - Pf2b(1)| \tag{9}$$

Next, a sum of these absolute values of differences d1 to d9 is obtained and averaged as in equation (10) below. The resulting mean absolute difference of the block is output as a block matching quantity blkpm.

$$blkpm = (d1+d2+d3+d4+d5+d6+d7+d8+d9)/9 \tag{10}$$

In equation (10) above, to obtain the mean value of the nine pixels, the sum is divided by nine. The sum may be divided by a power of two such as eight ($2^3$) or four ($2^2$), however, for reasons of hardware configuration or ease of computation. The essential point is to obtain some sort of indicator reflecting the mean value.

The block matching quantity blkpm calculated by equation (10) approaches '0' as the similarity between the pixel block of interest b0 and the reference pixel block b2 increases, indicating that the image is still or nearly still with only a very small amount of motion. As the similarity decreases, the block matching quantity blkpm increases, indicating that the pixel blocks have different patterns, which means that the patterns are moving.

The block matching quantity blkpm calculated by the block matching operation unit 301 is output to the first, second, and third moving block coefficient conversion units 311, 312, 313 in FIG. 2A as an index of pattern similarity between the pixel block of interest b0 and the reference pixel block b2, or of pattern motion between the two pixel blocks.

Instead of a simple mean, a weighted mean of the absolute differences d1 to d9 may be obtained. For example, the weighted mean may be obtained by taking a weighted sum, where the weight of the differences increases as the pixel approaches the central pixel P0 of the pixel block, and decreases with increasing distance from the central pixel. For example, a block matching quantity blkpm based on a sum of absolute differences may be calculated as in equation (11) below, instead of equation (10).

$$blkpm = d1/8 + d2/8 + d3/8 + d4/8 + d5/2 + d6/8 + d7/8 + d8/8 + d9/8$$

The pixel block used in pattern matching need not be a nine-pixel block as shown in FIG. 3; it may be a fifteen-pixel block as shown in FIG. 4A or an eight-pixel block as shown in FIG. 4B. If the fifteen-pixel block includes three lines vertically and five pixels horizontally as shown in FIG. 4A, the block matching operation unit 301 extracts a pixel block of interest b0 and a reference pixel block b2, takes a sum of the absolute differences for the fifteen pixels, and calculates the mean value as the block matching quantity blkpm.

Next, the horizontal block matching operation unit 303 carries out pattern matching on horizontally elongated sub-block areas constituting parts of the pixel blocks in the respective frames, based on the current frame signal Di0 and the one-frame delayed signal d2$f$. For example, pattern matching is carried out on sub-blocks of three horizontally aligned pixels in FIG. 3, and horizontal block matching quantities hp11, hp12, hp13 for three lines (three rows) are sent to the matching vertical high frequency component extractor 304.

Like the block matching operation unit 301, the horizontal block matching operation unit 303 first obtains the absolute differences d1 to d9 in pixel value between the pixels in the pixel block of interest b0 in the current frame Di0 and the pixels in the reference pixel block b2 in the immediately preceding frame d2$f$, as given by equations (1) to (9), and then obtains the sum of the absolute differences for each of the sub-blocks formed by dividing the pixel block b0 in the vertical direction: for example, in three sub-blocks each having a size of one line (one row) in the vertical direction. Since the pixel block size measures three lines vertically and three pixels horizontally (three rows and three columns), sums of absolute differences are obtained here for one-line-by-three-pixel (one-row-by-three-column) blocks, that is, for sub-blocks including three horizontally aligned pixels. The horizontal block matching quantities hp11, hp12, hp13 are given by equations (12) to (14) below.

$$hp11 = d1 + d2 + d3 \quad (12)$$

$$hp12 = d4 + d5 + d6 \quad (13)$$

$$hp13 = d7 + d8 + d9 \quad (14)$$

Since the absolute differences d1 to d9 in pixel values in the pixel block are obtained in the block matching operation unit 301, the absolute differences may be supplied from the block matching operation unit 301 to the horizontal block matching operation unit 303 and used to calculate the horizontal block matching quantities hp11, hp12, hp13.

One third of the sum of absolute differences on the right side in equations (12) to (14) may be taken to obtain the mean of the absolute differences, or the sum may be divided by four (a power of two) instead of taking one third, for reasons of hardware configuration or ease of calculation.

The sum of the absolute differences obtained for each sub-block of three horizontally aligned pixels may be a weighted sum. For example, the weight of the difference may increase as the pixel approaches the central pixel P0 or Pf2 of the pixel block, and decrease with increasing distance from the central pixel. As a specific example, the horizontal block matching quantity hp11 may be obtained from equation (15) below instead of from equation (12).

$$hp11 = d1/4 + d2/2 + d3/4 \quad (15)$$

From the input horizontal block matching quantities hp11, hp12, hp13, the matching vertical high frequency component extractor 304 obtains the absolute differences in horizontal block matching quantity between adjacent lines (rows) and determines a matching vertical high frequency component vebpm indicating the vertical high frequency component of the absolute difference.

The horizontal block matching quantities hp11, hp12, hp13 are values based on sums of the absolute differences. By obtaining the vertical high frequency component of the horizontal block matching quantities, that is, the vertical edge component, the similarity of patterns moving vertically can be obtained.

From the horizontal block matching quantities hp11, hp12, hp13 input from the horizontal block matching operation unit 303, the matching vertical high frequency component extractor 304 extracts a vertical high frequency component by taking one-fourth of the absolute values of line-to-line (row-to-row) differences of the horizontal block matching quantities (absolute values of differences between the horizontal block matching quantities of the respective lines (rows) to obtain the values dh1 and dh2 given by equations (16) and (17) below, and outputs the greater of the two values dh1, dh2 as a matching vertical high frequency component vebpm, given by equation (18).

$$dh1 = |hp11 - hp12|/4 \quad (16)$$

$$dh2 = |hp12 - hp13|/4 \quad (17)$$

$$vebpm = MAX(dh1, dh2) \quad (18)$$

Instead of taking one-fourth of the absolute differences as in equations (16) and (17), one-half of the absolute differences may be taken. Alternatively, the maximum value of the absolute differences between the values of respective lines (rows) may be taken and divided by four. If the horizontal block matching quantities hp11, hp12, hp13 are obtained by averaging the absolute differences in the horizontal block matching operation unit 303, a similar value can be obtained without the division by four as indicated in the equations above. In any case, it is sufficient if the value obtained reflecting the maximum of the absolute differences is obtained.

The matching vertical high frequency component vebpm calculated as in equation (18) is '0' when the image is still, when the pixels in the block have identical values and all the pixels in the block are moving in the same direction at the same speed, or when the pixels in the block are moving in the horizontal direction at the same speed. Since the absolute differences (horizontal block matching quantities hp11, hp12, hp13) increase as the similarity decreases, if the absolute difference has a vertical high frequency component, the value of the matching vertical high frequency component vebpm becomes large, indicating that the pixel block includes a component of motion in the vertical direction.

Figure 7A:
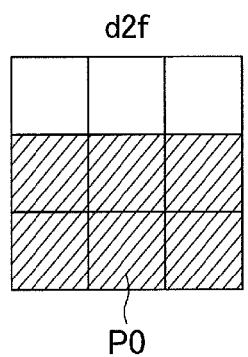
FIGS. 7A and 7B show exemplary processing by which the matching vertical high frequency component extractor in FIG. 2B determines the matching vertical high frequency component vebpm.
Figure 7B:
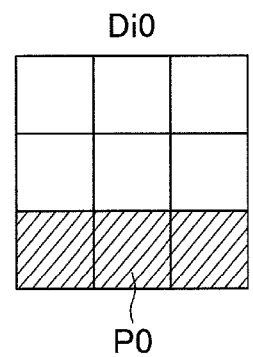

For example, if the immediately preceding frame d2f has an edge between the first row and the second row as shown in FIG. 7A and if the current frame Di0 has an edge between the second row and the third row as shown in FIG. 7B (that is, if the horizontal edge moves downward), the horizontal block matching quantity hp11 is small, the horizontal block matching quantity hp12 is large, and the horizontal block matching quantity hp13 is small, consequently the two values dh1, dh2 become large, and the matching vertical high frequency component vebpm becomes large.

Figure 8A:
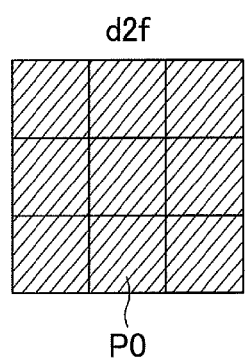
FIGS. 8A and 8B show another example of the processing by which the matching vertical high frequency component extractor in FIG. 2B determines the matching vertical high frequency component vebpm.
Figure 8B:
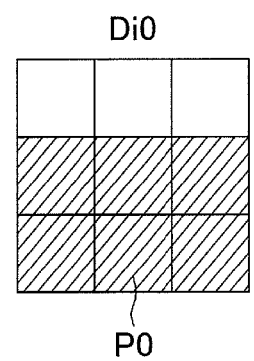

As another example, if the immediately preceding frame d2f has an edge at the top of the first row as shown in FIG. 8A and if the current frame Di0 has an edge between the first row and the second row (that is, if the horizontal edge moves downward), the horizontal block matching quantity hp11 is large and the horizontal block matching quantities hp12, hp13 are small; consequently, the dh1 value becomes large and the dh2 value becomes small, and the matching vertical high frequency component vebpm becomes large.

The horizontal block matching operation unit 303 and the matching vertical high frequency component extractor 304 shown in FIG. 2B in combination form the matching vertical high frequency component generator 308 that generates the matching vertical high frequency component vebpm by calculating a sum (simple or weighted) of the absolute differences in pixel value between the pixels in corresponding positions in the pixel blocks b0, b2, i.e., in corresponding pixel positions in the current frame Di0 and the immediately preceding frame d2f, for each of a plurality of vertically divided sub-blocks of the pixel blocks b0 and b2, and taking differences between these sums in vertically adjacent sub-blocks.

Although the pixel blocks on which pattern matching is carried out are configured as nine-pixel blocks in FIG. 3, the blocks may be configured as shown in FIG. 4A or 4B. For example, if fifteen-pixel blocks including three lines vertically and five pixels horizontally as shown in FIG. 4A are used, the horizontal block matching operation unit 303 carries out pattern matching on sub-blocks formed by five horizontally aligned pixels and obtains horizontal block matching quantities for three lines (three sub-blocks in different vertical positions).

More generally, if the pixel blocks b0, b2 include V lines vertically and H pixels horizontally, the pixel blocks b0, b2 are divided vertically into V sub-blocks, each formed by a single line of H pixels, in different vertical positions; the sum of the absolute differences between sub-blocks in corresponding pixel positions in the current frame and the immediately preceding frame is obtained; then the matching vertical high frequency component vebpm is obtained by taking differences between these sums in vertically adjacent sub-blocks.

The matching vertical high frequency component vebpm extracted by the matching vertical high frequency component extractor 304 is output to the first and second moving block coefficient conversion units 311, 312 as a value indicating the presence of a vertical motion component in the pixel blocks.

The vertical block matching operation unit 306 carries out pattern matching on vertically elongated sub-block areas constituting parts of the pixel blocks in the respective frames, based on the current frame signal Di0 and the one-frame delayed signal d2f. For example, pattern matching is carried out on sub-blocks of three vertically aligned pixels in FIG. 3, and vertical block matching quantities vp11, vp12, vp13 for three pixels (three columns) are sent to the matching horizontal high frequency component extractor 307.

The processing in the vertical block matching operation unit 306 is identical to the processing in the horizontal block matching operation unit 303 except that the direction is vertical instead of horizontal.

Like the block matching operation unit 301, the vertical block matching operation unit 306 first obtains the absolute differences d1 to d9 in pixel value between the pixels in the pixel block of interest b0 in the current frame Di0 and the pixels in the reference pixel block b2 in the immediately preceding frame d2f, as given by equations (1) to (9), and then obtains the sum of the absolute differences for each of the sub-blocks formed by dividing the pixel block b0 in the horizontal direction: for example, in three sub-blocks each having a size of one pixel (one column) in the horizontal direction. Since the pixel block size measures three lines vertically and three pixels horizontally (three rows and three columns), sums of absolute differences are obtained here for three-line-by-one-pixel (three-row by-one-column) blocks, that is, for sub-blocks including three vertically aligned pixels. The vertical block matching quantities vp11, vp12, vp13 are given by equations (19) to (21) below.

$$vp11 = d1 + d4 + d7 \quad (19)$$

$$vp12 = d2 + d5 + d8 \quad (20)$$

$$vp13 = d3 + d6 + d9 \quad (21)$$

As with the horizontal block matching operation unit 303, the absolute differences d1 to d9 obtained in the block matching operation unit 301 may be supplied to the vertical block matching operation unit 306 and used to calculate the vertical block matching quantities vp11, vp12, vp13.

One third of the sum of absolute differences on the right side in equations (19) to (21) may be taken to obtain the mean of the absolute differences, or the sum may be divided by four (a power of two) instead of taking one third, for reasons of hardware configuration or ease of calculation.

The sum of the absolute differences obtained for each sub-block of three vertically aligned pixels may be a weighted sum. For example, the weight of the difference may increase as the pixel approaches the central pixel P0 or Pf2 of the pixel block, and decrease with increasing distance from the central pixel. As a specific example, the vertical block matching quantity vp11 may be obtained from equation (22) below instead of from equation (19).

$$vp11 = d1/4 + d4/2 + d7/4 \quad (22)$$

From the input vertical block matching quantities vp11, vp12, vp13, the matching horizontal high frequency component extractor 307 obtains the absolute differences in vertical block matching quantity between adjacent columns and determines a matching horizontal high frequency component hebpm indicating the horizontal high frequency component of the absolute differences.

The vertical block matching quantities vp11, vp12, vp13 are values based on sums of the absolute differences. By obtaining the horizontal high frequency component of the vertical block matching quantities, that is, the horizontal edge component, the similarity of patterns moving horizontally can be obtained (a similarity that increases in value if there is a horizontally moving pattern).

From the vertical block matching quantities vp11, vp12, vp13 input from the vertical block matching operation unit 306, the matching horizontal high frequency component extractor 307 extracts a horizontal high frequency component by taking one-fourth of the absolute values of pixel-to-pixel (column-to-column) differences of the vertical block matching quantities (absolute values of differences between the vertical block matching quantities of the respective pixels (columns) to obtain the values dv1 and dv2 given by equations (23) and (24) below, and outputs the greater of the two values dv1, dv2 as the matching horizontal high frequency component hebpm, given by equation (25).

$$dv1 = |vp11 - vp12|/4 \quad (23)$$

$$dv2 = |vp12 - vp13|/4 \quad (24)$$

$$hebpm = MAX(dv1, dv2) \quad (25)$$

Instead of taking one-fourth of the absolute differences as in equations (23) and (24), one-half of the absolute differences may be taken. Alternatively, the maximum value of the absolute differences between the values respective pixels (columns) may be taken and divided by four. If the vertical block matching quantities vp11, vp12, vp13 are obtained by averaging the absolute differences in the vertical block matching operation unit 306, a similar value can be obtained without the division by four indicated as in the equations given above. In any case, it is sufficient if the value obtained reflecting the maximum of the absolute differences is obtained.

The matching horizontal high frequency component hebpm calculated as in equation (25) is '0' when the image is still, when the pixels in the block have identical values and all the pixels in the block are moving in the same direction at the same speed, or when the pixels in the block are moving in the vertical direction at the same speed. Since the absolute differences (vertical block matching quantities vp11, vp12, vp13) increase as the similarity decreases, if the absolute difference has a horizontal high frequency component, the value of the matching horizontal high frequency component hebpm becomes large, indicating that the pixel block includes a component of motion in the horizontal direction.

The vertical block matching operation unit 306 and the matching horizontal high frequency component extractor 307 shown in FIG. 2C in combination form the matching horizontal high frequency component generator 309 that generates the matching horizontal high frequency component hebpm by calculating a sum (simple or weighted) of the absolute differences in pixel value between the pixels in corresponding positions in the pixel blocks b0, b2, i.e., in corresponding pixel positions in the current frame Di0 and the immediately preceding frame d2f, for each of a plurality of horizontally divided sub-blocks of the pixel blocks b0 and b2, and taking differences between these sums in horizontally adjacent sub-blocks.

Although the pixel blocks on which pattern matching is carried out are configured as nine-pixel blocks in FIG. 3, the blocks may be configured as shown in FIG. 4A or 4B. For example, if fifteen-pixel blocks including three lines vertically and five pixels horizontally as shown in FIG. 4A are used, the vertical block matching operation unit 306 carries out pattern matching on sub-blocks including three vertically aligned pixels and obtains vertical block matching quantities over a range of five pixels horizontally (five sub-blocks in different horizontal positions).

More generally, if the pixel blocks b0, b2 include V lines vertically and H pixels horizontally, the pixel blocks b0, b2 are divided horizontally into H sub-blocks, each including a single pixel from each of V lines, in different horizontal positions; the sum of the absolute differences between sub-blocks in corresponding pixel positions in the current frame and the immediately preceding frame is obtained; then the matching horizontal high frequency component hebpm is obtained by taking differences between these sums in horizontally adjacent sub-blocks.

The matching horizontal high frequency component hebpm extracted by the matching horizontal high frequency component extractor 307 is output to the third moving block coefficient converter 313, as a value indicating the presence of a horizontal motion component in the pixel blocks.

The first, second, and third moving block coefficient conversion units 311, 312, 313 have similar configurations. The first and second moving block coefficient conversion units 311, 312 receive the block matching quantity blkpm from the block matching operation unit 301 and the matching vertical high frequency component vebpm from the matching vertical high frequency component extractor 304. The third moving block coefficient converter 313 receives the block matching quantity blkpm from the block matching operation unit 301 and the matching horizontal high frequency component hebpm from the matching horizontal high frequency component extractor 307.

Figure 2D:
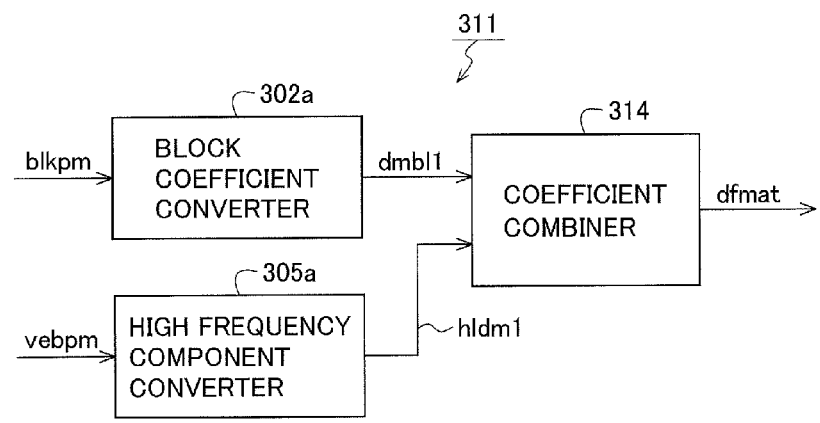
FIG. 2D is a block diagram showing an exemplary configuration of the first moving block coefficient converter used in the pattern matching detector in FIG. 2A.
Figure 2E:
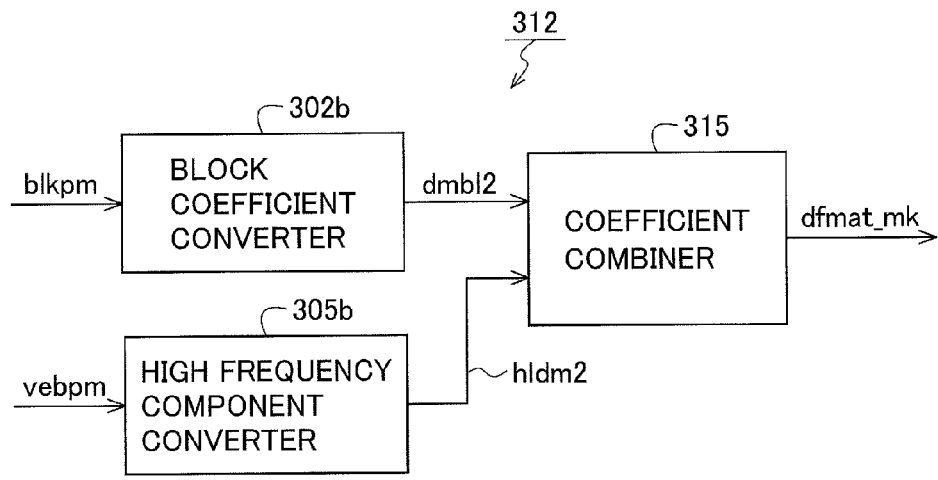
FIG. 2E is a block diagram showing an exemplary configuration of the second moving block coefficient converter used in the pattern matching detector in FIG. 2A.
Figure 2F:
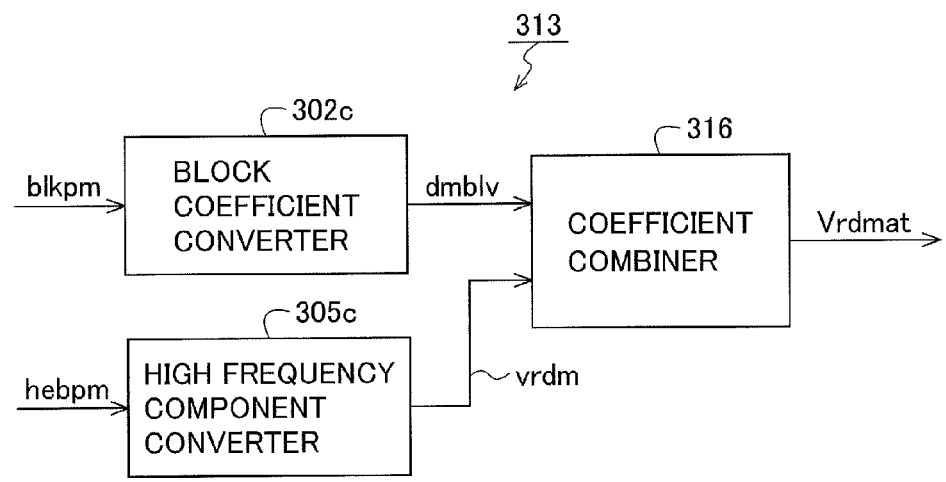
FIG. 2F is a block diagram showing an exemplary configuration of the third moving block coefficient converter used in the pattern matching detector in FIG. 2A.

As shown in FIG. 2D, the first moving block coefficient conversion unit 311 includes a block coefficient converters 302a, a high frequency component converter 305a, and a coefficient combiner 314. As shown in FIG. 2E, the second moving block coefficient conversion unit 312 includes a block coefficient converter 302b, a high frequency component converter 305b, and a coefficient combiner 315. As shown in FIG. 2F, the third moving block coefficient converter 313 includes a block coefficient converter 302c, a high frequency component converter 305c, and a coefficient combiner 316.

The first, second, and third moving block coefficient conversion units 311, 312, 313 convert the block matching quantity blkpm received from the block matching operation unit 301 in accordance with the matching high frequency component (vebpm or hebpm) to generate block coefficients dfmat, dmat_mk, Vrdmat indicative of pixel block motion.

For example, the block coefficient converter 302a in the first moving block coefficient conversion unit 311 subtracts a given offset value M1 from the block matching quantity blkpm, multiplies the difference by a given magnification factor Mk1, performs a nonlinear conversion by limiting the result ((blkpm−M1)×Mk1) to a given range (e.g., '0' to Max_k), and outputs the resulting value as a block coefficient dmb11.

Alternatively, the nonlinear conversion may be carried out by multiplying by the magnification factor Mk1 and then subtracting the offset value M1 (blkpm×Mk1−M1), to obtain the block coefficient.

Figure 9:
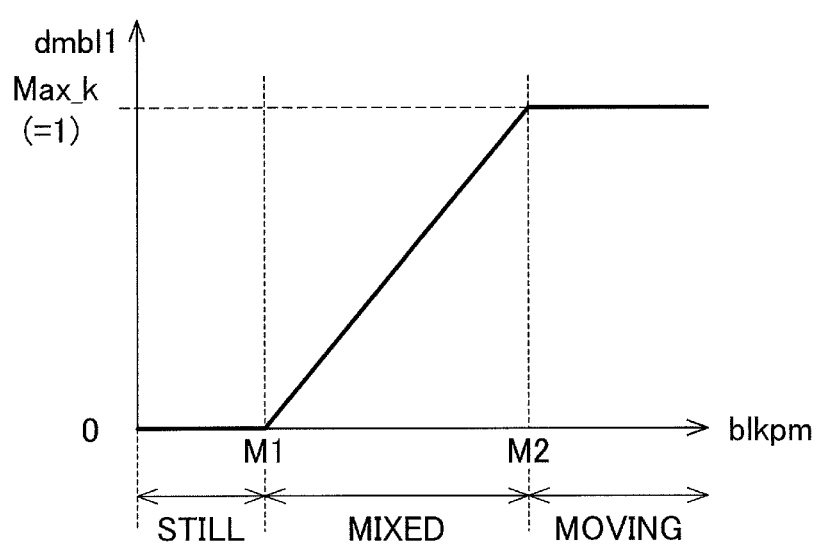
FIG. 9 shows an exemplary conversion curve by which the pattern matching detector used in the video signal processing device in the first embodiment converts block matching results to moving block coefficients.

FIG. 9 shows an exemplary conversion curve by which the block coefficient converter 302a converts the block matching quantity blkpm (on the horizontal axis) to the block coefficient dmb11 (on the vertical axis) when the block coefficient dmb11 can take values from '0' to Max_k (=1).

The block coefficient dmb11 is used as an indicator of the degree of motion of the block pattern in the pixel block.

The values of the block coefficient dmb11 from '0' to '1' may be converted to values from '0' to '8' representing fractions ⅛, ⅜, and so on, with '8' representing '1'.

In the example shown, when the block matching quantity blkpm is equal to or greater than a given value M2, the block coefficient dbmb11 takes the maximum value Max_k, indicating that the block is moving (the block is treated as definitely moving). When the block matching quantity blkpm is equal to or less than the offset value M1, the block coefficient dmb11 is '0' and the patterns are treated as similar (representing a still image).

If the block matching quantity blkpm is between the offset value M1 and the given value M2, the block coefficient dmb11 increases from '0' to Max_k as the block matching quantity blkpm increases, indicating increasing degrees of motion (indicating a state between the states treated as definitely moving and definitely still, and showing how close the state is to the definitely moving state).

When the magnification factor Mk1 is increased, the block matching quantity blkpm is converted to a block coefficient dmb11 with larger values, indicating greater motion, so that the motion becomes more easily recognizable. Increasing the offset value M1 increases the value up to which difference values are detected as still parts of the image. The motion detection sensitivity can accordingly be adjusted in the conversion process that yields the block coefficient dmb11 by adjusting the magnification factor Mk1 and offset value M1.

The block coefficient converter 302a may generate the block coefficient dmb11 by comparing the block matching quantity blkpm with a given threshold, or by using a lookup table (LUT) in a read-only memory (ROM) to perform a predetermined conversion such as, for example, the conversion shown in FIG. 9, instead of by carrying out the nonlinear conversion as described above.

The matching vertical high frequency component vebpm from the matching vertical high frequency component extractor 304 is converted to a high frequency component coefficient hldm1, which indicates the degree of motion in the vertical motion component in the pixel block, by comparison with a threshold or by a nonlinear conversion in the same way as in the block coefficient converter 302a, and is output to the high frequency component converter 305a in the first moving block coefficient conversion unit 311.

The high frequency component coefficient hldm1 increases from '0' to '1' as the matching vertical high frequency component vebpm increases, indicating increasing degrees of motion in the vertical motion component.

The coefficient combiner 314 receives the block coefficient dmb11 from the block coefficient converter 302a and the high frequency component coefficient hldm1 from the high frequency component converter 305a. The coefficient combiner 314 combines the block coefficient dmb11 and the high frequency component coefficient hldm1 and generates and outputs the moving block coefficient dfmat. The coefficient combiner 314 combines the values, for example, by converting the block coefficient dmb11 in accordance with the value of the high frequency component coefficient hldm1.

Since the high frequency component coefficient hldm1 indicates the degree of motion in the vertical motion component, if the coefficient combiner 314 converts the block coefficient dmb11 by multiplying it by the high frequency component coefficient hldm1, for example, the block coefficient dmb11 is output directly as the moving block coefficient dfmat when the high frequency component coefficient hldm1 is '1' (indicating that a vertical motion component is present). When the high frequency component coefficient hldm1 is '0' (indicating that no vertical motion component is present), the moving block coefficient dfmat is output as '0'. More generally, the block coefficient dmb11 is weighted in accordance with the value of the high frequency component coefficient hldm1 to obtain the moving block coefficient dfmat.

The moving block coefficient dfmat output from the coefficient combiner 314 can thus be obtained as a moving block coefficient dfmat that indicates the degree of block motion by reflecting vertical motion of patterns in the pixel block.

The coefficient combiner 314 can generate the moving block coefficient dfmat reflecting vertical motion of the pixel block pattern by outputting the block coefficient dmb11 as dfmat when the high frequency component coefficient hldm1 exceeds a given value (for example when hldm1=1) instead of by multiplying the block coefficient dmb11 by the high frequency component coefficient hldm1.

In the description given above the moving block coefficient dfmat determined by the coefficient combiner 314 takes account of vertical pattern motion, but the block coefficient dmb11 output from the block coefficient converter 302a may be output directly as moving block coefficient dfmat. It is sufficient if moving block coefficient dfmat is generated from the block matching quantity blkpm and indicates motion of the pixel block. Any moving block coefficient dfmat generated in this way indicates that the pixel blocks have different patterns, that is, that the pixel blocks are moving.

When a conversion is made in accordance with the high frequency component coefficient hldm1 in order to reflect vertical pattern motion, moving block coefficient dfmat enables appropriate processing to be carried out in accordance with pattern motion in the frame difference detection process and other processes described later.

The moving block coefficient dfmat generated by the coefficient combiner 314 in the first moving block coefficient conversion unit 311 is sent to the frame difference detector 20 in FIG. 1 as the moving block coefficient dfmat detected by the pattern matching detector 30.

Since the second and third moving block coefficient conversion units 312, 313 are similar in configuration to the first moving block coefficient conversion unit 311, differing only in their inputs, detailed descriptions will be omitted. The second moving block coefficient conversion unit 312 receives the block matching quantity blkpm and the matching vertical high frequency component vebpm extracted by the matching vertical high frequency component extractor 304 and determines a horizontal line moving block coefficient dfmat_mk reflecting vertical pattern motion. The third moving block coefficient converter 313 receives the block matching quantity blkpm and the matching horizontal high frequency component hebpm extracted by the matching horizontal high frequency component extractor 307 and determines a vertical line moving block coefficient Vrdfmat reflecting horizontal pattern motion. The horizontal line moving block coefficient dfmat_mk and the vertical line moving block coefficient Vrdfmat are sent to the motion information corrector 50 in FIG. 1 as the moving block coefficients cbmat detected by the pattern matching detector 30.

The block coefficient converters 302b, 302c, high frequency component converters 305b, 305c, and coefficient combiners 315, 316 in the second and third moving block coefficient conversion units 312, 313 have the same respective configurations as the block coefficient converter 302a, high frequency component converter 305b, and coefficient combiner 314 in the first moving block coefficient conversion unit 311. The moving block coefficients cbmat they obtain can take vertical or horizontal pattern motion into account indicating block pattern motion in the pixel block responsive to the value of the block matching quantity blkpm, based on pattern similarity.

The first, second, and third moving block coefficient conversion units 311, 312, 313 may perform a common conversion to obtain a single coefficient instead of performing separate conversions to obtain separate moving block coefficients. However, by specifying different magnification factors and offset values for separate conversions performed by the block coefficient converters 302a, 302b, 302c and high frequency component converters 305a, 305b, 305c, the high frequency component direction and detection sensitivity can be adjusted in the conversion process to obtain moving block coefficients for more appropriate processing responsive to pattern motion during frame difference detection and in the processing in the motion information corrector 50, which will be described later.

As described above, the pattern matching detector 30 in FIG. 2A obtains a block matching quantity blkpm based on a calculation of similarity between the pixel block of interest b0 in the current frame Di0 and the reference pixel block b2 in the immediately preceding frame d2f, obtains vertical and horizontal high frequency components of the absolute difference, and generates moving block coefficients dfmat, dbmat responsive to similarity based on the block matching quantity, reflecting whether the pixel block has vertical or horizontal pattern motion. Since the moving block coefficients dfmat, dbmat are obtained from pattern matching (similarity calculation) on the pixel blocks, a value indicating block pattern motion in the pixel blocks can be obtained because the difference in pattern between the pixel blocks is considered in addition to the difference between the pixel of interest P0 and the corresponding pixel.

Referring again to FIG. 1, the edge detector 40 receives the current frame signal Di0, one-frame delayed signal d2f, and one-field delayed signal d1f, detects edges in the image in the vicinity of the pixel of interest P0 in the current frame Di0 or in the vicinity of the position corresponding to the pixel of interest P0 in the immediately preceding field or frame from the pixel values of the pixels represented by the current frame signal Di0, one-frame delayed signal d2f, and one-field delayed signal d1f, and outputs edge decision coefficients efkm, cedkm.

Figure 10:
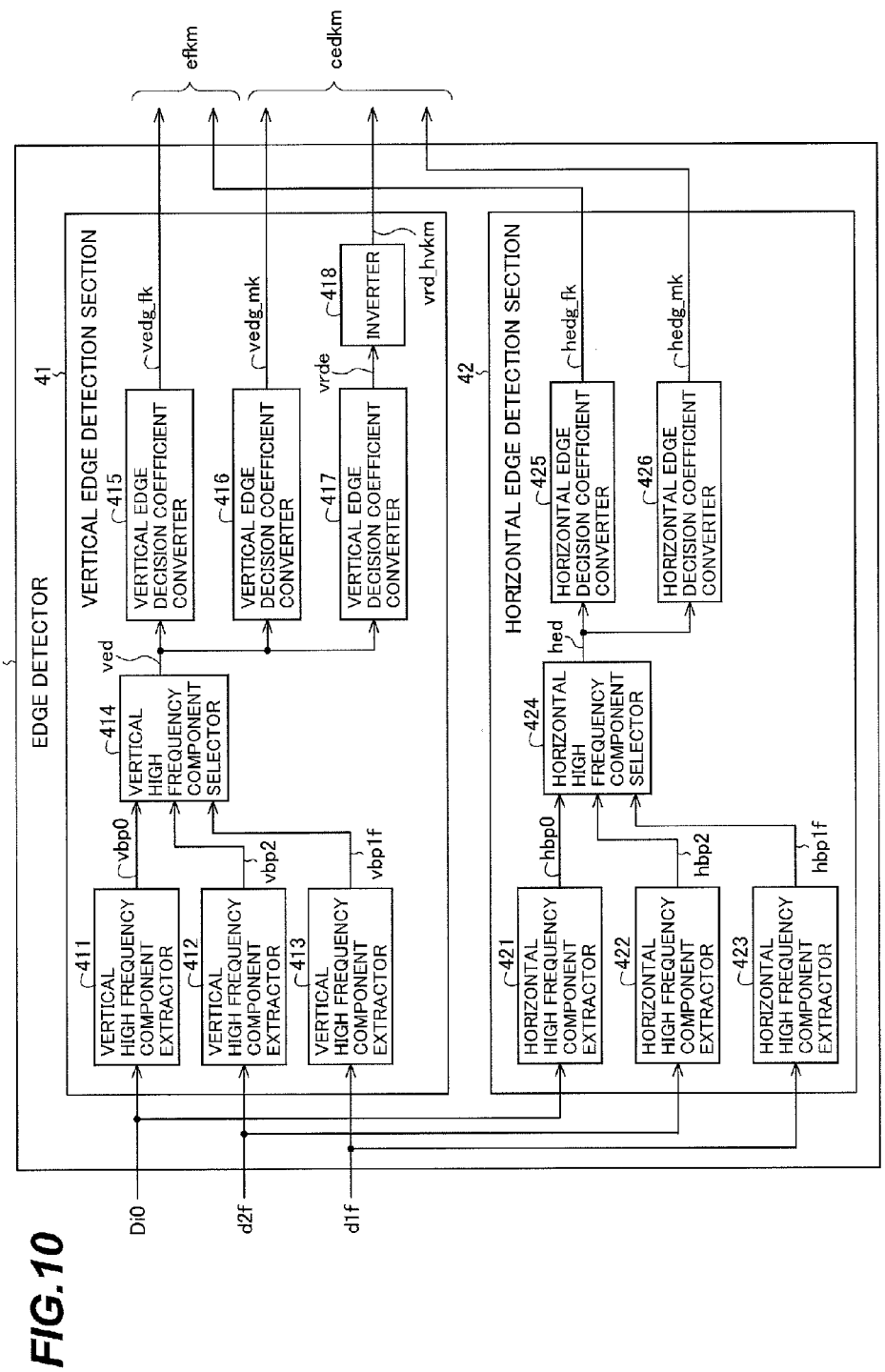
FIG. 10 is a block diagram showing an exemplary configuration of the edge detector in the video signal processing device in the first embodiment.

The edge detector 40 is configured as shown, for example, in FIG. 10.

The edge detector 40 in FIG. 10 includes a vertical edge detection section 41, which detects vertical high frequency components (vertical edge components, or horizontal line components) in the image and a horizontal edge detection section 42, which detects horizontal high frequency components (horizontal edge components, or vertical line components) in the image.

The vertical edge detection section 41 and horizontal edge detection section 42 detect edges by extracting vertical and horizontal high frequency components from the current frame signal Di0, the signal d2f of the frame one frame before, and the signal d1f of the frame one field before, specifically from the pixel of interest P0 and pixels in the vicinity of the pixel of interest P0 in the same frame and the corresponding pixels in the temporally adjacent frames, and outputs the results as edge decision coefficients.

The vertical edge detection section 41 includes vertical high frequency component extractors 411, 412, 413, that extract vertical edge components, which are vertical high frequency components, a vertical high frequency component selector 414, vertical edge decision coefficient converters 415, 416, 417, and an inverter 418.

The vertical high frequency component extractors 411, 412, 413 have similar configurations but receive signals from different frames or fields. The vertical edge decision coefficient converters 415, 416, 417 have similar configurations but can operate with different coefficient conversion settings, which can be set and modified separately (independently).

The horizontal edge detection section 42 includes horizontal high frequency component extractors 421, 422, 423, that extract horizontal edge components, which are horizontal high frequency components, a horizontal high frequency component selector 424, and horizontal edge decision coefficient converters 425, 426.

The horizontal high frequency component extractors 421, 422, 423 have similar configurations but receive signals from different frames or fields. The horizontal edge decision coefficient converters 425, 426 have similar configurations but can operate with different coefficient conversion settings, which can be set and modified separately (independently).

As in the description of the pattern matching detector 30, FIG. 5 illustrates temporal relationships among the current frame signal Di0, one-frame delayed signal d2f, and one-field delayed signal d1f and positional relationships in the vertical scanning direction among pixels used in the processing, when the video signal processing device receives an interlaced video signal.

In FIG. 5, on the vertical line representing the current frame Di0, the pixel of interest P0 (central pixel of the pixel block b0 in FIG. 6B) is shown on line n. On the vertical line representing the frame of the one-frame delayed signal d2f, the pixel Pf2 (central pixel of the pixel block b2 in FIG. 6A) is also shown on line n (in the same vertical position as the pixel of interest). On the vertical line representing the frame of the one-field delayed signal d1f, pixel Pf1a is shown half a line above the pixel of interest, and pixel Pf1b half a line below.

The operation of the edge detector 40 will next be described with reference to FIGS. 5 and 10.

In the vertical edge detection section 41, the current frame signal Di0, one-frame delayed signal d2f, and one-field delayed signal d1f are input to the vertical high frequency component extractors 411, 412, 413, respectively. The vertical high frequency component extractors 411, 412, 413 extract vertical high frequency components, which are vertical edge components (horizontal line components), in the vicinity of the pixel of interest P0 (or a corresponding position), from the current frame signal Di0, one-frame delayed signal d2f, one-field delayed signal d1f.

The vertical edge components are extracted by bandpass filters (BPFs) and the like. After vertical BPF processing of pixels of different lines, the absolute values of the outputs of the vertical BPFs are obtained as vertical edge components.

The absolute values of the BPF outputs may be subjected to a smoothing process by a horizontal LPF process. Alternatively, prior to the vertical BPF process, a horizontal LPF process may be carried out on the signals on each line. The essential point is to obtain vertical edge components of contours extending horizontally or having a horizontal component.

The vertical high frequency component extractors 411 and 412 have similar configurations. The vertical high frequency component extractor 411 receives signals representing pixel P0 and pixels (such as P0a, P0b in FIG. 5) on the same vertical line in the current frame Di0 through a line delay process or the like, extracts a vertical edge component (the absolute value of a vertical BPF output, for example) from line-to-line pixel calculations (calculations using values of pixels on different lines) in the same frame, and outputs the result as a vertical edge component vbp0.

The vertical high frequency component extractor 412 receives signals representing pixel Pf2 (in the same position as the pixel P0) and pixels (Pf2a, Pf2b in FIG. 5) on the same vertical line in the frame of the one-frame delayed signal d2f, extracts a vertical edge component from line-to-line pixel calculations (calculations using values of pixels on different lines) in that frame, and outputs it as a vertical edge component vbp2.

Vertical edge components may also be extracted by calculations involving only the pixel in position P0 or Pf2 and a single pixel disposed on the line above or below, or by calculations on pixels disposed on a range of several lines extending above and below pixel position P0 or Pf2.

The extracted vertical edge component may be subjected to a smoothing process, gain adjustment, or other conversion process.

The vertical high frequency component extractor 413 receives signals of pixels (for example, Pf1a and Pf1b in FIG. 5) on a vertical line of the one-field delayed signal d1f by a line delay process or the like, extracts a vertical edge component (the absolute value of a vertical BPF output based on the difference between two pixels, for example) from line-to-line pixel calculations (calculations using values of pixels on different lines) in the field, and outputs it as the vertical edge component vbp1f of the field.

The vertical edge component may also be extracted from calculations on pixels on a range of several lines above and below the pixels Pf1a and Pf1b in FIG. 5. The same number of lines may be used as in the vertical high frequency component extractor 411. The extracted vertical edge component may be subjected a smoothing process, gain adjustment, or other conversion process, also as described above.

The vertical edge components vbp0, vbp2, vbp1f in the frames of the current frame signal Di0, one-frame delayed signal d2f, and one-field delayed signal d1f are output from the vertical high frequency component extractors 411, 412, 413 to the vertical high frequency component selector 414.

The vertical high frequency component selector 414 selects the minimum value of the input vertical edge components vbp0, vbp2, vbp1f and outputs it as an extracted vertical edge component ved.

The extracted vertical edge component ved is the minimum value of the vertical high frequency components obtained in the vicinity of the pixel of interest P0 (the pixels around the pixel of interest P0 in FIG. 5) and the vicinity of the corresponding positions in the period up to the frame one frame before. Since the minimum value is selected, if the value of the extracted vertical edge component is greater than a threshold specified for determining the presence of a vertical high frequency component, it can be determined that the current frame signal Di0, the one-frame delayed signal d2f, and the one-field delayed signal d1f each have a vertical high frequency component, or a horizontal line component or vertical edge.

The vertical high frequency component selector 414 may alternatively select the maximum value of the vertical edge components as the extracted vertical edge component ved. In that case, whether a horizontal line component, that is, a vertical edge, is present in any one of the current frame signal Di0, the one-frame delayed signal d2f, and the one-field delayed signal d1f is determined.

The extracted vertical edge component ved indicating the presence of a horizontal line component or vertical edge in the vicinity of the pixel of interest P0 is output from the vertical high frequency component selector 414 to the vertical edge decision coefficient converters 415, 416, 417.

The vertical edge decision coefficient converters 415, 416, 417 decide from the extracted vertical edge component ved whether there is a vertical edge and generate vertical edge decision coefficients. The vertical edge decision coefficient converters 415, 416, 417 have similar configurations but can have independent coefficient conversion settings for generating different vertical edge decision coefficients.

Since the vertical edge decision coefficient converters 415, 416, 417 are similar in configuration, only vertical edge decision coefficient converter 415 will be described next.

For example, the vertical edge decision coefficient converter 415 subtracts an offset value E1 from the extracted vertical edge component ved, multiplies the difference by a magnification factor Ek1, performs a nonlinear conversion by limiting the product ((ved−E1)×Ek1) to a given range (e.g., 0 to Max_ek), and outputs the result as a first vertical edge decision coefficient vedg_fk.

Alternatively, the extracted vertical edge component ved may be multiplied by the magnification factor Ek1 before subtracting the offset value E1 (ved×Ek1−E1).

Figure 11:
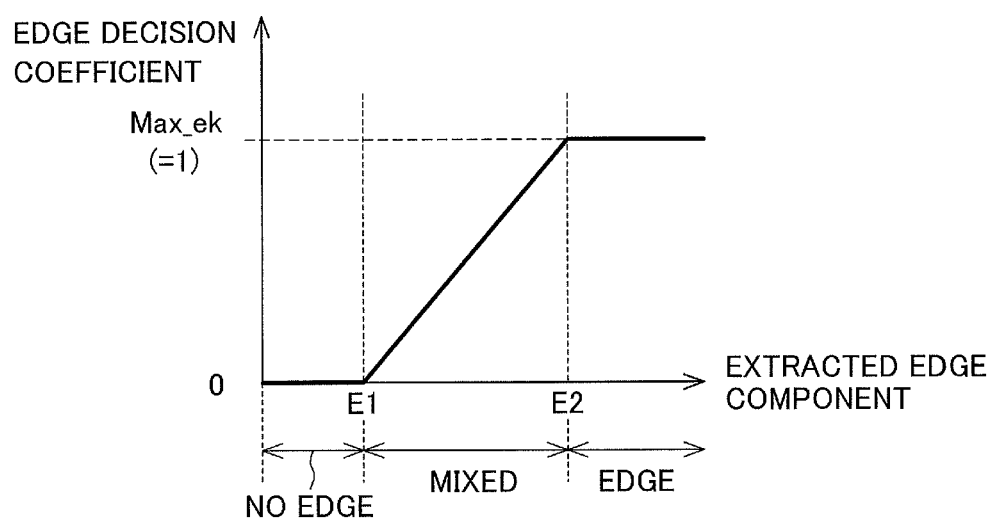
FIG. 11 shows an exemplary conversion curve by which the edge detector used in the video signal processing device in the first embodiment converts edge detection results to edge coefficients.

FIG. 11 shows a conversion curve by which the vertical edge decision coefficient converter 415 converts the extracted vertical edge component ved (the extracted edge component in the drawing) to the vertical edge decision coefficient vedg_fk (the edge decision coefficient in the drawing). The illustrated vertical edge decision coefficient vedg_fk ranges from 0 to the maximum value Max_ek.

The vertical edge decision coefficient vedg_fk is used as an indicator of the degree of presence of a horizontal line component or vertical edge (degree to which the block is to be treated as having a horizontal line component or vertical edge).

The values of the vertical edge decision coefficient vedg_fk from '0' to '1' may be converted to values from '0' to '8' representing fractions 1/8, 2/8, and so on, with '8' representing '1'.

In the example shown, when the extracted vertical edge component ved is equal to or greater than a given value E2, the vertical edge decision coefficient vedg_fk takes the maximum value Max_ek, indicating the (definite) presence of a vertical edge. When the extracted vertical edge component ved is equal to or less than the offset value E1, the vertical edge decision coefficient vedg_fk is '0', indicating the (definite) absence of a vertical edge.

If the extracted vertical edge component ved is between the offset value E1 and the given value E2, the vertical edge decision coefficient vedg_fk increases from 0 to Max_ex as the extracted vertical edge component ved increases, indicating increasing degrees to which the component should be treated as a vertical edge, or in other words, indicating the size or strength of the edge component (indicating a state between the states treated as a definite edge and definitely no edge, and showing how close the state is to the definite edge state).

When the magnification factor Ek1 is increased, the extracted vertical edge component ved is converted to a vertical edge decision coefficient vedg_fk with larger values, making it easier to detect the presence of a vertical edge. Increasing the offset value E1 expands the range over which the absence of an edge is detected. High-frequency components within that range are treated as noise. The edge detection sensitivity can accordingly be adjusted in the conversion process that yields the vertical edge decision coefficient vedg_fk by adjusting the magnification factor Ek1 and the offset value E1.

The vertical edge decision coefficient converter 415 may generate the vertical edge decision coefficient vedg_fk by comparing the extracted vertical edge component ved with a given threshold or by using a LUT to perform a predetermined conversion such as, for example, the conversion shown in FIG. 11, instead of by carrying out the nonlinear conversion as described above.

The vertical edge decision coefficient converters 416, 417 are similar in configuration to the vertical edge decision coefficient converter 415, so that detailed descriptions will be omitted. The extracted vertical edge component ved is converted to a second vertical edge decision coefficient vedg_mk by vertical edge decision coefficient converter 416 and to a third vertical edge decision coefficient vrde by vertical edge decision coefficient converter 417. The vertical edge decision coefficient vrde obtained by vertical edge decision coefficient converter 417 is sent to the inverter 418.

The vertical edge decision coefficient converters 416, 417 have the same configuration as the vertical edge decision coefficient converters 415. The vertical edge decision coefficients vedg_mk, vrde obtained from the vertical edge decision coefficient converters 416, 417 both take values from '0' to '1', indicating the degree of presence of a horizontal line component or vertical edge (degree to which the block is to be treated as having a horizontal line component or vertical edge), responsive to the value of the extracted vertical edge component ved.

The vertical edge decision coefficient converters 415, 416, 417 may perform a common conversion to obtain a single coefficient instead of performing separate conversions to obtain separate vertical edge decision coefficients. However, by specifying different magnification factors and offset values for separate conversions by the vertical edge decision coefficient converters 415, 416, 417, the edge detection sensitivity can be adjusted in the conversion process that yields the vertical edge decision coefficients for more appropriate processing responsive to edge direction during frame difference detection and in the processing in the motion information corrector 50, which will be described later.

The inverter 418 inverts the vertical edge decision coefficient vrde from the vertical edge decision coefficient converter 417 and outputs an inverted vertical edge decision coefficient vrd_hvkm. The inversion is carried out by, for example, subtracting the value of the vertical edge decision coefficient vrde from the maximum value. The vertical edge decision coefficient vrde indicates the degree of presence of a horizontal line component or vertical edge; the inverted vertical edge decision coefficient indicates the degree of absence of a horizontal line component or vertical edge, or the degree of non-verticality of the edge.

The vertical edge decision coefficients vedg_fk and vedg_mk generated by vertical edge decision coefficient converters 415 and 416 and the non-vertical edge decision coefficient vrd_hvkm generated by inverter 418 indicate whether there is a vertical edge in the vicinity of the pixel of interest P0.

In the horizontal edge detection section 42, the current frame signal Di0, one-frame delayed signal d2f, and one-field delayed signal d1f are input to the horizontal high frequency component extractors 421, 422, 423, respectively. The horizontal high frequency component extractors 421, 422, 423 extract horizontal high frequency components, which are horizontal edge components (vertical line components), in the vicinity of the pixel of interest P0 (or a corresponding position), from the current frame signal Di0, one-frame delayed signal d2f, and one-field delayed signal d1f.

In the horizontal edge component extraction, a vertical LPF extracts a vertical low frequency component, then a horizontal BPF process is performed, and the absolute value of the output of the horizontal BPF is obtained as a horizontal edge component.

The horizontal edge component extraction may be carried out by a horizontal BPF process centered on a given pixel. A smoothing process may be performed by performing a vertical LPF process on the absolute value of the horizontal BPF output. The essential point is to obtain horizontal edge components of contours extending vertically or having a vertical component.

The horizontal high frequency component extractors 421 and 422 have similar configurations. The horizontal high frequency component extractor 421 operates on pixel P0 in the current frame Di0 by extracting the vertical low frequency component with a vertical LPF and then performing a horizontal BPF process on the vertical low frequency component to extract a horizontal edge component (for example, the absolute value of the horizontal BPF output), and outputs the result as a horizontal edge component hbp0.

The horizontal high frequency component extractor 422 operates on pixel Pf2 in the frame of the one-frame delayed signal df2 by extracting a vertical low frequency component with a vertical LPF and then performing a horizontal BPF process on the vertical low frequency component to extract a horizontal edge component, which is output as a horizontal edge component hbp2.

The extracted horizontal edge component may be subjected to a smoothing process, gain adjustment, or other conversion process.

The horizontal high frequency component extractor 423 operates on pixels Pf1a, Pf1b (see FIG. 5) of the one-field delayed signal d1f by extracting a vertical low frequency component (for example, the mean value of the two pixels) by a vertical LPF process and performing a horizontal BPF process on the vertical low frequency component to extract a horizontal edge component (for example, the absolute value of the BPF output) from the vertical low frequency component in the field, and outputs the result as the horizontal edge component hbp1f in the field.

The vertical low frequency component may also be extracted by a vertical LPF process carried out on pixels disposed on a range of several lines above and below the pixels Pf1a, Pf1b in FIG. 5. The extracted horizontal edge component may be subjected to a smoothing process, gain adjustment, or other conversion process, as with the above.

The horizontal edge components hbp0, hbp2, hbp1f in the frames of the current frame signal Di0, one-frame delayed signal d2f, and one-field delayed signal d1f are output from the horizontal high frequency component extractors 421, 422, 423 to the horizontal high frequency component selector 424.

The horizontal high frequency component selector 424 selects the minimum value of the input horizontal edge components hbp0, hbp2, hbp1f and outputs it as an extracted horizontal edge component hed.

The extracted horizontal edge component hed is the minimum value of the horizontal high frequency components obtained in the vicinity of the pixel of interest P0 (the pixels around the pixel of interest P0 in FIG. 5) and the vicinity of the corresponding positions in the period up to the frame one frame before. Since the minimum value is selected, if the value of the extracted horizontal edge component hed is greater than a threshold specified for determining the presence of a horizontal high frequency component, it can be determined that the current frame signal Di0, the one-frame delayed signal d2f, and the one-field delayed signal d1f each have a horizontal high frequency component, representing a vertical line or horizontal edge.

The horizontal high frequency component selector 424 may alternatively select the maximum value of the horizontal edge components as the extracted horizontal edge component hed. In that case, whether a vertical line component, that is, a horizontal edge, is present in any one of the current frame signal Di0, the one-frame delayed signal d2f, and the one-field delayed signal d1f is determined.

The extracted horizontal edge component hed indicating the presence of a vertical line component or horizontal edge in the vicinity of the pixel of interest P0 is output from the horizontal high frequency component selector 424 to the horizontal edge decision coefficient converters 425, 426.

The horizontal edge decision coefficient converters 425, 426 decide from the extracted horizontal edge component hed whether there is a horizontal edge and generate horizontal edge decision coefficients. The horizontal edge decision coefficient converters 425, 426 have similar configurations but can have independent coefficient conversion settings for generating different horizontal edge decision coefficients.

Since the horizontal edge decision coefficient converters 425, 426 are similar in configuration, only horizontal edge decision coefficient converter 425 will be described next.

The horizontal edge decision coefficient converter 425 converts the extracted horizontal edge component hed to a first horizontal edge decision coefficient hedg_fk. The conversion is effected by, for example, a process similar to the process used in the vertical edge decision coefficient converter 415. FIG. 11 shows the conversion curve, which ranges from '0' to a maximum value Max_ek.

The horizontal edge decision coefficient hedg_fk is used as an indicator of the degree of presence of a vertical line component or horizontal edge.

As in the conversion performed in the vertical edge decision coefficient converter 415, the values of the horizontal edge decision coefficient hedg_fk from '0' to '1' may be converted to values from '0' to '8' representing fractions ⅛, ⅔, and so on, with '8' representing '1'.

As with the extracted vertical edge component ved, if the extracted horizontal edge component hed is equal to or greater than a predetermined value E2, the horizontal edge decision coefficient hedg_fk takes the maximum value Max_ek, indicating the (definite) presence of a horizontal edge. If the extracted horizontal edge component hed is equal to or less than an offset value E1, the horizontal edge decision coefficient hedg_fk is '0', indicating the (definite) absence of an edge.

If the extracted horizontal edge component hed is between the offset value E1 and the given value E1, the horizontal edge decision coefficient hedg_fk increases from '0' to Max_ek as the extracted horizontal edge component hed increases, indicating increasing degrees to which the value represents a horizontal edge, or should be treated as representing a horizontal edge.

The horizontal edge decision coefficient converter 426 has the same configuration as the horizontal edge decision coefficient converter 425, so that a description will be omitted. The horizontal edge decision coefficient converter 426 converts the extracted horizontal edge component hed and generates a second horizontal edge decision coefficient hedg_mk. The horizontal edge decision coefficient hedg_mk takes values from '0' to '1', indicating the degree of the presence of a vertical line component or horizontal edge, responsive to the value of the extracted horizontal edge component hed.

The horizontal edge decision coefficient converters 425, 426 may perform a common conversion to obtain a single coefficient instead of performing separate conversions to obtain separate horizontal edge decision coefficients. However, by specifying different magnification factors and offset values for the separate conversions performed by the horizontal edge decision coefficient converters 425, 426, the edge detection sensitivity can be adjusted in the conversion process that yields the horizontal edge decision coefficients for more appropriate processing responsive to edge direction in the image during frame difference detection and in the processing in the motion information corrector 50, which will be described later.

The horizontal edge decision coefficients hedg_fk and hedg_mk generated by the horizontal edge decision coefficient converters 425, 426 indicate whether there is a horizontal edge in the vicinity of the pixel of interest P0.

As has been described, the edge detector 40 shown in FIG. 10 extracts high frequency components of the signals from the pixels in the current frame signal Di0, one-frame delayed signal d2f, and one-field delayed signal d1f, and generates and outputs edge decision coefficients efkm and cedkm indicating the degree of presence of an edge component in the vicinity of the pixel of interest P0.

The vertical edge decision coefficient vedg_fk from the vertical edge decision coefficient converter 415 in the vertical edge detection section 41 and the horizontal edge decision coefficient hedg_fk from the horizontal edge decision coefficient converter 425 in the horizontal edge detection section 42 are sent to the frame difference detector 20 in FIG. 1 as the edge decision coefficients efkm indicating the presence of an edge in the vicinity of the pixel of interest P0, as detected by the edge detector 40. The vertical edge decision coefficient vedg_mk from the vertical edge decision coefficient converter 416 in the vertical edge detection section 41, the non-vertical edge decision coefficient vrd_hvkm from the inverter 418, and the horizontal edge decision coefficient hedg_mk from the horizontal edge decision coefficient converter 426 in the horizontal edge detection section 42 are sent to the motion information corrector 50 in FIG. 1 as the edge decision coefficients cedkm detected by the edge detector 40.

Referring again to FIG. 1, the frame difference detector 20 receives the current frame signal Di0, the one-frame delayed signal d2f, and also the moving block coefficient dfmat from the pattern matching detector 30 and the edge decision coefficients efkm from the edge detector 40.

The frame difference detector 20 obtains the difference between in-phase pixels in the preceding frame signal d2f and the current frame signal Di0, selects the smoothing extent according to the moving block coefficient dfmat and edge decision coefficients efkm corresponding to the difference, performs a smoothing process within the selected extent, detects a smoothed frame-to-frame difference, and generates a frame difference signal fdiff as a detection result.

The frame difference signal fdiff output from the frame difference detector 20 is '0' in still parts of the image, and its absolute value increases as the degree of motion increases.

The frame difference calculator 21 in the frame difference detector 20 receives the current frame signal Di0 and the one-frame delayed signal d2f and also receives the moving block coefficient dfmat from the pattern matching detector 30 and the edge decision coefficients efkm from the edge detector 40.

Figure 12:
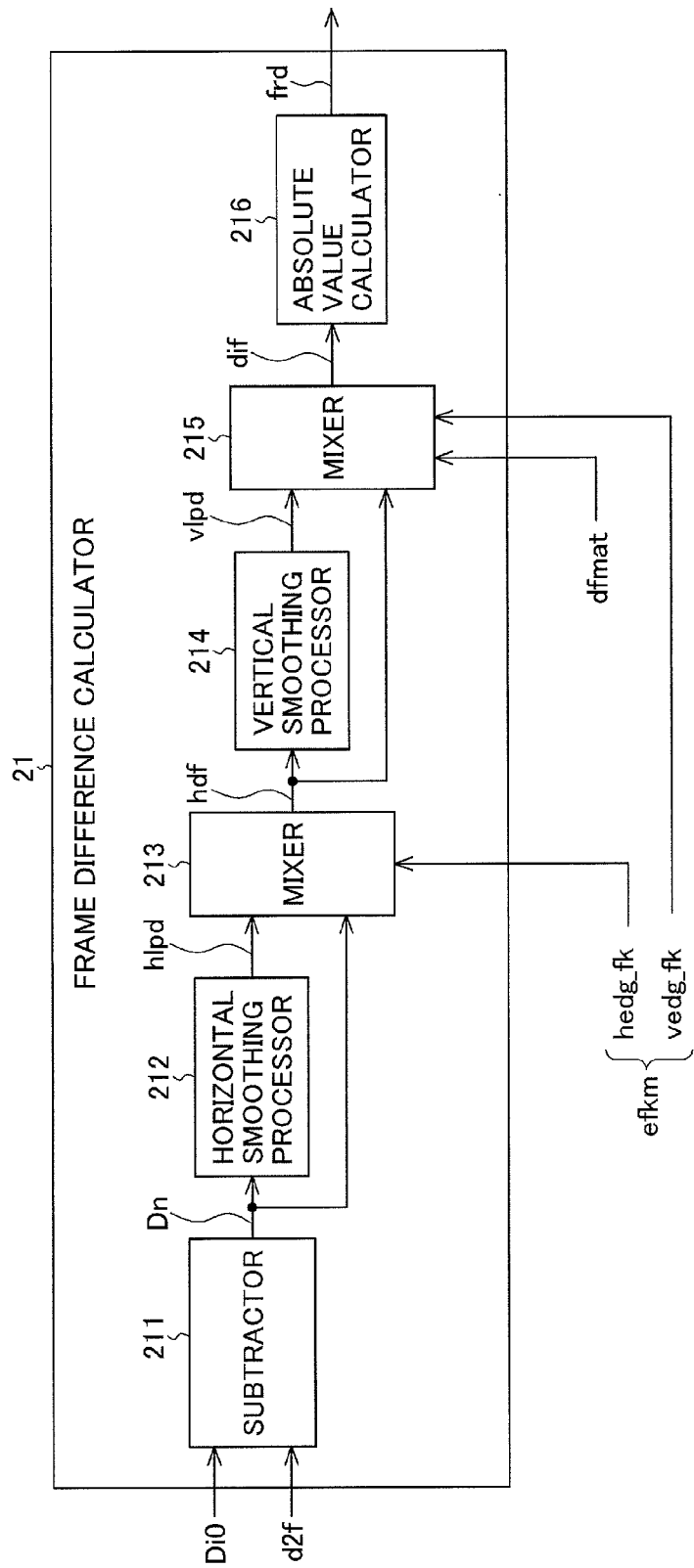
FIG. 12 is a block diagram showing an exemplary configuration of the frame difference calculator in the frame difference detector used in the first embodiment.

The frame difference calculator 21 is configured as shown, for example, in FIG. 12.

The frame difference calculator 21 in FIG. 12 includes a subtractor 211, a horizontal smoothing processor 212, a first mixer 213, a vertical smoothing processor 214, a second mixer 215, and an absolute value calculator 216.

The moving block coefficient dfmat input from the pattern matching detector 30 to the frame difference calculator 21 indicates a degree of motion reflecting vertical pattern motion in the pixel block. The edge decision coefficients efkm input from the edge detector 40 are the vertical edge decision coefficient vedgfk indicating the degree of vertical edge component (horizontal line) and the horizontal edge decision coefficient hedgfk indicating the degree of horizontal edge component (vertical line).

The subtractor 211 in the frame difference calculator 21 in FIG. 12 receives the current frame signal Di0 and the one-frame delayed signal d2f. The subtractor 211 calculates differences between in-phase pixels in the one-frame delayed signal d2f and the current frame signal Di0. The difference Dn obtained for the pixel of interest is the difference in pixel value of the pixel of interest in the current frame signal Di0 and the pixel in the matching position in the one-frame delayed signal d2f.

The horizontal smoothing processor 212 receives the difference Dn obtained by the subtractor 211 and performs a smoothing process on a horizontal pixel extent. That is, the difference Dn at the position of the pixel of interest P0 is averaged with the differences Dn within an extent of horizontally adjacent pixel positions centered on the pixel of interest P0, and the resulting mean value is output as a horizontally smoothed difference hlpd obtained by performing a smoothing process on the given horizontal pixel extent. In the averaging process, a weighted average may be taken instead of taking a simple average of differences in the horizontal direction.

For example, the smoothing process may be performed as a horizontal LPF process that takes a weighted average in which the weights increase as the pixel position approaches the center position.

When the difference Dn is smoothed within a given horizontal extent in the horizontal smoothing processor 212, if there is a moving horizontal edge such as a moving vertical line, since the differences Dn of pixels near the horizontal edge are averaged, any abrupt change disappears (a low frequency component is obtained), and the smoothed values become small despite the presence of motion.

In particular, if there is a moving object with a repetitive pattern of vertical lines, positive differences alternate with negative differences, so that the smoothed values become quite small, despite the presence of motion.

In flat parts of the image or parts without horizontal edge components, however, the smoothing process can reduce the effect of high frequency noise components on the differences.

The first mixer 213 obtains a horizontally mixed difference hdf by mixing the difference Dn from the subtractor 211 and the horizontally smoothed difference hlpd from the horizontal smoothing processor 212 in accordance with the first horizontal edge decision coefficient hedg_fk in the first edge decision coefficients efkm from the edge detector 40.

This horizontal edge decision coefficient hedg_fk depends on the degree of presence of a horizontal edge component (vertical line). The first mixer 213 mixes the difference Dn and the horizontally smoothed difference hlpd in accordance with the horizontal edge decision coefficient hedg_fk, as in the following equation (26), for example.

$$hdf = (1 - hedg\_fk) \times hlpd + hedg\_fk \times Dn \quad (26)$$

If the mixing is carried out as in equation (26) and the value of the horizontal edge decision coefficient ranges from '0' to '1', a horizontally mixed difference hdf obtained by mixing the difference Dn and the horizontally smoothed difference hlpd in a mixing ratio responsive to the value of the horizontal edge decision coefficient hedg_fk is output. When the horizontal edge decision coefficient hedg_fk is '1', indicating the presence of a horizontal edge component, the difference Dn itself is output as the horizontally mixed difference hdf. If the horizontal edge decision coefficient hedg_fk is '0', the horizontally smoothed difference hlpd is output as the horizontally mixed difference hdf.

A difference that has been smoothed within an appropriate extent in accordance with the value of the horizontal edge decision coefficient hedg_fk is thereby obtained.

The first mixer 213 may select the difference Dn when the horizontal edge decision coefficient hedg_fk is equal to or greater than a given value (e.g., hedg_fk=1, for example) and may select the horizontally smoothed difference hlpd otherwise. This type of selection process can be regarded as a mixing process in which the mixing ratio is either '1' or '0'.

The moving block coefficient dfmat from the pattern matching detector 30 could be used to have the first mixer 213 select the difference Dn when there is a moving pattern and the horizontal edge decision coefficient hedg_fk indicates the presence of a horizontal edge component. When there is a horizontal edge component (vertical line), however, failure to detect the difference as motion could lead to a failure to detect motion. It is therefore better to obtain the horizontally mixed difference hdf in accordance with the horizontal edge decision coefficient hedg_fk, regardless of whether there is pattern motion, so that a difference that can be detected as motion can be obtained.

The vertical smoothing processor 214 receives the horizontally mixed difference hdf from the first mixer 213 and performs a smoothing process over a vertical pixel extent. That is, the horizontally mixed difference hdf at the pixel of interest P0 is averaged with the horizontally mixed differences hdf within an extent of vertically adjacent pixel positions centered on the pixel of interest P0, and the resulting mean value is output as a vertically smoothed difference vlpd obtained by performing a smoothing process on the given vertical pixel extent. In the averaging process, a weighted average may be taken instead of taking a simple average of differences in the vertical direction. For example, the smoothing process may be performed as a vertical LPF process that takes a weighted average in which the weights increase as the pixel position approaches the center position.

When the horizontally mixed difference hdf is smoothed within a given vertical extent in the vertical smoothing processor 214, if there is a moving vertical edge such as a moving horizontal line, since the differences hdf of pixels near the vertical edge are averaged, any abrupt change disappears (a low frequency component is obtained), and the smoothed values become small despite the presence of motion.

In particular, if there is a moving object with a repetitive pattern of horizontal lines, positive differences alternate with negative differences, so that the smoothed values become quite small, despite the presence of motion.

In flat parts of the image or parts without vertical edge components, however, the smoothing process can reduce the effect of high frequency noise components on the differences.

Even when a vertical edge component such as a horizontal line is present, if the edge is stationary or moves in the horizontal direction, the reduction in difference value due to the vertical smoothing process will not lead to a failure to detect motion.

The second mixer 215 obtains a mixed difference dif by mixing the horizontally mixed difference hdf from the mixer 213 and the vertically smoothed difference vlpd from the vertical smoothing processor 214 in accordance with the first moving block coefficient dfmat output from the pattern matching detector 30 and the first vertical edge decision coefficient vedg_fk in the first edge decision coefficients efkm output from the edge detector 40.

The moving block coefficient dfmat reflects the degree of block motion reflecting vertical pattern motion in the pixel block, and the vertical edge decision coefficient vedg_fk reflects the degree of presence of a vertical edge component (horizontal line). The mixer 215 operates by, for example, multiplying the vertical edge decision coefficient vedg_fk by the moving block coefficient dfmat to obtain a mixing ratio vdk ranging from '0' to '1' (vdk=vedg_fk×dfmat), and then mixing the horizontally mixed difference hdf and the vertically smoothed difference vlpd according to the mixing ratio vdk, as in the following equation (27).

$$dif = (1 - vdk) \times vlpd + vdk \times hdf \quad (27)$$

If the moving block coefficient dfmat is '1', indicating vertical pattern motion, and the vertical edge decision coefficient vedg_fk is '1', indicating the presence of a vertical edge component, the moving pattern is a horizontal line component or vertical edge and the mixing ratio vdk is '1'.

When the value of the mixing ratio vdk is between '0' and '1', the mixed difference dif is obtained by mixing the horizontally mixed difference hdf and the vertically smoothed difference vlpd in accordance with the mixing ratio vdk. When the mixing ratio vdk is '1', the horizontally mixed difference hdf itself is output as the mixed difference dif. When the mixing ratio vdk is '0', the vertically smoothed difference vlpd is output as the mixed difference dif.

A difference that has been smoothed within an appropriate extent in accordance with the moving block coefficient dfmat and the vertical edge decision coefficient vedg_fk is thereby obtained.

The mixer 215 may select the horizontally mixed difference hdf when both the moving block coefficient dfmat and the vertical edge decision coefficient vedg_fk exceed a given value (such as '1') and select the vertically smoothed difference vlpd otherwise. This type of selection process can be regarded as a mixing process in which the mixing ratio is either '1' or '0'. With the mixing process expressed by equation (27), the selection of the horizontally mixed difference hdf and the vertically smoothed difference vlpd can be switched smoothly, and more accurate differences can be obtained.

The absolute value calculator 216 receives the mixed difference dif from the second mixer 215, calculates the absolute value of the mixed difference dif, and outputs it as the frame difference frd.

The absolute value of the frame difference obtained by the absolute value calculator 216 is output as the frame difference frd from the frame difference calculator 21. When the horizontal edge decision coefficient hedg_fk indicates the presence of a horizontal edge component (vertical line), the frame difference frd is obtained after a vertical smoothing process, without horizontal smoothing. When the moving block coefficient dfmat indicates vertical pattern motion and the vertical edge decision coefficient vedg_fk indicates the presence of a vertical edge component (horizontal line), the frame difference is obtained after a horizontal smoothing process, without vertical smoothing. In other cases, the frame difference is obtained after both horizontal and vertical smoothing processes. The effect of switching the extent of the smoothing process in the frame difference calculator 21 in accordance with edge direction and pattern motion in the image is that accurate frame differences, smoothed within appropriate extents, can be obtained, avoiding the mistaken detection of a still part as moving due to noise, or the mistaken detection of a moving part as still due to failure to detect motion.

Since the extent of the smoothing process in the frame difference calculator 21 is switched not according to a threshold but according to a mixing ratio determined from the moving block coefficient dfmat and edge decision coefficients efkm, a smooth switchover can be made between selecting the horizontally mixed difference hdf and selecting the vertically smoothed difference vlpd, making it possible to obtain an accurate, stable frame difference.

In the frame difference calculator 21 in FIG. 12, the frame difference frd is obtained from the vertical smoothing processor 214 and second mixer 215, which are disposed in a stage succeeding the horizontal smoothing processor 212 and first mixer 213, but the order of the horizontal smoothing process and the vertical smoothing process may be reversed; the vertical smoothing processor 214 and second mixer 215 may precede the horizontal smoothing processor 212 and first mixer 213. Similar frame differences are still obtained.

To generalize, it is sufficient if the frame difference calculator (21) includes a subtractor (211) that obtains the signal difference between the pixel of interest in the current frame and another pixel in the same position in the frame one frame before, a first horizontal smoothing processor (212 or 214) that performs smoothing in a first direction, which may be either the horizontal direction and the vertical direction, a first mixer (213 or 215) that mixes the signal smoothed by the first horizontal smoothing processor (212 or 214) with the output of the subtractor (211), a second vertical smoothing processor (214 or 212) that performs smoothing in a second direction (the other direction) on the output of the first mixer (213 or 215), and a second mixer (215 or 213) that mixes the signal smoothed by the second vertical smoothing processor (214 or 212) with the output of the first mixer (213 or 215), and outputs a frame difference frd based on the output of the second mixer (215 or 213).

Figure 13:
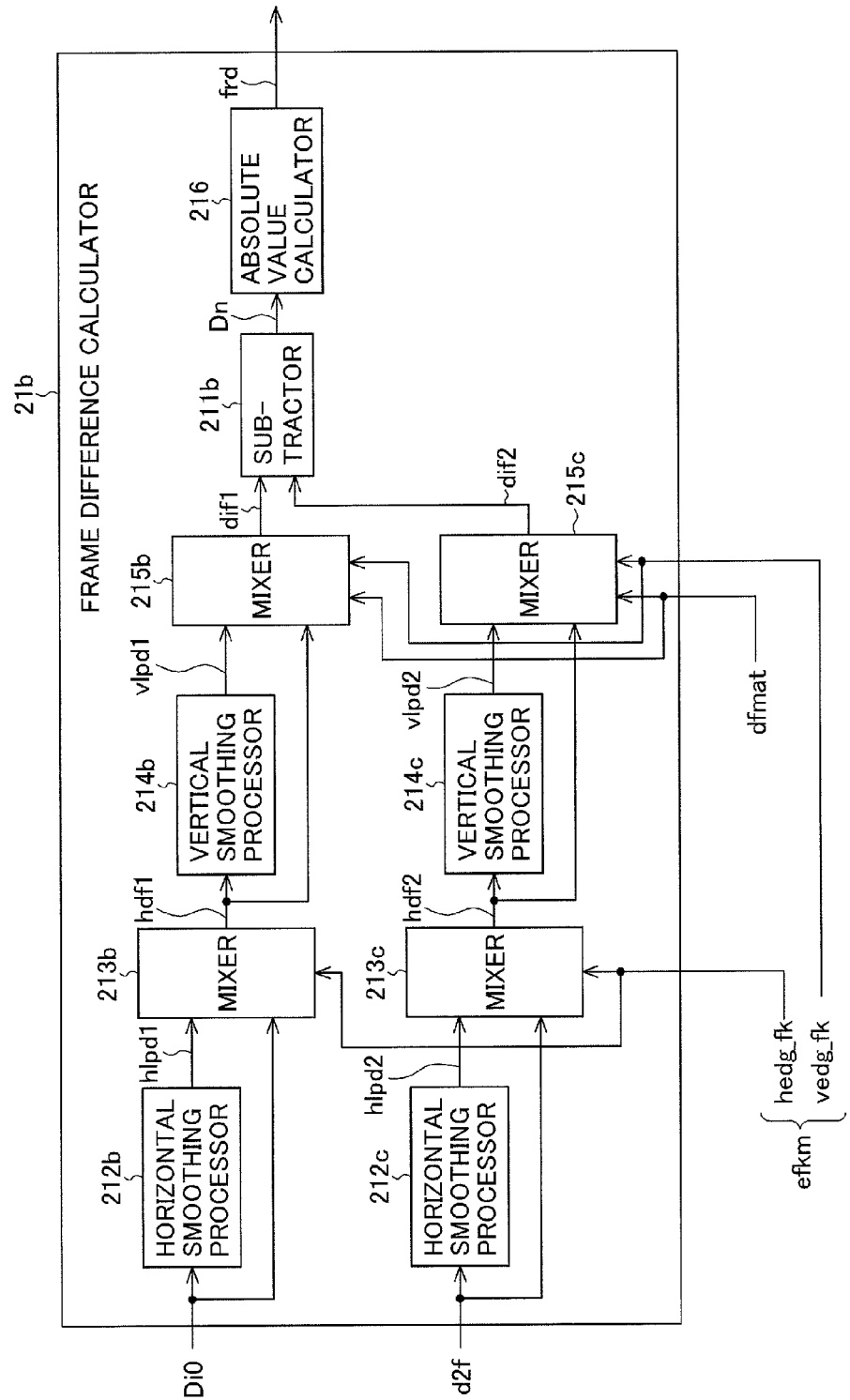
FIG. 13 is a block diagram showing an another exemplary configuration of the frame difference calculator in the frame difference detector used in the first embodiment.

The frame difference calculator 21b in FIG. 13 may be used instead of the frame difference calculator 21 in FIG. 12. The frame difference calculator 21b in FIG. 13 performs the smoothing process similar to that described in connection with FIG. 12 on the current frame signal Di0 and the one-frame delayed signal d2f separately, and then obtains the frame difference value by performing a subtraction process on the smoothed one-frame delayed signal d2f and the smoothed current frame signal Di0.

In FIG. 13, components identical to or corresponding to components in FIG. 12 are denoted by the same reference numeral with a 'b' or 'c' suffix. The horizontal smoothing processors 212b, 212c, mixers 213b, 213c, vertical smoothing processors 214b, 214c, and mixers 215b, 215c are similar in configuration to the horizontal smoothing processor 212, mixer 213, vertical smoothing processor 214, and mixer 215 in FIG. 12, but they receive video signal pixel values instead of difference values. The subtractor 211b performs a subtraction process on the pixel value dif1 output from mixer 215b and the pixel value dif2 output from mixer 215c.

As in FIG. 12, the extent of the smoothing process is changed in accordance with edge direction and pattern motion in the image and an absolute value is taken to obtain a frame difference frd smoothed within an appropriate extent.

The nonlinear conversion unit 22 in the frame difference detector 20 in FIG. 1 performs a nonlinear conversion on the frame difference frd from the frame difference calculator 21 (or 21b) and generates a frame difference signal fdiff.

The nonlinear conversion is performed by multiplying the frame difference frd by a given sensitivity magnification factor Tmf, subtracting a given offset value Tof, and limiting the result to a given range (e.g., 0 to dM). The result is output to the motion information corrector 50 as the frame difference signal fdiff.

The frame difference detector 20 may output the frame difference frd directly as the frame difference signal fdiff, in which case the nonlinear conversion unit 22 may be omitted.

Figure 14:
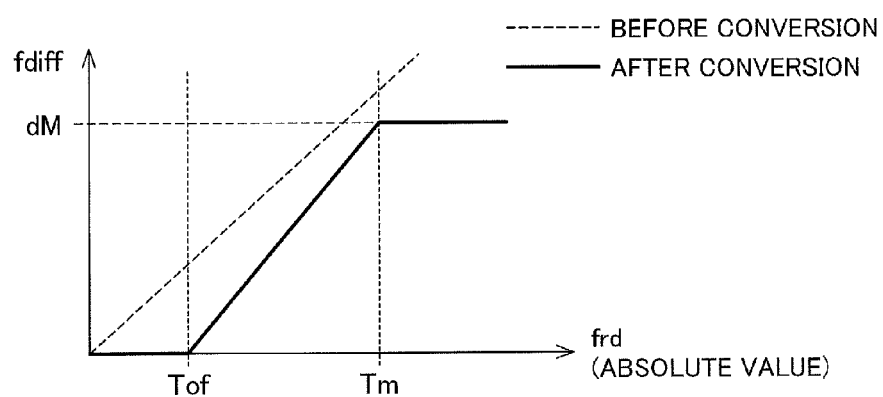
FIG. 14 shows an exemplary input-output characteristic of the nonlinear conversion unit in the frame difference detector used in the first embodiment.

FIG. 14 shows the input-output characteristic of the nonlinear conversion unit 22, showing an exemplary relationship between the input frame difference frd (shown on the horizontal axis) and the output frame difference signal fdiff (shown on the vertical axis). In the example shown, when the frame difference frd is equal to or greater than a given value Tm, the output frame difference signal fdiff has a constant value dM. When the frame difference frd is equal to or less than an offset value Tof, the frame difference signal fdiff is '0', and is treated as a minor noise component.

When the frame difference frd is between the offset value Tof and the given value Tm, the frame difference signal fdiff increases from '0' to dM as the frame difference frd increases, indicating increasing amounts of motion or noise.

When the sensitivity magnification factor Tmf is increased, the frame difference frd is converted to a frame difference signal fdiff with larger values, indicating greater amounts of motion or noise, so that the signal is more easily recognized as including motion or noise exceeding a given level. Increasing the offset value Tof increases the value up to which the difference is treated as a minor noise component (a still part of the image). The sensitivity in detection of motion by means of the frame difference can accordingly be adjusted by adjusting the sensitivity magnification factor Tmf and the offset value Tof.

If the sensitivity magnification factor Tmf is made too large, however, then even differences due to noise or unsteadiness in the video signal, which are smaller than differences due to motion, will be converted to motion-like differences. The converted frame difference signal fdiff will have such large values that even still parts of the image will be mistakenly detected as moving.

If the offset value Tof is too large, the converted frame difference signal fdiff will be '0' in parts that are actually moving, and these moving parts will be mistakenly detected as still (the motion will be missed). The sensitivity magnification factor Tmf and the offset value Tof should be specified carefully to avoid these types of false detection.

Since the frame difference frd output from the frame difference calculator 21 (or 21b) is obtained by smoothing within an appropriate extent switched in accordance with edge direction and pattern motion in the image and this switching can prevent the false detection of still parts as moving due to noise etc. and the failure to detect motion where present, the sensitivity magnification factor Tmf in the frame difference detector 20 need not be extremely large and the offset value Tof need not be extremely large or small.

Since the frame difference detector 20 obtains the frame difference having been smoothed within an appropriate extent responsive to edge direction and pattern motion in the image by selecting the smoothing extent in the calculation of the frame difference fdiff in accordance with the moving block coefficient dfmat and the edge detection coefficients efkm, the frame difference detector 20 can output an accurate frame difference signal fdiff.

The motion information corrector 50 in FIG. 1 receives the frame difference signal fdiff from the frame difference detector 20, the moving block coefficients cbmat from the pattern matching detector 30, and the edge decision coefficients cedkm from the edge detector 40.

The motion information corrector 50 modifies the frame difference signal fdiff in accordance with the moving block coefficients cbmat and the edge decision coefficients cedkm and outputs the motion information signal md0 to the spatial and temporal expansion filtering unit 16. Modifying the frame difference signal fdiff in accordance with the moving block coefficients cbmat and the edge decision coefficients cedkm enables the frame difference signal fdiff to be corrected to a value that can be more recognized easily as moving in edges or patterns where moving areas tend to be misrecognized as still.

Figure 15:
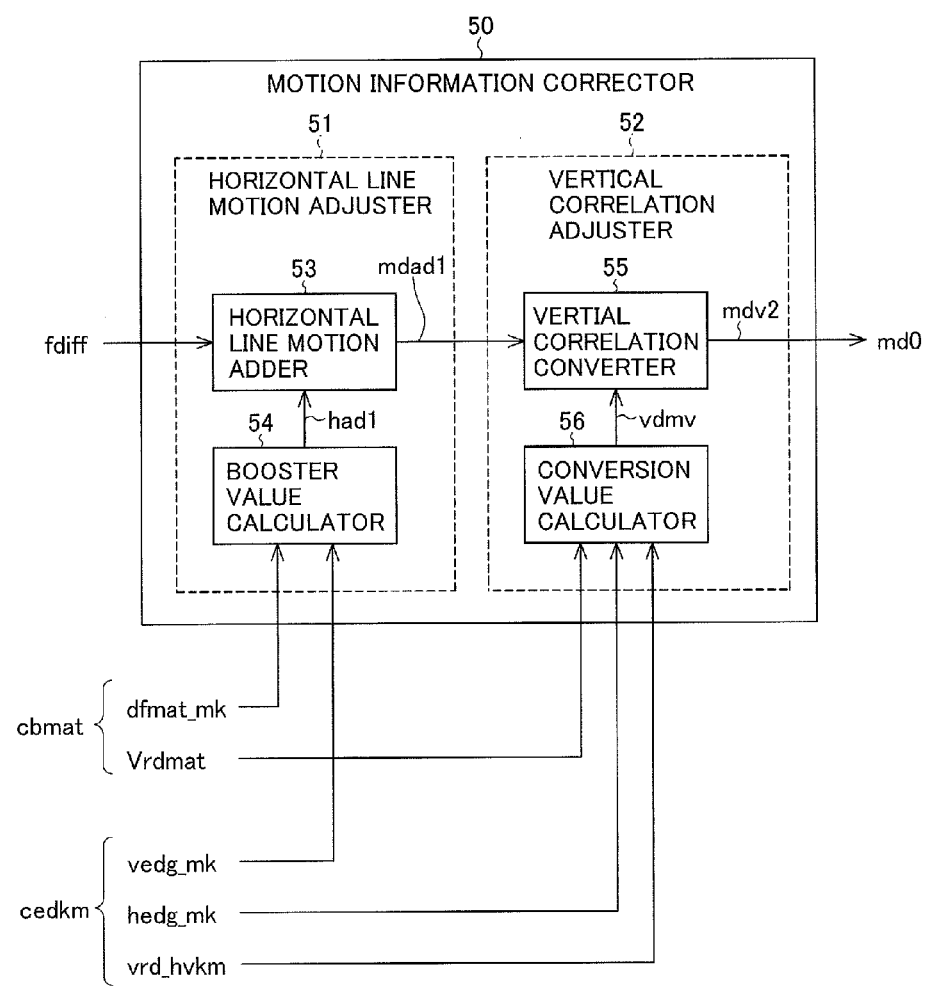
FIG. 15 is a block diagram showing an exemplary configuration of the motion information corrector used in the video signal processing device in the first embodiment.

The motion information corrector 50 is configured as shown, for example, in FIG. 15.

The motion information corrector 50 in FIG. 15 includes a horizontal line motion adjuster 51, which performs a correction for horizontal lines (vertical edges) moving vertically, and a vertical correlation adjuster 52, which performs a correction when vertically aligned pixels as in a vertical line (horizontal edge) are strongly correlated. The horizontal line motion adjuster 51 includes a horizontal line motion adder 53 and a booster value calculator 54. The vertical correlation adjuster 52 includes a vertical correlation converter 55 and a conversion value calculator 56.

The second moving block coefficients cbmat input from the pattern matching detector 30 to the motion information corrector 50 include a horizontal line moving block coefficient dfmat_mk reflecting vertical pattern motion and a vertical line moving block coefficient Vrdfmat reflecting horizontal pattern motion. The second edge decision coefficients cedkm input from the edge detector 40 include the vertical edge decision coefficient vedg_mk indicating the degree of presence of a vertical edge component (horizontal line), the non-vertical edge decision coefficient vrd_hvkm indicating the degree of absence of a vertical edge, and the horizontal edge decision coefficient hedg_mk indicating the degree of presence of a horizontal edge component (vertical line).

The horizontal line motion adjuster 51 in FIG. 15 receives the frame difference signal fdiff from the frame difference detector 20, the vertical edge decision coefficient vedg_mk from the edge detector 40, and the horizontal line moving block coefficient dfmat_mk from the pattern matching detector 30.

The horizontal line motion adjuster 51 corrects the value of the frame difference signal fdiff in accordance with the vertical edge decision coefficient vedg_mk and the horizontal line moving block coefficient dfmat_mk, obtains corrected motion information mdad1 reflecting the motion of a horizontal line in the vertical direction, and outputs this information to the vertical correlation adjuster 52 in the motion information corrector 50.

When an object with a repetitive pattern of horizontal lines moves in the vertical direction, the smoothed differences are likely to be small despite the motion. Even though the frame difference detector 20 obtains the frame difference frd by switching the smoothing extent in accordance with edge direction and pattern motion, if the difference value itself is close to '0', detection of the motion may fail.

The vertical edge decision coefficient vedg_mk from the edge detector 40 indicates the degree of presence of a vertical edge component (horizontal line), and the horizontal line moving block coefficient dfmat_mk from the pattern matching detector 30 indicates the degree of block motion reflecting the vertical pattern motion. These two coefficients enable the horizontal line motion adjuster 51 to detect vertical motion of an object with horizontal lines and to make a corresponding adjustment. For example, motion information based on the frame difference signal fdiff can be corrected by calculating a certain booster value (offset value or first conversion value) had1 from the vertical edge decision coefficient vedg_mk and horizontal line moving block coefficient dfmat_mk and adding this booster value had1 to the frame difference signal fdiff.

More specifically, the booster value calculator 54 in the horizontal line motion adjuster 51 calculates the booster value had1 for correcting the frame difference signal fdiff in accordance with the second vertical edge decision coefficient vedg_mk in the second edge decision coefficients cedkm and the horizontal line moving block coefficient dfmat_mk in the second moving block coefficients cbmat.

For example, a certain value Adm1 may be set in the booster value calculator 54, and the booster value calculator 54 may multiply the vertical edge decision coefficient vedg_mk by the horizontal line moving block coefficient dfmat_mk to obtain a coefficient k1 taking values from '0' to '1' (by $$k1 = vedg\_mk \times dfmat\_mk$$

for example), then multiply the set value Adm1 by coefficient k1 as in the following equation (28) to obtain the booster value had1.

$$had1 = k1 \times Adm1 \quad (28)$$

When the horizontal line moving block coefficient dfmat_mk is '1', indicating vertical pattern motion, and the vertical edge decision coefficient vedg_mk is '1', indicating the presence of a vertical edge component, coefficient k1 is '1', indicating a moving pattern that has a horizontal line component or vertical edge and is moving in the vertical direction.

If the value Adm1 is converted in accordance with coefficient k1 as in equation (28) above, when coefficient k1 is '1', the value Adm1 itself is output as the booster value had1, and when coefficient k1 is '0', the booster value had1 is '0'. When coefficient k1 is between '0' and '1', the value Adm1 is converted in accordance with coefficient k1 and output as the booster value had1. When an object with horizontal lines moves vertically, the booster value had1 is generated with its maximum value of Adm1 in accordance with the vertical edge decision coefficient vedg_mk and horizontal line moving block coefficient dfmat_mk.

The booster value had1 need not be obtained by the multiplication by the coefficient k1 described above. It may be obtained by selecting the set value Adm1 when both the horizontal line moving block coefficient dfmat_mk and the vertical edge decision coefficient vedg_fk are equal to or greater than predetermined values (such as '1') and selecting '0' otherwise. Alternatively, values of the booster value had1 corresponding to values of the horizontal line moving block coefficient dfmat_mk and vertical edge decision coefficient vedg_fk may be specified in a LUT, which is then used to convert the horizontal line moving block coefficient dfmat_mk output from the pattern matching detector 30 and the vertical edge decision coefficient vedg_fk output from the edge detector 40 to a corresponding value had1. The multiplication operation described above, however, enables the booster value to be switched smoothly, so that a more appropriate booster value had1 can be obtained.

The horizontal line motion adder 53 receives the frame difference signal fdiff from the frame difference detector 20 and the booster value had1 from the booster value calculator 54. The horizontal line motion adder 53 corrects the frame difference signal fdiff by adding the booster value had1 to the frame difference signal fdiff, thereby generating corrected motion information mdad1 that has been boosted in the direction of motion detection (in such a direction that motion is more easily recognized) when a horizontal line moves in the vertical direction.

Instead of having the horizontal line motion adder 53 in the horizontal line motion adjuster 51 make the correction by adding the booster value had1 to the frame difference signal fdiff, the frame difference signal fdiff may be multiplied by a booster coefficient (greater than 1) that varies according to the moving block coefficient dfmat_mk and vertical edge decision coefficient vedg_fk. Alternatively, a predetermined value indicative of motion (for example, the maximum value indicating motion) may be selectively output instead of the frame difference signal fdiff. A similar effect can be obtained by any correction that adjusts the value of the frame difference signal fdiff in the direction of motion detection (in such a direction that motion is more easily recognized) in accordance with the values of the moving block coefficient dfmat_mk and vertical edge decision coefficient vedg_fk, (adjusting the value to a value that is more easily detected as motion) and thereby obtains corrected motion information mdad1 that takes account of vertical motion of horizontal lines.

The horizontal line motion adjuster 51 can thus provide corrected motion information mdad1 that has been altered in accordance with the vertical edge decision coefficient vedg_mk and horizontal line moving block coefficient dfmat_mk to facilitate the detection of motion when a horizontal line moves in the vertical direction, and can prevent the false detection of nonexistent motion and the failure to detect real motion.

The vertical correlation adjuster 52 in the motion information corrector 50 receives the corrected motion information mdad1 from the horizontal line motion adjuster 51, the horizontal edge decision coefficient hedg_mk and the non-vertical edge decision coefficient vrd_hvkm from the edge detector 40, and the vertical line moving block coefficient Vrdfmat from the pattern matching detector 30.

The vertical correlation adjuster 52 modifies the value of the corrected motion information mdad1 based on the frame difference signal fdiff in accordance with the horizontal edge decision coefficient hedg_mk, non-vertical edge decision coefficient vrd_hvkm, and vertical line moving block coefficient Vrdfmat and generates corrected motion information mdv2 that takes account of the motion of vertically correlated pixels, as in a moving vertical line. The corrected motion information mdv2 is output as the motion information signal md0 from the motion information corrector 50 to the spatial and temporal expansion filtering unit 16.

When an object with a repetitive pattern of vertical lines moves in the horizontal direction, the smoothed differences are likely to be particularly small despite the motion. Even though the frame difference detector 20 obtains the frame difference frd by switching the smoothing extent in accordance with edge direction and pattern motion, if the difference value itself is close to '0', detection of the motion may fail.

The horizontal edge detection coefficient hedg_mk from the edge detector 40 indicates the degree of presence of a horizontal edge component (vertical line), the non-vertical edge detection coefficient vrd_hvkm indicates the degree of absence of a vertical edge (the degree of presence of a pattern that is not a vertical edge or horizontal line), and the vertical line moving block coefficient Vrdfmat from the pattern matching detector 30 indicates the degree of block motion reflecting the horizontal pattern motion.

These three coefficients enable the vertical correlation adjuster 52 to detect horizontal motion of an object with vertical lines and make a corresponding adjustment. For example, the corrected motion information mdad1 may be further corrected by calculating a certain booster value (offset value) ad2 and magnification factor m12 (greater than '1') from the horizontal edge detection coefficient hedg_mk, non-vertical edge decision coefficient vrd_hvkm, and vertical line moving block coefficient Vrdfmat, then adding the booster value ad2 and multiplying the sum by the magnification factor m12.

More specifically, the conversion value calculator 56 in the vertical correlation adjuster 52 calculates conversion coefficients (second conversion values) vdmv including the booster value (offset value) ad2 and magnification factor m12 for correcting the corrected frame difference signal or motion information mdad1 in accordance with the horizontal edge decision coefficient hedg_mk and non-vertical edge decision coefficient vrd_hvkm in the second edge decision coefficients cedkm and the vertical line moving block coefficient Vrdfmat in the second moving block coefficients cbmat.

For example, a certain value Adm2 and a magnification factor Md2 may be set in the conversion value calculator 56 and the conversion value calculator 56 may multiply the horizontal edge decision coefficient hedg_mk, non-vertical edge decision coefficient vrd_hvkm, and vertical line moving block coefficient Vrdfmat together to obtain a coefficient k2 taking values from '0' to '1' (by the operation $$k2 = hedg\_mk \times Vrdfmat \times vrd\_hvkm$$

for example), then multiply the set value Adm2 and magnification factor Md2 by coefficient k2 as in equations (29) and (30) below to obtain the booster value ad2 and the magnification factor m12 that constitute the conversion coefficients vdmv.

$$ad2 = k2 \times Adm2 \tag{29}$$

$$m12 = k2 \times Md2 \tag{30}$$

When the vertical line moving block coefficient Vrdfmat is '1', indicating horizontal pattern motion, the horizontal edge decision coefficient hedg_mk is '1', indicating the presence of a horizontal edge component, and the non-vertical edge decision coefficient vrd_hvkm is '1', indicating the absence of a vertical edge component, coefficient k2 is '1', indicating horizontal pattern motion in the presence of a horizontal edge or vertical line component alone. If the value Adm2 and magnification factor Md2 are converted in accordance with coefficient k2 as in equations (29) and (30), when coefficient k2 is '1', the value Adm2 itself is output as the booster value ad2, and magnification factor Md2 itself is output as magnification factor mdl2. When coefficient k2 is '0', the booster value ad2 and magnification factor m12 are both '0'.

When coefficient k2 is between '0' to '1', the Adm2 value and magnification factor Md2 are converted in accordance with coefficient k2 and output as the booster value ad2 and magnification factor m12. Accordingly, when an object with only vertical lines moves in the horizontal direction, the booster value ad2 and magnification factor m12 are generated with respective maximum values of Adm2 and Md2 in accordance with the horizontal edge decision coefficient hedg_mk, non-vertical edge decision coefficient vrd_hvkm, and vertical line moving block coefficient Vrdfmat. The booster value ad2 and magnification factor m12 thus generated are output from the conversion value calculator 56 as the conversion coefficients vdmv and supplied to the vertical correlation converter 55.

These conversion coefficients vdmv need not be obtained by multiplication by the coefficient k2 described above. They may be obtained by selecting the set value Adm2 and magnification factor Md2 when the horizontal edge decision coefficient hedg_mk, the non-vertical edge decision coefficient vrd_hvkm, and the vertical line moving block coefficient Vrdfmat are equal to or greater than a given value (such as '1') and selecting '0' otherwise.

Alternatively, values of the conversion coefficients vdmv corresponding to values of the horizontal edge decision coefficient hedg_mk, non-vertical edge decision coefficient vrd_hvkm, and vertical line moving block coefficient Vrdfmat may be specified in a LUT, which is then used to convert the input horizontal edge decision coefficient hedg_mk, non-vertical edge decision coefficient vrd_hvkm, and vertical line moving block coefficient Vrdfmat to the corresponding vdmv values. The multiplication operations described above, however, enable the conversion coefficients vdmv to be switched smoothly, so that more appropriate conversion coefficients vdmv can be obtained.

The coefficient k2 need not be obtained by using the horizontal edge decision coefficient hedg_mk, non-vertical edge decision coefficient vrd_hvkm, and vertical line moving block coefficient Vrdfmat. A coefficient k2 indicating motion of an object with vertical lines in the horizontal direction may be obtained by excluding the non-vertical edge decision coefficient vrd_hvkm. In that case, even if both vertical and horizontal line components are detected, when the vertical line moving block coefficient Vrdfmat indicates a moving pattern, the conversion coefficients vdmv will have non-zero values.

The vertical correlation converter 55 receives the corrected motion information mdad1 from the horizontal line motion adjuster 51 and the conversion coefficients vdmv from the conversion value calculator 56. The vertical correlation converter 55 corrects the value of the corrected motion information mdad1 by a scaling operation that multiplies the corrected motion information mdad1 by the magnification factor m12 included in the conversion coefficients vdmv, and then by adding the booster value ad2 to generate corrected motion information mdv2 that has been altered in the direction of motion detection (in such a direction that motion is more easily recognized) when pixels having a (strong) vertical correlation as in a vertical line move in the horizontal direction. The corrected motion information mdv2 is output from the motion information corrector 50 as the motion information signal md0.

Instead of making the correction by a conversion involving both a booster value ad2 and a magnification factor m12, the conversion value calculator 56 in the vertical correlation adjuster 52 may use only one of these two, either the booster value ad2 or the magnification factor m12, to effect a conversion in the direction of enlarging the frame difference signal. Alternatively, a predetermined value indicative of motion (for example, the maximum value indicating motion) may be selectively output instead of the corrected motion information mdad1. A similar effect can be obtained by any correction that adjusts the value of the corrected motion information mdad1 indicating the frame difference in the direction of motion detection (in such a direction that motion is more easily recognized) in accordance with the values of the horizontal edge decision coefficient hedg_mk, non-vertical edge decision coefficient vrd_hvmk, and vertical line moving block coefficient Vrdfmat (adjusting the value to a value that is more easily detected as motion) and thereby obtains corrected motion information mdv2 that takes account of horizontal motion of vertically correlated pixels, such as the pixels in a vertical line.

The vertical correlation adjuster 52 can thus provide corrected motion information mdv2 that has been altered in accordance with the horizontal edge decision coefficient hedg_mk, non-vertical edge decision coefficient vrd_hvkm, and vertical line moving block coefficient Vrdfmat to facilitate the detection of motion when an object with vertical correlation moves horizontally, and can prevent false detection of nonexistent motion and failure to detect real motion.

When a horizontal line moves in the vertical direction or when a moving pattern possesses vertical correlation, the motion information corrector 50 can thus correct the frame difference signal fdiff in accordance with the moving block coefficients cbmat from the pattern matching detector 30 and the edge decision coefficients cedkm from the edge detector 40 to facilitate the detection of motion, thereby obtaining a motion information signal md0 that takes account of edge direction and pattern motion. A highly accurate motion information signal md0 can therefore be obtained, preventing the false detection of nonexistent motion and failure to detect real motion.

Although the correction by the vertical correlation adjuster 52 is effected after the correction by the horizontal line motion adjuster 51 in the motion information corrector 50 in FIG. 15, the correction by the vertical correlation adjuster 52 may precede the correction by the horizontal line motion adjuster 51, or just one of the two corrections may be made.

Referring again to FIG. 1, the spatial and temporal expansion filtering unit 16 receives the motion information signal md0 from the motion information corrector 50. The spatial and temporal expansion filtering unit 16 performs processes such as spatial and temporal filtering and isolated point removal on the motion information signal md0, obtains a motion signal afmd by correcting the motion information in the spatial and temporal directions, and outputs it to the motion detection signal converter 19.

The temporal filtering section 17 in the spatial and temporal expansion filtering unit 16 performs a temporal expansion process on the input motion information signal md0 and make a correction that prevents false detection of nonexistent motion and failure to detect real motion.

The spatial filtering section 18 in the spatial and temporal expansion filtering unit 16 performs spatial filtering using a horizontal or vertical LPF, isolated point removal, and other filtering processes on the motion information signal to correct mistakenly detected nonexistent motion and real but non-detected motion in terms of the motion of pixels on the screen, and outputs a motion signal afmd.

The motion signal afmd processed by the spatial and temporal expansion filtering unit 16 has a value that is large when motion is large and the frame difference is detected as motion, and decreases to a small value close to '0' for still parts or noise. This value indicates the amount of image motion at the pixel undergoing motion detection.

The motion detection signal converter 19 receives the motion signal afmd from the spatial and temporal expansion filtering unit 16. The motion detection signal converter 19 converts the motion signal afmd to a motion detection signal mds indicating the degree of motion in the video signal.

Figure 16:
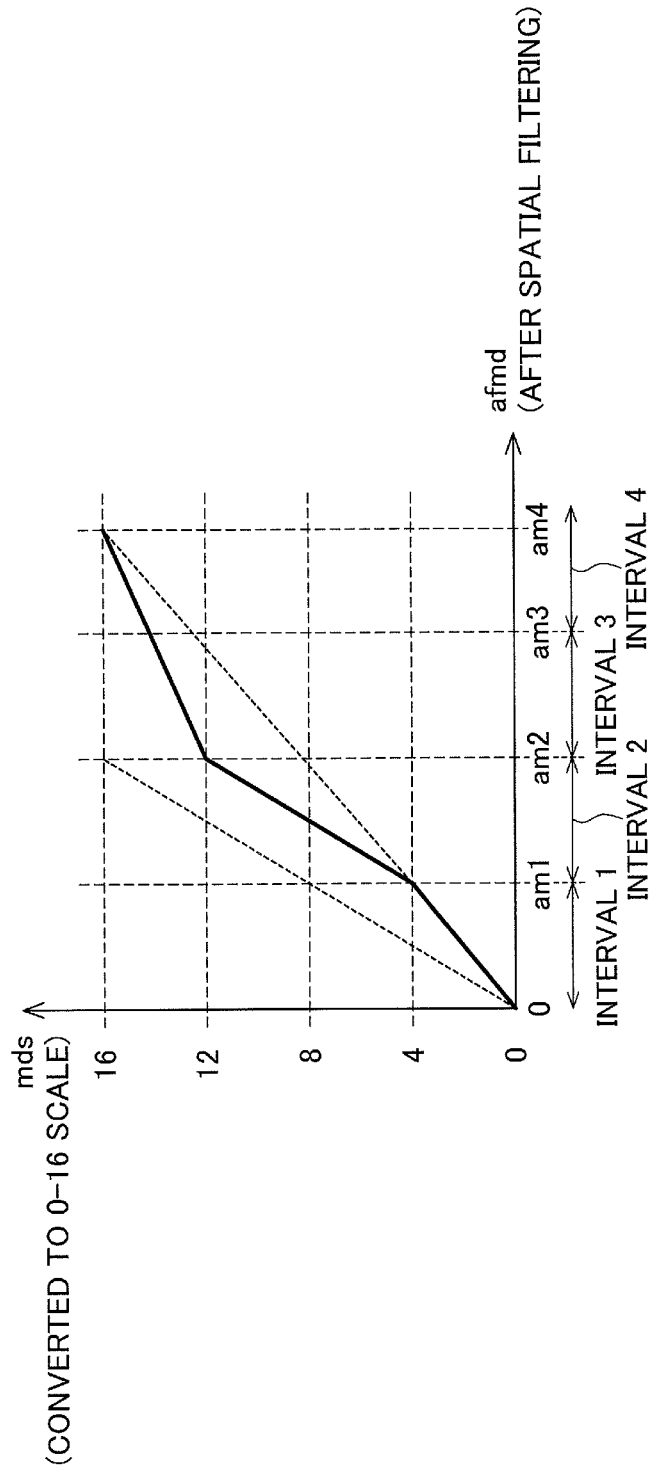
FIG. 16 shows an exemplary input-output characteristic of the motion detection signal converter used in the video signal processing device in the first embodiment.

FIG. 16 shows an exemplary input-output characteristic of the motion detection signal converter 19, illustrating the conversion of the motion information afmd (horizontal axis, input) to the motion detection signal mds (vertical axis, output), in which the motion detection signal mds is converted to a value ranging from '0' to '16', indicating different degrees of motion in the video signal. The value of the motion detection signal mds is obtained by a nonlinear conversion in accordance with the value of the motion signal afmd. A value of the motion signal afmd that is large and indicates motion (the highest degree of motion) is converted to '16', the maximum value of the motion detection signal mds. A signal indicating a still image is converted to a '0' value of the motion detection signal mds. The conversion may be carried out by use of a LUT provided to convert the motion signal afmd to the corresponding value of the motion detection signal mds, or by a nonlinear conversion involving operations such as multiplication of the motion signal afmd by given magnification factors and/or adding or subtracting values. The exemplary motion detection signal mds takes values ranging from '0' to '16', but it may have lower resolution, taking values ranging from '0' to '8', for example, or higher resolution. Alternatively, the value of the motion signal afmd may be output directly as the value of the motion detection signal mds, without performing a nonlinear conversion. The signal may be a binary signal indicating motion as '1' and still parts as '0'.

In the motion detection device 1 shown in FIG. 1, the pattern matching detector 30 generates moving block coefficients dfmat, dbmat by pattern matching to indicate pattern motion in the pixel blocks. The edge detector 40 generates edge decision coefficients efkm, cedkm indicating the degree of presence of edge components. The frame difference detector 20 generates a frame difference by selecting an appropriate smoothing extent in accordance with the generated block coefficients dfmat and edge decision coefficients efkm, which indicate pattern motion and edge direction in the image, and performing smoothing within the selected extent. The motion information corrector 50 generates a motion information signal md0 corrected in accordance with edge direction and pattern motion according to the generated moving block coefficients cbmat and edge decision coefficients cedkm.

Therefore, the motion detection device 1 can provide a motion detection signal mds indicating amounts of motion with high accuracy, without mistakenly detecting still parts as moving and without failing to detect moving parts.

A flowchart description of the operation of the video signal processing device in the first embodiment will now be given. Briefly, the frame delay unit 13 obtains a frame delayed signal and the motion detection device 1 obtains a frame difference signal indicating a smoothed difference between the delayed and undelayed video signals. The extent of smoothing in the frame differencing process is switched in accordance with edge direction and pattern motion, according to moving block coefficients obtained by pattern matching and edge decision coefficients obtained by edge detection. The frame difference signal is corrected in accordance with edge direction and pattern motion, and a motion detection signal mds indicating degrees of motion is output.

Figure 17:
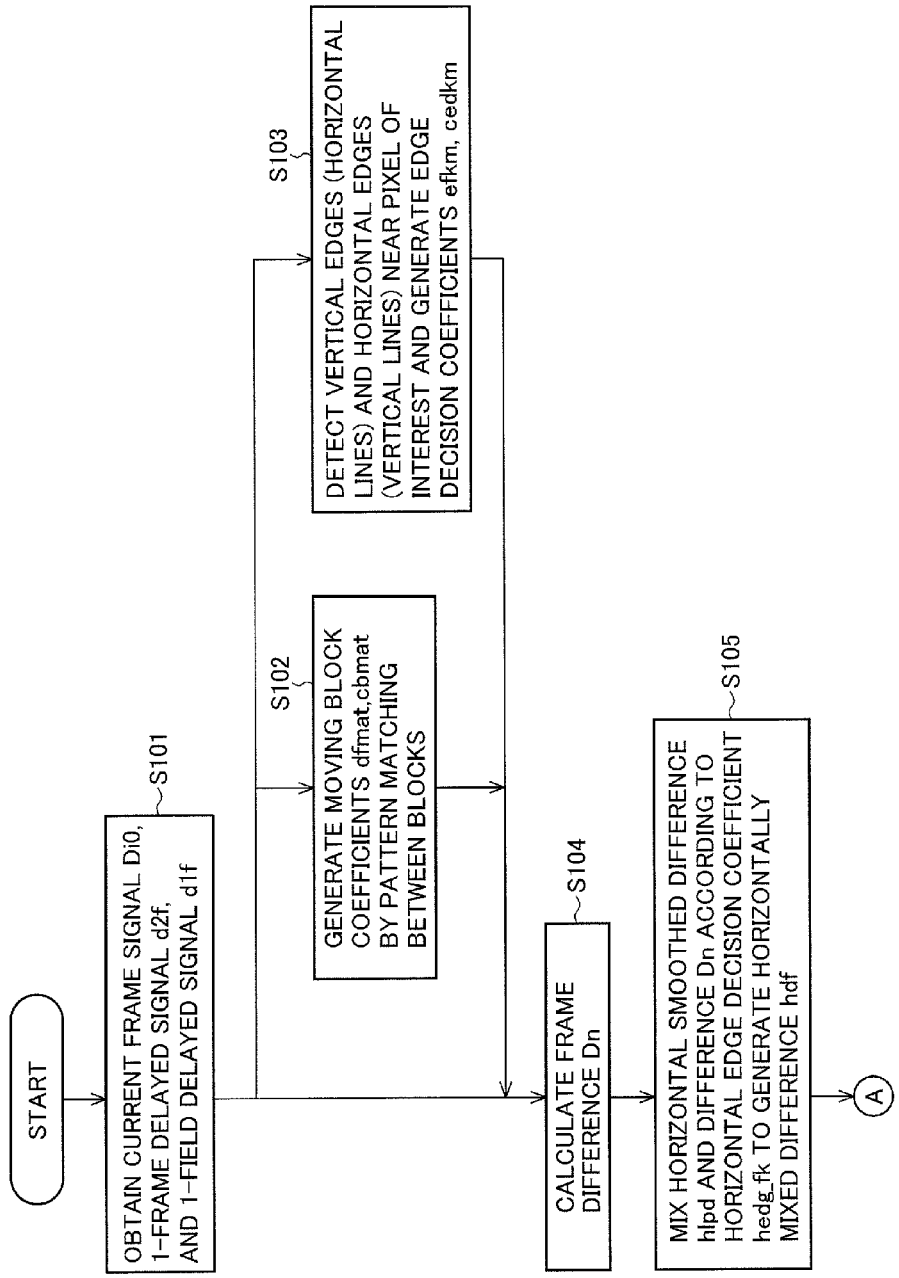
FIGS. 17 and 18 constitute a flowchart illustrating the operation of the motion detection device used in the video signal processing device in the first embodiment.
Figure 18:
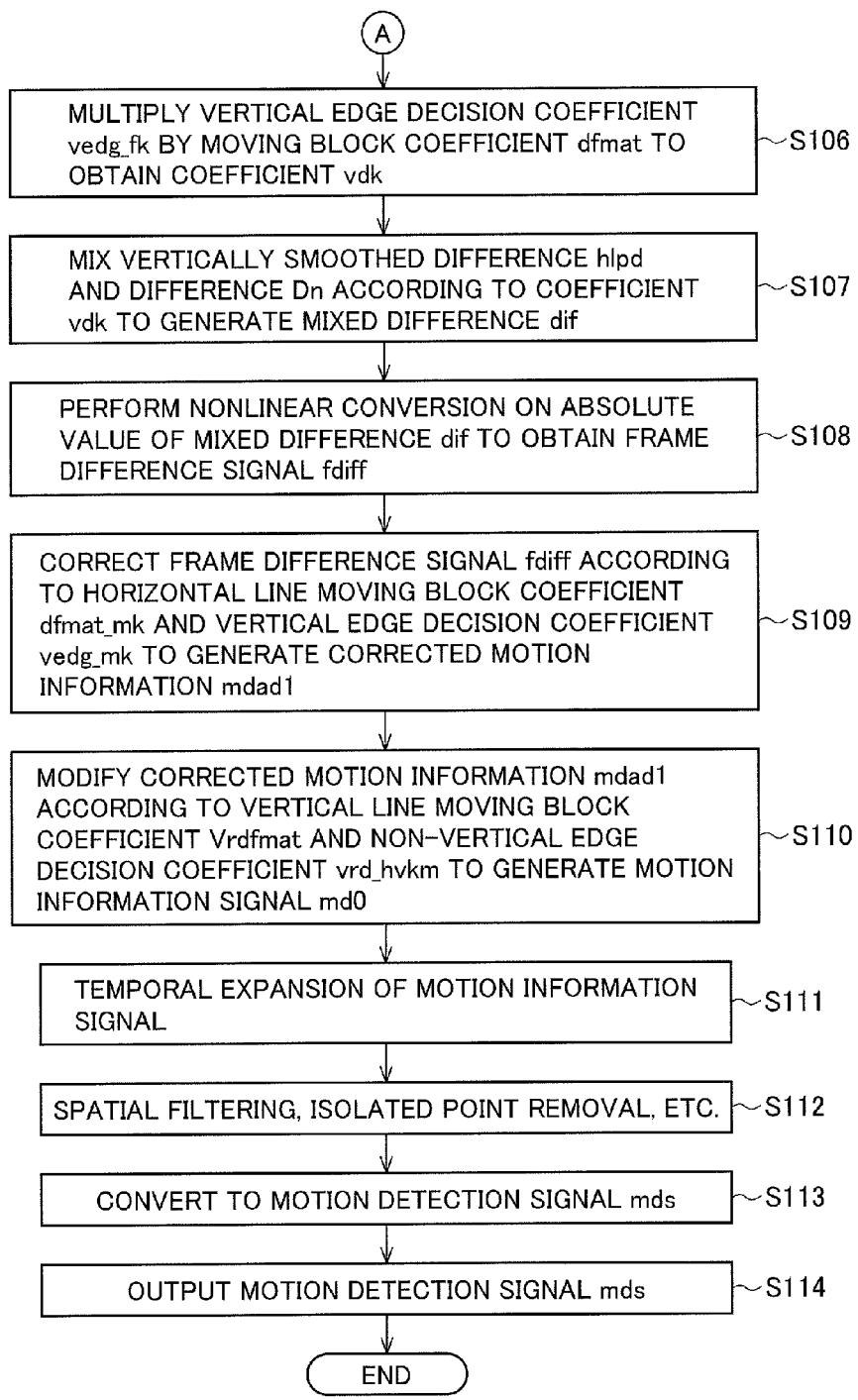

FIGS. 17 and 18 constitute a flowchart illustrating the operation of the motion detection device 1 in detecting image motion pixel by pixel in the video signal processing device in the first embodiment.

The frame delay unit 13 delays the input current frame signal Di0 and obtains a one-frame delayed signal d2f and one-field delayed signal d1f. The motion detection device 1 receives the current frame signal Di0, one-frame delayed signal d2f, and one-field delayed signal d1f (step S101).

The pattern matching detector 30 receives the current frame signal Di0 and the one-frame delayed signal d2f, calculates pattern similarity between the blocks in the one-frame delayed signal d2f and the current frame signal Di0, and generates moving block coefficients dfmat, cbmat indicating motion of the pixel blocks. The moving block coefficients dfmat, cbmat are obtained as results of pattern matching, and indicate pixel block motion and pattern motion (step S102).

The edge detector 40 detects whether there is an edge, or a part of contour of an object, in the vicinity of the pixel of interest P0, from the current frame signal Di0, one-frame delayed signal d2f, and one-field delayed signal d1f, and generates edge detection coefficients efkm, cedkm (step S103).

In the frame difference detector 20, the subtractor 211 in the frame difference calculator 21 calculates a frame-to-frame difference Dn between the current frame signal Di0 and the one-frame delayed signal d2f (step S104); the horizontal smoothing processor 212 smoothes the difference Dn to obtain a horizontally smoothed difference hlpd; the mixer 213 mixes the difference Dn and the horizontally smoothed difference hlpd in accordance with the horizontal edge decision coefficient hedg_fk in the edge decision coefficients efkm and obtains a horizontally mixed difference hdf.

The horizontally mixed difference hdf is generated by, for example, using the horizontal edge decision coefficient hedgfk as a mixing ratio to mix the difference Dn and the horizontally smoothed difference hlpd (step S105). This mixing operation is expressed by the following equation.

$$hdf=(1-hedg\_fk) \times hlpd + hedg\_fk \times Dn$$

The vertical smoothing processor 214 obtains a vertically smoothed difference vlpd by smoothing the horizontally mixed difference hdf; the mixer 215 mixes the horizontally mixed difference hdf and the vertically smoothed difference vlpd in accordance with the moving block coefficient dfmat and the vertical edge decision coefficient vedg_fk in the edge decision coefficients efkm to generate a mixed difference dif. For example, a conversion to a coefficient vdk ranging from '0' to '1' is effected by multiplying the vertical edge decision coefficient vedg_fk by the moving block coefficient dfmat (step S106). The value of the coefficient vdk increases as the degree of presence of a vertical edge component (horizontal line) increases and as the degree of motion increases.

The horizontally mixed difference hdf and the vertically smoothed difference vlpd are mixed, using the coefficient vdk as a mixing ratio, to generate the mixed difference dif (step S107). The mixing process is expressed by the following equation.

$$dif=(1-vdk) \times vlpd + vdk \times hdf$$

A frame difference signal fdiff is obtained through calculation of the absolute value of the mixed difference dif in the absolute value calculator 216 and a nonlinear conversion performed by the nonlinear conversion unit 22 (step S108).

Since the smoothing extent is selected in accordance with the moving block coefficient dfmat and the edge decision coefficients efkm in steps S102, S103, and S104 to S108, the frame difference is smoothed within an appropriate extent depending on edge direction and pattern motion, and the frame difference detector 20 outputs a highly accurate frame difference signal fdiff.

The frame difference signal fdiff output from the frame difference detector 20 is corrected by the motion information corrector 50 and output as a motion information signal md0. The frame difference signal fdiff is modified in accordance with the moving block coefficients cbmat and the edge decision coefficients cedkm to obtain a value that facilitates the detection of motion at edges or patterns that tend to be detected mistakenly as being still (steps S109, S110).

More specifically, the horizontal line motion adjuster 51 in the motion information corrector 50 calculates a given booster value from the vertical edge decision coefficient vedg_mk and the horizontal line moving block coefficient dfmat_mk and adds the booster value to the frame difference signal fdiff, thereby correcting the motion information based on the frame difference signal when there is vertical motion of a horizontal line, for example, and generates corrected motion information mdad1 (step S109).

The vertical correlation adjuster 52 in the motion information corrector 50 calculates a given booster value and a magnification factor (greater than '1') from a horizontal edge decision coefficient hedg_mk, non-vertical edge decision coefficient vrd_hvkm, and vertical line moving block coefficient Vrdfmat, converts the corrected motion information mdad1 by adding the booster value and multiplying by the magnification factor, and generates a motion information signal md0 (step S110). The corrected value facilitates the detection of moving patterns with vertical but not horizontal lines.

The motion information corrector 50 corrects the frame difference signal fdiff in accordance with the moving block coefficients cbmat and edge decision coefficients cedkm to a value that facilitates detection of vertical motion of horizontal lines and the detection of moving patterns with vertical correlation, obtaining a motion information signal md0 corrected in accordance with edge direction and pattern motion.

The spatial and temporal expansion filtering unit 16 performs a temporal expansion process on the motion information signal md0 from the motion information corrector 50 (step S111) and performs spatial filtering by using a horizontal or vertical LPF, by isolated point removal, or by other filtering processes (step S112).

The motion detection signal converter 19 converts the motion information afmd from the spatial and temporal expansion filtering unit 16 to a motion detection signal mds indicating the degree of motion in the video signal (step S113).

The motion detection device 1 outputs the motion detection signal mds as the result of motion detection (step S114). The motion detection device 1 thus generates, by pattern matching, moving block coefficients dfmat, cbmat indicating pattern motion in the pixel blocks, and generates edge decision coefficients efkm, cedkm indicating the degree of presence of edge components. By performing a smoothing process within an extent selected in accordance with the moving block coefficient dfmat and the edge decision coefficients efkm, it obtains a frame difference smoothed within a suitable extent responsive to edge direction and pattern motion. Furthermore, a motion information signal md0 corrected according to edge direction and pattern motion is obtained in accordance with the moving block coefficients cbmat and the edge decision coefficients cedkm.

Therefore, the motion detection device 1 can obtain a motion detection signal mds indicating amounts or degrees of motion accurately even from an image with noise, without failing to detect motion and without mistakenly detecting still parts as moving.

In the video signal processing device in the first embodiment, the pattern matching detector 30 uses pattern matching to generate moving block coefficients dfmat, cbmat that indicate the pattern motion in pixel blocks; the edge detector 40 generates edge decision coefficients efkm, cedkm that indicate the degree of presence of an edge component; the frame difference detector 20 obtains a frame difference smoothed within a suitable extent, responsive to edge direction and pattern motion, by performing a smoothing process within an extent selected in accordance with the moving block coefficient dfmat and edge decision coefficients efkm. The motion information corrector 50 obtains a motion information signal md0 corrected in accordance with edge direction and pattern motion according to the moving block coefficients cbmat and edge decision coefficients cedkm.

Therefore, the smoothing extent used in obtaining the frame difference can be changed in accordance with edge direction and pattern motion, by using moving block coefficients indicating block motion as determined from the value of pattern similarity between pixel blocks and edge decision coefficients indicating the degree of edge presence, and a frame difference signal smoothed in an appropriate extent can be obtained. The frame difference signal is corrected in accordance with edge direction and pattern motion by using the moving block coefficients and the edge decision coefficients, and at an edge or pattern where motion is likely to be detected mistakenly as being still, a correction can be made to facilitate motion detection, so that motion in an image containing noise can be detected accurately without mistakenly detecting still parts as moving and without failing to detect motion in moving parts.

In the video signal processing device in the first embodiment, the edge detector 40 shown in FIG. 10 detects edges by extracting vertical edge components and horizontal edge components in the vicinity of the pixel of interest P0 from the current frame signal Di0, one-frame delayed signal d2*f*, and one-field delayed signal d1*f*. This configuration can be changed to detect edges by extracting edge components from the current frame signal Di0 and the one-frame delayed signal d2*f*, which are in phase, without using the one-field delayed signal d1*f*. In that case, the vertical high frequency component extractor 413 and horizontal high frequency component extractor 423 in FIG. 10 may be eliminated, or alternatively, the vertical high frequency component selector 414 and horizontal high frequency component selector 424 may selectively block the signals from the vertical high frequency component extractor 413 and horizontal high frequency component extractor 423.

The video signal processing device in the first embodiment receives an interlaced video signal and detects motion in the video signal between the current frame Di0 and the immediately preceding frame d2*f*. Even if the input video signal is a progressive signal, however, motion can be detected with the same configuration. When a progressive signal is input, the frame delay unit 13 delays the input current frame signal Di0 by one frame and outputs the signal d2*f* of the preceding frame. Since the out-of-phase signal d1*f* of the preceding field is not obtained, the edge detector 40 detects edges from the in-phase signal d2*f* of the preceding frame.

Although a pixel P0 in the current frame signal Di0 is the pixel of interest for which motion is detected in the video signal processing device in the first embodiment, the pixel of interest P0 need not be disposed in the current frame; motion detection may be centered on a frame of a signal that has been delayed by a field or a frame, and the pixel of interest P0 may be disposed in that delayed signal. In that case, the one-frame difference detected by the motion detection device 1 may be a difference involving the frame preceding the central frame on the time axis or the two frames following the central frame on the time axis. It is also possible to combine differences with frames disposed in both the preceding and following directions. Provided the motion detection signal is obtained by detecting differences between these frames and the central frame, the same effects as described above in the first embodiment are obtained. More generally, the motion detection device of the present invention detects motion from temporally differing first and second frames of the video signal, with a pixel in the first frame as the pixel of interest. The first frame may be the current frame (the latest frame) or a frame preceding the current frame by one frame or one field.

The constituent units of the frame delay unit and motion detection device 1 may be configured either as hardware or as software, in the form of a programmed computing device.

Second Embodiment

Figure 19:
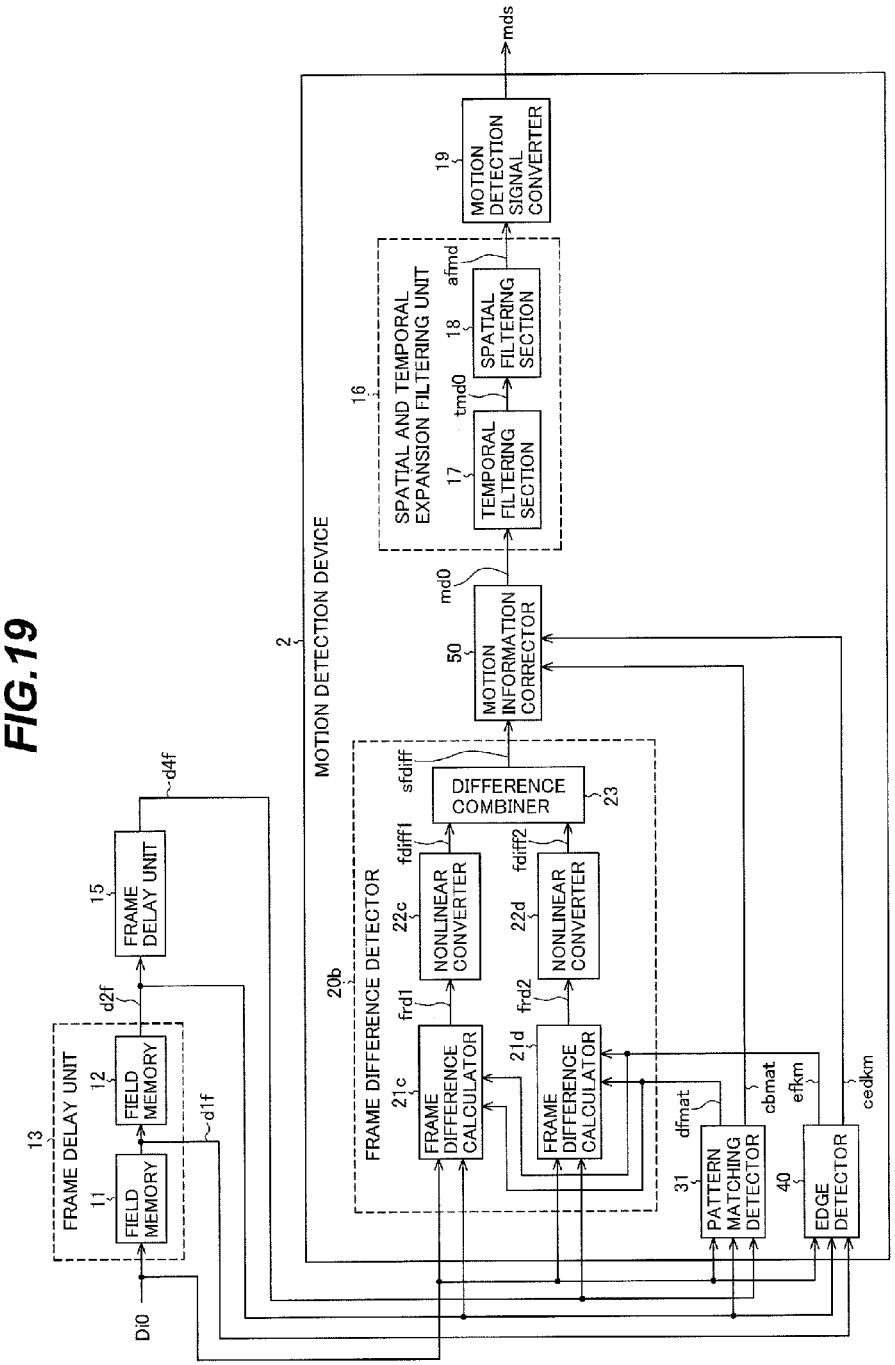
FIG. 19 is a block diagram showing an exemplary configuration of a video signal processing device in a second embodiment of the invention.

Whereas the video signal processing device in the first embodiment was configured to detect pixel motion in the image from the current frame signal and the signal one frame before and obtained frame differences between the current frame signal and the signal one frame before in its frame difference detector 20, the video signal processing device shown in FIG. 19 is configured to detect pixel motion in the image by obtaining a frame difference signal from frame differences between the current frame signal and the signal two frames before (two-frame differences) as well as from frame differences between the current frame signal and the signal one frame before.

FIG. 19 is a block diagram showing the configuration of a video signal processing device of the second embodiment of the invention (device for implementing the video signal processing method of the second embodiment of the invention). The device is configured to detect image motion pixel by pixel from the current frame signal Di0, the signal d2f one frame before, and the signal d4f two frames before. Elements in FIG. 19 that are identical to or correspond to elements shown in FIG. 1 in the first embodiment have the same reference characters.

The video signal processing device in the second embodiment in FIG. 19 includes a pair of frame delay units 13, 15 that delay the video signal input as the current frame signal Di0 by one frame apiece, and a motion detection device 2 that detects pixel motion from the current frame signal Di0 and the resulting delayed signals d2f, d4f.

The motion detection device 2 is generally similar to the motion detection device 1 shown in FIG. 1, but uses a different frame difference detector 20*b* and a different pattern matching detector 31 instead of the frame difference detector 20 and pattern matching detector 30 shown in FIG. 1.

The frame difference detector 20*b* detects two-frame differences in addition to one-frame differences, and outputs a frame difference signal for detecting motion.

The pattern matching detector 31 generates moving block coefficients from the similarity of patterns in pixel blocks in the signal of the preceding frame and the signal of the frame preceding that frame (the frame two frames before), as well as from the similarity of patterns in pixel blocks in the signal of the current frame and the signal of the preceding frame.

The spatial and temporal expansion filtering unit 16, motion detection signal converter 19, edge detector 40, and motion information corrector 50 are identical in configuration to the corresponding elements in the first embodiment. Detailed descriptions will be omitted.

The frame difference calculators 21*c*, 21*d* that calculate frame differences in the frame difference detector 20*b* in FIG. 19 are identical to the frame difference calculator 21 in FIG. 1, but whereas frame difference calculator 21*c* receives the current frame signal Di0 and one-frame delayed signal d2f, frame difference calculator 21*d* receives the one-frame delayed signal d2f and two-frame delayed signal d4f. The two nonlinear conversion units 22*c*, 22*d* are both identical to the nonlinear conversion unit 22 in FIG. 1. The frame difference detector 20*b* in FIG. 10 also includes a difference combiner 23 for combining the one-frame difference signal fdiff1 output from nonlinear conversion unit 22*c* and the two-frame difference signal fdiff2 output from nonlinear conversion unit 22*d*.

FIG. 19 will now be used to describe motion detection in the second embodiment.

The frame delay units 13, 15 both output a video signal that has been delayed by one frame. Frame delay unit 13 delays the input video signal Di0 by one frame and outputs the one-frame delayed signal d2f. Frame delay unit 15 delays the one-frame delayed signal d2f by one frame and outputs the two-frame delayed signal d4f. When an interlaced signal is input, the frame delay units 13, 15 may be configured from pairs of field memories that impart a one-field delay, and a one-field delayed signal d1f may be obtained from frame delay unit 13, as shown. Each frame delay unit 13, 15 is identical in configuration and operation to the frame delay unit 13 in FIG. 1.

The two-frame delayed signal d4f output from frame delay unit 15 is, like the one-frame delayed signal d2f, an in-phase signal having pixels in the same positions as in the current frame signal Di0.

The current frame signal Di0 is input to the motion detection device 2 together with the one-frame delayed signal d2f and one-field delayed signal d1f from frame delay unit 13 and the two-frame delayed signal d4f from frame delay unit 15. The motion detection device 2 uses the current frame signal Di0, one-frame delayed signal d2f, one-field delayed signal d1f, and two-frame delayed signal d4f to detect pixel motion and output a motion detection signal mds that indicates degrees of motion based on the detection results.

The motion detection device 2 calculates moving block coefficients by pattern matching of pixel blocks in the one-frame delayed signal d2f and two-frame delayed signal d4f, as well as by pattern matching of pixel blocks in the current frame signal Di0 and one-frame delayed signal d2f, detects edge direction from the moving block coefficients and from edge decision coefficients resulting from edge detection, and obtains a frame difference signal that has been smoothed over a suitable extent, the extent being switched according to edge direction and pattern motion. By detecting frame differences from both the one-frame differences between the current frame signal Di0 and one-frame delayed signal d2f and the two-frame differences between the current frame signal Di0 and two-frame delayed signal d4f, the motion detection device 2 performs highly accurate motion detection with better prevention of false detection of nonexistent motion and failure to detect real motion, and generates and outputs a motion detection signal mds indicating the degree of motion.

The configuration and operation of the spatial and temporal expansion filtering unit 16, motion detection signal converter 19, edge detector 40, and motion information corrector 50 in the motion detection device 2 are as shown in FIG. 1 and described above, so that detailed descriptions will be omitted. The following description concerns the generation of the dfmat and moving block coefficients cbmat by the pattern matching detector 31 and the generation of the frame difference signal sfdiff in the frame difference detector 20*b*.

The current frame signal Di0, one-frame delayed signal d2f, and two-frame delayed signal d4f are input to the pattern matching detector 31 in the motion detection device 2.

The pattern matching detector 31 carries out pattern matching to calculate the similarity of pixel blocks in the one-frame delayed signal d2f and the current frame signal Di0, and the similarity of pixel blocks in the one-frame delayed signal d2f and the two-frame delayed signal d4f. From these two pattern matching results, the moving block coefficients dfmat, cbmat that indicate pixel block motion are generated. The detected moving block coefficients dfmat, cbmat are obtained from the pattern matching results for pixel blocks in the same position as the pixel of interest, the motion of which is being detected. Increasing similarity values indicate increasing dissimilarity between the patterns in the pixel blocks, thereby indicating pixel block motion, or motion of the block patterns in the pixel blocks (pattern motion).

Figure 20A:
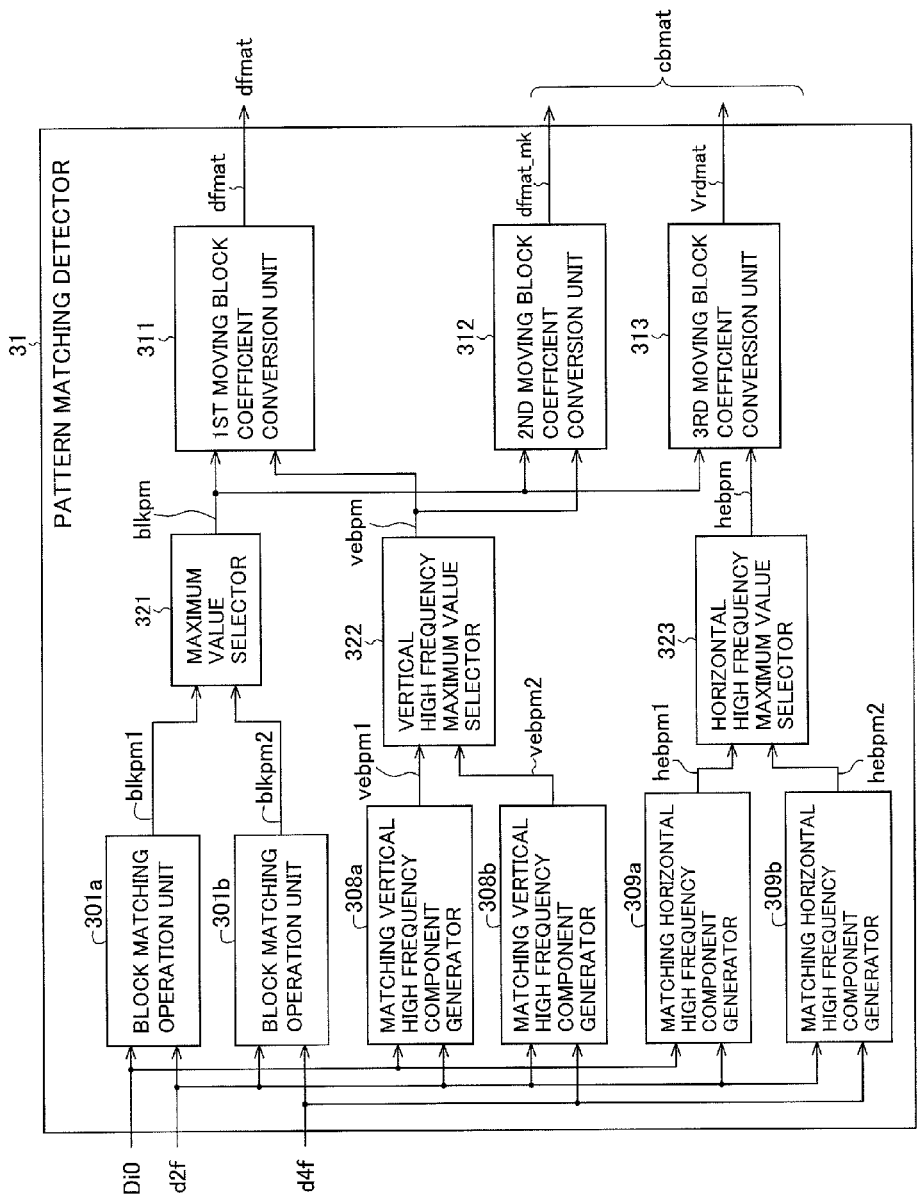
FIG. 20A is a block diagram showing an exemplary configuration of the pattern matching detector used in the video signal processing device in the second embodiment.

The pattern matching detector 31 is configured as shown, for example, in FIG. 20A.

Elements in FIG. 20A that are identical to or correspond to elements of the pattern matching detector 30 shown in FIG. 2A in the first embodiment have the same reference characters.

Figure 20B:
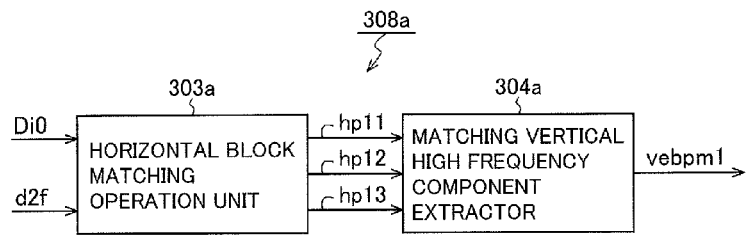
FIG. 20B is a block diagram showing an exemplary configuration of the matching vertical high frequency component generator used in the pattern matching detector in FIG. 20A.
Figure 20C:
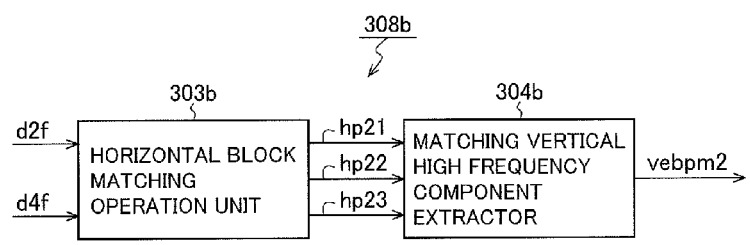
FIG. 20C is a block diagram showing an exemplary configuration of the matching vertical high frequency component generator used in the pattern matching detector in FIG. 20A.
Figure 20D:
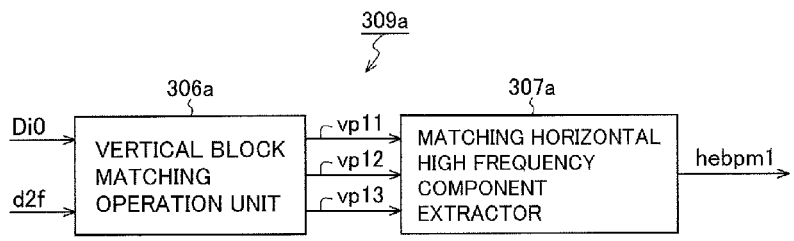
FIG. 20D is a block diagram showing an exemplary configuration of the matching horizontal high frequency component generator used in the pattern matching detector in FIG. 20A.
Figure 20E:
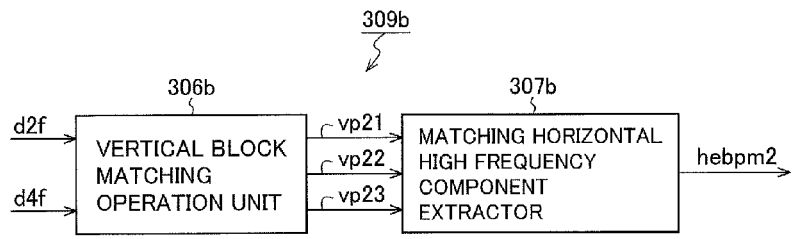
FIG. 20E is a block diagram showing an exemplary configuration of the matching horizontal high frequency component generator used in the pattern matching detector in FIG. 20A.

Of the constituent elements of the pattern matching detector 31 in FIG. 20A, the block matching operation units 301a and 301b are identical to the block matching operation unit 301 in pattern matching detector 30. The matching vertical high frequency component generators 308a, 308b, which include the horizontal block matching operation units 303a, 303b and matching vertical high frequency component extractors 304a, 304b, as shown in FIGS. 20B and 20C, and the matching horizontal high frequency component generators 309a, 309b, which include the vertical block matching operation units 306a, 306b and matching horizontal high frequency component extractors 307a, 307b, as shown in FIG. 20D and FIG. 20E, are identical to the matching vertical high frequency component generator 308, which includes the horizontal block matching operation unit 303 and matching vertical high frequency component extractor 304, and the matching horizontal high frequency component generator 309, which includes the vertical block matching operation unit 306 and matching horizontal high frequency component extractor 307, in pattern matching detector 30.

Pattern matching detector 31 also has a maximum value selector 321, a vertical high frequency maximum value selector 322, and a horizontal high frequency maximum value selector 323.

Block matching operation unit 301a in FIG. 20A receives the current frame signal Di0 and the one-frame delayed signal d2f, performs block matching on a pixel block b0 centered on the pixel of interest P0 in the current frame signal Di0 and a corresponding pixel block b2 in the frame of the one-frame delayed signal d2f, and obtains as a result a block matching quantity blkpm1 indicating the similarity of the patterns in these blocks. Block matching operation unit 301b receives the one-frame delayed signal d2f and the two-frame delayed signal d4f, performs block matching on a pixel block b2 in the frame of the one-frame delayed signal d2f and a corresponding pixel block b4 in the frame of the two-frame delayed signal d4f, and obtains as a result a block matching quantity blkpm2 indicating the similarity of the patterns in these blocks.

The block matching quantity blkpm1 calculated by block matching operation unit 301a and the block matching quantity blkpm2 calculated by block matching operation unit 301b are sent to the maximum value selector 321, which selects the larger of the two block matching quantities blkpm1, blkpm2 and outputs it as a block matching quantity blkpm. This block matching quantity blkpm is output to the first, second, and third moving block coefficient conversion units 311, 312, 313 as a result indicating the similarity of the pixel block b0 centered on the pixel of interest P0 to blocks in two preceding frames, thus indicating motion of the block pattern in the pixel block.

Instead of performing pattern matching on the one-frame delayed signal d2f and two-frame delayed signal d4f to obtain the block matching quantity blkpm2, block matching operation unit 301b may be configured to perform pattern matching on the current frame signal Di0 and two-frame delayed signal d4f, which still enables the maximum value selector 321 to obtain as a result a block matching quantity blkpm over a two-frame interval.

Horizontal block matching operation unit 303a receives the current frame signal Di0 and the one-frame delayed signal d2f and carries out pattern matching on horizontally elongated sub-block areas constituting parts of the pixel blocks in these frames.

Horizontal block matching operation unit 303b receives the one-frame delayed signal d2f and the two-frame delayed signal d4f and carries out pattern matching on horizontally elongated sub-block areas constituting parts of the pixel blocks in these frames.

From the horizontal block matching quantities hp11, hp12, hp13 output by horizontal block matching operation unit 303a, matching vertical high frequency component extractor 304a obtains a matching vertical high frequency component vebpm1. From the horizontal block matching quantities hp21, hp22, hp23 output by horizontal block matching operation unit 303b, matching vertical high frequency component extractor 304b obtains a matching vertical high frequency component vebpm2.

The two matching vertical high frequency components vebpm1 and vebpm2 calculated by the matching vertical high frequency component extractors 304a and 304b are sent to the vertical high frequency maximum value selector 322. The vertical high frequency maximum value selector 322 selects the largest of the two matching vertical high frequency components vebpm1 and vebpm2 and outputs it as the matching vertical high frequency component vebpm. This matching vertical high frequency component vebpm is output to the first and second moving block coefficient conversion units 311 and 312 as a value indicating the presence of a vertical motion component in the pixel blocks over a two-frame interval.

Vertical block matching operation unit 306a receives the current frame signal Di0 and the one-frame delayed signal d2f and carries out pattern matching on vertically elongated sub-block areas constituting parts of the pixel blocks in the respective frames.

Vertical block matching operation unit 306b receives the one-frame delayed signal d2f and the two-frame delayed signal d4f and carries out pattern matching on vertically elongated sub-block areas constituting parts of the pixel blocks in the respective frames.

From the vertical block matching quantities vp11, vp12, vp13 output by vertical block matching operation unit 306a, matching horizontal high frequency component extractor 307a obtains a matching horizontal high frequency component hebpm1. From the vertical block matching quantities vp21, vp22, vp23 output by vertical block matching operation unit 306b, matching horizontal high frequency component extractor 307b obtains a matching horizontal high frequency component hebpm2.

The two matching horizontal high frequency components hebpm1 and hebpm2 calculated by the matching horizontal high frequency component extractors 307a, 307b are sent to the horizontal high frequency maximum value selector 323. The horizontal high frequency maximum value selector 323 selects the largest of the two matching horizontal high frequency components hebpm1 and hebpm2 and outputs it as the matching horizontal high frequency component hebpm.

This matching horizontal high frequency component hebpm is output to the third moving block coefficient converter 313 as a value indicating the presence of a horizontal motion component in the pixel blocks over a two-frame interval.

Instead of performing pattern matching on the one-frame delayed signal d2f and two-frame delayed signal d4f, the horizontal block matching operation unit 303b and vertical block matching operation unit 306b may, like the block matching operation unit 301b, be configured to perform pattern matching on the current frame signal Di0 and the two-frame delayed signal d4f, which still enables the vertical high frequency maximum value selector 322 and horizontal high frequency maximum value selector 323 to obtain absolute difference results (matching quantities) over a two-frame interval.

The structure and operation of the first, second, and third moving block coefficient conversion units 311, 312, 313 are the same as those shown in FIGS. 2A, 2D, 2E, and 2F, so that a description will be omitted. The pattern matching detector 31 in FIG. 20A carries out pattern matching on pixel blocks in the one-frame delayed signal d2f and current frame signal Di0 and calculates a similarity, carries out pattern matching on pixel blocks in the one-frame delayed signal d2f and two-frame delayed signal d4f and calculates a similarity, calculates a block matching quantity blkpm, also obtains high frequency vertical and horizontal components of the absolute difference values, and generates moving block coefficients dfmat, cbmat from these components and the block matching quantity blkpm, taking patterns of vertical and horizontal pixel block motion into account.

Referring again to FIG. 19, the current frame signal Di0, one-frame delayed signal d2f, and two-frame delayed signal d4f are input to the frame difference detector 20b together with the moving block coefficient dfmat from the pattern matching detector 31 and edge decision coefficients efkm from the edge detector 40.

The frame difference detector 20b obtains one-frame and two-frame differences, but in obtaining these differences it selects an extent of pixels according to the moving block coefficient dfmat and edge decision coefficients efkm and carries out a smoothing process with the selected extent. It then detects the smoothed frame differences, combines the two frame differences obtained as results, and outputs the combined frame difference signal sfdiff to the motion information corrector 50.

The current frame signal Di0 and one-frame delayed signal d2f are input to the frame difference calculator 21c in the frame difference detector 20b, together with the moving block coefficient dfmat from the pattern matching detector 31 and the edge decision coefficients efkm from the edge detector 40. The current frame signal Di0 and the two-frame delayed signal d4f are input to the frame difference calculator 21d, together with the moving block coefficient dfmat from the pattern matching detector 31 and the edge decision coefficients efkm from the edge detector 40.

The frame difference calculator 21c obtains a frame difference frd1 indicating one-frame differences between the current frame signal Di0 and the one-frame delayed signal d2f. The frame difference calculator 21d obtains a frame difference frd2 indicating two-frame differences between the current frame signal Di0 and the two-frame delayed signal d4f. Frame difference frd1 is identical to the frame difference frd described in regard to the device in FIG. 1.

Nonlinear conversion unit 22c performs a nonlinear conversion on frame difference frd1 to obtain a frame difference signal fdiff1. Nonlinear conversion unit 22d performs a nonlinear conversion on frame difference frd2 to obtain a frame difference signal fdiff2. Both frame difference signals fdiff1, fdiff2 are output to the difference combiner 23.

The difference combiner 23 receives the one-frame difference signal fdiff1 representing one-frame differences from the nonlinear conversion unit 22c and the two-frame difference signal fdiff2 representing two-frame differences from the nonlinear conversion unit 22d, combines them by selecting the largest of the two difference signal values fdiff1, fdiff2, and outputs the resulting combined frame difference signal sfdiff, the frame differences in which represent motion in the video signal.

The combining method used by the difference combiner 23 is not limited to taking the largest value; the difference combiner 23 may calculate the mean value, or may perform a combining computation with weighting coefficients based on the magnitudes of the input one-frame difference signal fdiff1 and two-frame difference signal fdiff2.

When calculating the frame difference signal sfdiff as described above, the frame difference detector 20b selects an extent of pixels on which to carry out a smoothing process according to the moving block coefficient dfmat and edge decision coefficients efkm, thereby obtaining a frame difference signal that has been smoothed within an appropriate extent responsive to pattern motion and edge direction. Since it also obtains two-frame differences, it can output a more accurate frame difference signal sfdiff.

The frame difference signal sfdiff is sent to the motion information corrector 50 and a motion detection signal mds is obtained by the same configuration of elements as shown in FIG. 1 in the first embodiment. A description will be omitted.

In the motion detection device 2 in FIG. 19 as described above, the pattern matching detector 31 generates the moving block coefficients dfmat, cbmat indicating pattern motion in pixel blocks by pattern matching on pixel blocks in the signal one frame before and the signal two frames before as well as on the current frame signal and the signal one frame before. By selecting the extent of pixels on which to perform smoothing processing according to the generated moving block coefficient dfmat and edge decision coefficients efkm, the frame difference detector 20b obtains one-frame differences and two-frame differences that have been smoothed within appropriate extents responsive to edge direction and pattern motion in the image.

Even in an image with noise, accordingly, the motion detection signal mds obtained from the motion detection device 2 indicates video motion with high accuracy, preventing motion from being mistakenly detected or missed. By calculating and combining one-frame differences and two-frame differences, the motion detection device 2 can respond to high-speed image motion, preventing such motion from being missed.

The steps by which one-frame differences and two-frame differences in the video signal are detected by use of moving block coefficients obtained by pattern matching and edge decision coefficients obtained as a result of edge detection and by which a motion detection signal mds indicating a degree of motion is output in the video signal processing device in the second embodiment are substantially as described with reference to FIGS. 17 and 18 in the first embodiment, so that a full description will be omitted, but in the second embodiment, the frame delayed signal input in step S101 in FIG. 17 becomes a pair of signals including the one-frame delayed signal d2f and the two-frame delayed signal d4f. In the block matching in step S102, in generating moving block coefficients dfmat, cbmat indicating pixel block motion, the pattern matching detector 31 calculates two degrees of pattern similarity, one for pixel blocks in the one-frame delayed signal d2f and the current frame signal Di0 and another for pixel blocks in the one-frame delayed signal d2f and the two-frame delayed signal d4f. The frame difference signal in step S108 in FIG. 18 is obtained by combining one-frame and two-frame differences.

The steps other than the above steps S101, S102, and S108 are carried out as described in the flowchart in FIGS. 17 and 18.

In the video signal processing device in the second embodiment, as described above, the pattern matching detector 31 generates the moving block coefficients dfmat, cbmat indicating pixel block pattern motion by pattern matching on pixel blocks in the signal one frame before and the signal two frames before, as well as on the current frame signal and the signal one frame before, and by selecting the extent of pixels on which to perform smoothing processing according to the generated moving block coefficient dfmat and edge decision coefficients efkm. The frame difference detector 20b obtains one-frame differences and two-frame differences that have been smoothed within appropriate extents responsive to edge direction and pattern motion in the image. The motion information corrector 50 then obtains a motion information signal md0 that has been modified according to edge direction and pattern motion as indicated by the moving block coefficients cbmat and the edge decision coefficients cedkm.

Accordingly, since moving block coefficients are obtained over an interval of two frames and both one-frame and two-frame differences are obtained, high-speed image motion can be processed, preventing the motion from being missed and a still image portion from being detected by mistake. In addition, since the smoothing extent is switched on the basis of edge direction and pattern motion in the image when the frame differences are obtained, frame difference signals that have been smoothed within appropriate extents can be obtained, and even when noise is present in the image, motion detection can be carried out with high accuracy, preventing motion from being mistakenly detected or missed.

Although a pixel P0 in the current frame signal Di0 is the pixel of interest for which motion is detected when the frame difference detector 20b detects one-frame differences and two-frame differences in the video signal processing device in the second embodiment, in general the pixel of interest P0 need not be disposed in the current frame; motion detection may be centered on a frame of a signal that has been delayed by one or more fields or frames, and the pixel of interest P0 may be disposed in that delayed signal. In that case, the one-frame and two-frame differences detected by the frame difference detector 20b are differences involving the two frames preceding the central frame on the time axis or the two frames following the central frame on the time axis. It is also possible to combine differences with frames disposed in both the preceding and following directions. Provided the motion detection signal is obtained by detecting differences between these frames and the central frame, the same effects as in the second embodiment are obtained.

The constituent units of the frame delay and motion detection sections may be configured either as hardware or as software, in the form of a programmed computing device.

Third Embodiment

The video signal processing devices in the first and second embodiments detected motion from a video signal locally, and can be applied in motion adaptive processing by processing the video signal according to the detected motion.

As an example of this type of application, a motion adaptive scan line interpolation process that performs scan conversion to convert an interlaced signal to a progressive signal (IP conversion) will be described.

In the third embodiment described below, during IP conversion, a video signal processing device generates an interpolated signal by switching between inter-field interpolation and intra-field interpolation according to the motion detection signal that indicates the amount or degree of motion detected. The motion detection device 1 in the video signal processing device in the first embodiment is used to detect motion.

FIG. 21 is a block diagram showing the configuration of a video signal processing device of the third embodiment of the invention (device for implementing the video signal processing method of the third embodiment of the invention). The device is a motion adaptive processor 3 that uses the motion detection device 1 to detect motion on the basis of differences between frames in a video signal and interpolates scanning lines by processing responsive to the output of the motion detection device 1 to generate a progressive signal. Constituent elements in FIG. 21 that are identical to or correspond to elements in the first embodiment shown in FIG. 1 have the same reference numerals.

In addition to using the motion detection device 1 (see FIG. 1) in the video signal processing device in the first embodiment, the motion adaptive processor 3 which is the video signal processing device in the third embodiment has a pair of field memories 11, 12 constituting a frame delay unit 13 as in the first embodiment, a motion adaptive interpolator 600, and a rate doubler 601. Operating according to the output of the motion detection device 1, the motion adaptive interpolator 600 generates a motion adaptive scanning line interpolation signal I and outputs it together with the received 'real' scanning line signal R. The rate doubler 601 embeds the scanning line interpolation signal I between corresponding lines in the received scanning line signal R, doubles the scan rate, and outputs the resulting progressive video signal Do.

The input video signal Di0 is input sequentially to the motion adaptive processor 3, which performs scanning line interpolation by motion adaptive processing and outputs the progressive signal Do.

A one-field delayed signal d1f and a one-frame delayed signal d2f are output from the frame delay unit 13.

The motion detection device 1 in the motion adaptive processor 3 receives the current frame signal Di0, the one-frame delayed signal d2f, and the one-field delayed signal d1f, detects motion in the video signal between the current frame signal and the signal of the preceding frame, and outputs a motion detection signal mds indicating the degree of motion detected.

The motion detection device 1 may be structured as shown in FIG. 1, and may thus switch the extent of the smoothing processing performed in the determination of the difference between frames responsive to pattern motion and edge direction in the image, using moving block coefficients obtained from pattern matching of pixel blocks in the current frame signal Di0 and the one-frame delayed signal d2f and edge decision coefficients resulting from edge detection, thereby obtaining a frame difference signal that has been smoothed within an appropriate extent, and may further modify the frame difference signal responsive to pattern motion and edge direction to generate motion information modified so as to make motion easier to detect at edges and in patterns where moving areas tend to be misrecognized as still, thereby carrying out motion detection with high accuracy and avoiding motion detection mistakes.

The motion adaptive interpolator 600 receives the current frame signal Di0, the one-frame delayed signal d2f, the one-field delayed signal d1f, and the motion detection signal mds output from the motion detection device 1.

The field into which scanning lines are interpolated in FIG. 21 (the field undergoing interpolation) is the field associated with the one-field delayed signal d1f. The motion detection device 1 detects motion between the current frame signal Di0 and the one-frame delayed signal d2f, and the motion detection signal mds indicates the degree of motion detected, so that interpolating scanning lines into the one-field delayed signal d1f is equivalent to generating an interpolation signal at the center of the detected motion. In FIG. 5, for example, the interpolation signal interpolates a pixel on the scanning line n that passes midway between pixels Pf1a and Pf1b in the one-field delayed signal d1f.

The motion adaptive interpolator 600 generates the scanning line interpolation signal I by performing motion adaptive processing based on the motion detection signal mds output from the motion detection device 1 for the one-field delayed signal d1f, the current frame signal Di0, and the one-frame delayed signal d2f, and outputs the scanning line interpolation signal I together with the received scanning line signal R in the one-field delayed signal d1f. The processing that generates the scanning line interpolation signal I is carried out with respect to the one-field delayed signal d1f. Depending on the value of the motion detection signal mds, the motion adaptive interpolator 600 performs inter-field interpolation by embedding the pixels of the corresponding scanning lines of the one-frame delayed signal d2f, which temporally precedes the one-field delayed signal d1f, or the current frame signal Di0, which temporally follows the one-field delayed signal d1f, or performs intra-field interpolation by using the signals of the pixels of the one-field delayed signal d1f vertically above and below.

The motion adaptive interpolator 600 generates the scanning line interpolation signal I by, for example, mixing the signal obtained by inter-field interpolation with the signal obtained by intra-field interpolation according to the value of the motion detection signal mds. That is, when the motion detection signal mds indicates that the local image is definitely still (mds=0), inter-field interpolation is carried out; when the value of the motion detection signal mds is large enough to indicate definite motion, intra-field interpolation is carried out; when the value of the motion detection signal mds is intermediate between zero and the value indicating definite motion, the inter-frame interpolated signal and the intra-frame interpolated signal are mixed in a ratio responsive to the value of the motion detection signal mds to generate the scanning line interpolation signal I.

Inter-field interpolation may be carried out by use of just one of the one-frame delayed signal d2f and the current frame signal Di0: for example, by use only of the temporally preceding one-frame delayed signal d2f.

The field undergoing interpolation need not be the field of the one-field delayed signal dif as described above; it may be the field of the current frame signal Di0 or the field of the one-frame delayed signal d2f.

Next the rate doubler 601 receives the scanning line interpolation signal I and the received scanning line signal R output from the motion adaptive interpolator 600, embeds the interpolation signal between corresponding scanning lines in the received scanning line signal, doubles the scan rate to convert the resulting signal to the progressive video signal Do, and outputs the progressive video signal Do. The progressive video signal Do output from the rate doubler 601 is thereby output from the motion adaptive processor 3.

As described above, in the video signal processing device in the third embodiment, the motion detection device 1 in the first embodiment is used to obtain a motion detection signal mds that has been obtained from a frame difference signal that has been smoothed over a suitable extent and modified according to edge direction and pattern motion, and the motion adaptive interpolator 600 carries out a scanning line interpolation process by means of motion adaptive processing responsive to the motion detection signal mds, thereby obtaining a progressive signal Do.

Therefore, even when noise is present in the image, it is possible to perform motion detection with high accuracy, avoiding the mistakes of false detection of nonexistent motion and failure to detect real motion. Since moving parts are not detected as still; this motion detection result can be used to obtain a progressive signal with less picture quality degradation due to problems such as flicker, blur, combing, and jitter than before in the result of line interpolation by motion adaptive processing.

Figure 22:
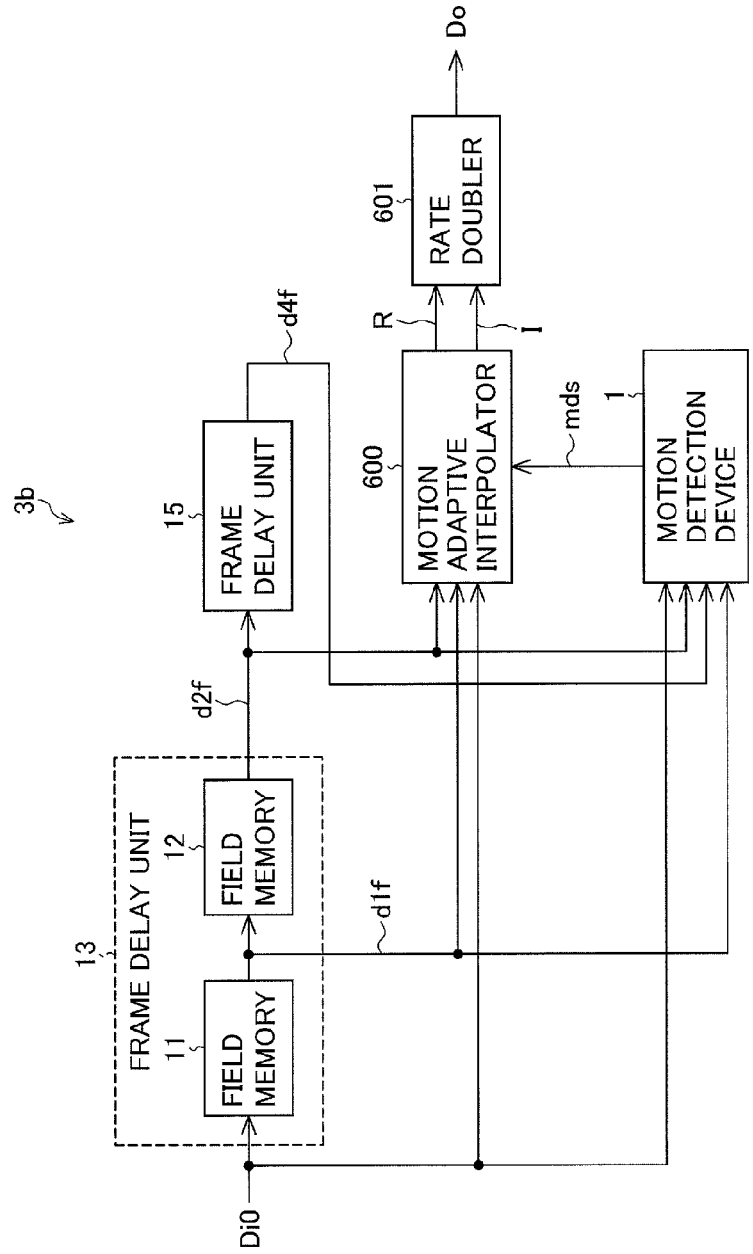
FIG. 22 is a block diagram showing another exemplary configuration of a motion adaptive processor used as the video signal processing device in the third embodiment.

Although the motion adaptive processor 3 in the third embodiment shown in FIG. 21 is configured to detect motion in the video signal by use of the motion detection device 1 in FIG. 1, it may be configured to use the motion detection device 2 in the video signal processing device in the second embodiment (see FIG. 19) by adding another frame delay unit 15 to obtain a two-frame delayed signal d4f as shown in FIG. 22. In this case, since moving block coefficients are obtained over a two-frame interval and since both one-frame and two-frame differences are obtained, high-speed image motion can be detected and thus not misidentified as non-motion, and the results of this more accurate motion detection can be used to perform scanning line interpolation by motion adaptive processing, thereby obtaining a progressive signal Do.

The motion adaptive processor 3 shown in FIG. 21 and the motion adaptive processor 3b shown in FIG. 22 in the third embodiment carry out motion adaptive scanning line interpolation of a video signal, but in motion compensating scanning line interpolation processing, which detects motion vectors and performs scan conversion according to the motion vectors, the result of motion detection by the motion detection device 1 or 2 can be used as a parameter in the motion compensation processing, so that the motion detection result is used together with the motion vectors. Scanning line interpolation processing can then be carried out by highly accurate motion compensation to obtain a progressive signal Do.

The constituent units of the motion adaptive processor 3 described above may be configured either as hardware or as software, in the form of a programmed computing device.

Fourth Embodiment

As a next exemplary application to motion adaptive processing, a case in which motion adaptive processing is carried out in three-dimensional noise removal will be shown.

In the fourth embodiment, the motion detection device 1 in the video signal processing device in the first embodiment is used to detect motion in a motion adaptive video signal processing device that, in carrying out three-dimensional noise removal, controls the noise removal effect according to a motion detection signal indicating the amount or degree of motion detected.

Figure 23:
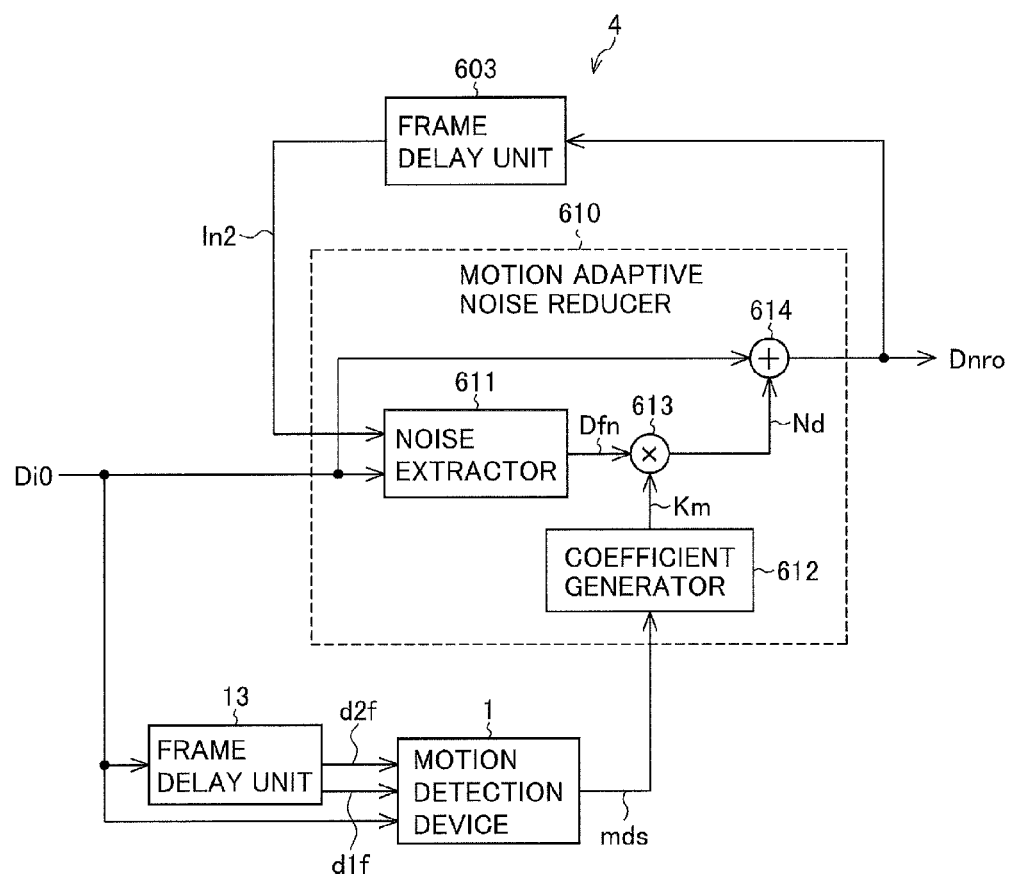
FIG. 23 is a block diagram showing an exemplary configuration of a motion adaptive processor used as the video signal processing device in a fourth embodiment of the invention.
Figure 24:
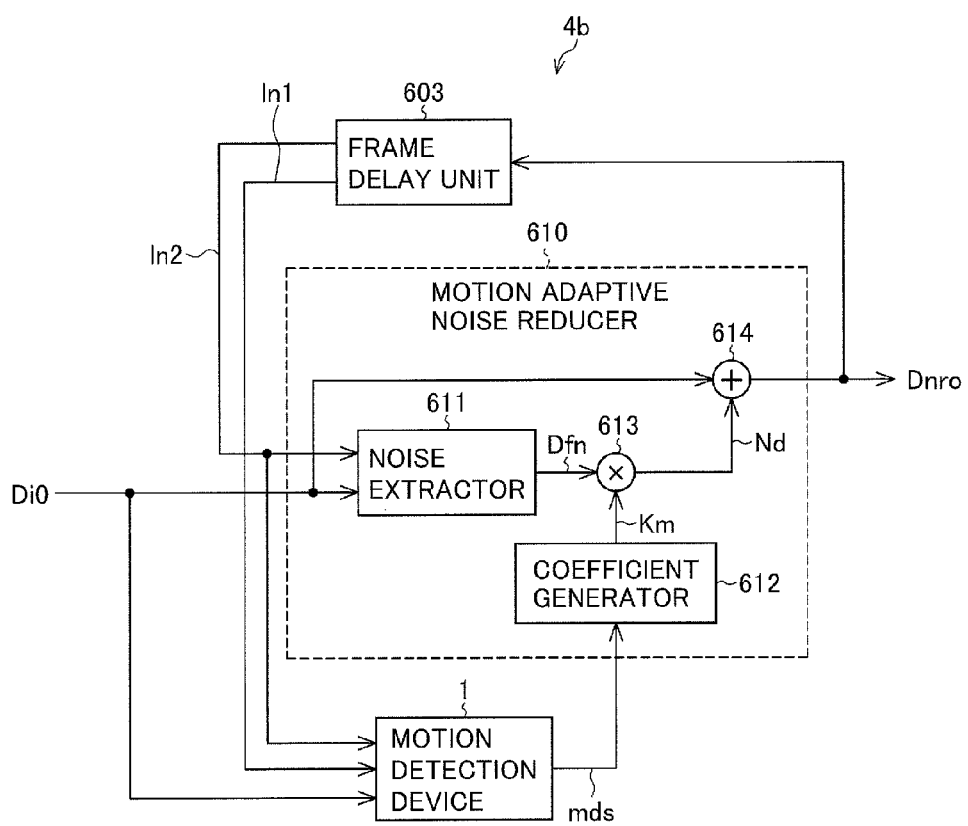
FIGS. 24 and 25 are block diagrams showing other exemplary configurations of a motion adaptive processor used as the video signal processing device in the fourth embodiment.

FIG. 23 is a block diagram showing the configuration of a video signal processing device of the fourth embodiment of the invention (device for implementing the video signal processing method of the fourth embodiment of the invention). The device is a motion adaptive processor 4 that detects motion on the basis of differences between frames in a video signal and multiplies the noise component of the signal by an IIR coefficient obtained according to the output of the motion detection device, thereby performing frame recursive noise reduction. Constituent elements in FIG. 23 that are identical to or correspond to elements in the first embodiment shown in FIG. 1 have the same reference numerals.

In addition to using the motion detection device 1 (see FIG. 1) in the video signal processing device in the first embodiment to detect motion, the motion adaptive processor 4 which is the video signal processing device in the fourth embodiment has a frame delay unit 13, a frame delay unit 603, and a motion adaptive noise reducer 610. The motion adaptive noise reducer 610 obtains an IIR noise component coefficient according to the output of the motion detection device 1, and performs frame recursive noise reduction processing.

The motion adaptive noise reducer 610 includes a noise extractor 611, a coefficient generator 612 that generates the IIR coefficient responsive to the motion detection result, a multiplier 613 that multiples the noise component output from the first field memory 11 by the IIR coefficient to output a noise recursion quantity, and an operation unit 614 that adds (or subtracts) the noise recursion quantity Nd from the multiplier 613 to (or from) the input video signal Di0.

An interlaced signal is input sequentially to the motion adaptive processor 4 as the input video signal Di0. After carrying out noise reduction processing, the motion adaptive processor 4 outputs a noise-reduced signal Dnro.

The frame delay units 13, 603 are memory units that delay the video signal by one frame each. The first frame delay unit 13 delays the input video signal Di0 by one frame and outputs a one-frame delayed signal d2f; the second frame delay unit 603 delays the noise-reduced signal Dnro by one frame and outputs a one-frame delayed low noise signal ln2. When an interlaced signal is input, the frame delay units 13, 603 may be configured from pairs of field memories that impart a one-field delay, and a one-field delayed signal d1f may be generated in the frame delay unit 13 and supplied to the motion detection device 1, as shown. Each frame delay unit 13, 603 is identical in configuration and operation to frame delay unit 13 in FIG. 1.

The motion detection device 1 receives the current frame signal Di0, also receives the one-frame delayed signal d2f and the one-field delayed signal d1f from frame delay unit 13, detects motion in the video signal between the current frame signal Di0 and the signal d2f of the preceding frame, and outputs a motion detection signal mds indicating the amount or degree of motion detected. The motion detection device 1 has the structure shown in FIG. 1. It switches the extent of the smoothing processing performed in the determination of the difference between frames responsive to pattern motion and edge direction in the image, using moving block coefficients obtained from pattern matching and edge decision coefficients resulting from edge detection, thereby obtaining a frame difference signal that has been smoothed within an appropriate extent, then modifies the frame difference signal responsive to pattern motion and edge directions and obtains modified motion information that facilitates motion detection at edges and in patterns where moving areas tend to be misrecognized as still, thereby carrying out motion detection with high accuracy and avoiding motion detection mistakes.

The current frame signal Di0, the one-frame delayed low noise signal ln2 from frame delay unit 603, and the motion detection signal mds from the motion detection device 1 are input to the motion adaptive noise reducer 610. From the frame difference values between the current frame signal Di0 and the one-frame delayed low noise signal ln2, the motion adaptive noise reducer 610 extracts the noise component, determines a noise component IIR coefficient responsive to the motion detection signal mds from the motion detection device 1, uses the extracted noise component and the IIR coefficient to carry out a noise reduction process, and outputs the noise-reduced signal Dnro. The noise-reduced signal Dnro, which is a signal of the same frame as the current frame signal Di0, is sent to the second frame delay unit 603.

In the noise extractor 611 in the motion adaptive noise reducer 610, for example, the current frame signal Di0 is subtracted from the one-frame delayed signal ln2 to obtain frame differences Diff between the current frame signal Di0 and the one-frame delayed signal ln2. The amplitude of the differences is then limited to within a predetermined value (e.g., within ±dTh) and the amplitude limited differences are output as the noise component Dfn. The frame differences Diff include both motion and noise components in the video signal. Accordingly, when the noise component Dfn obtained from the frame differences Diff is zero, the relevant part of the video signal has no motion or noise, but as the motion or noise increases, the Dfn value increases. The noise component Dfn obtained by the noise extractor 611 is output to the multiplier 613 as the noise component of the current frame signal Di0.

The coefficient generator 612 receives the motion detection signal mds from the motion detection device 1 and generates an IIR coefficient Km responsive to the motion detection signal mds. The IIR coefficient Km generated by the coefficient generator 612 has a value in the range 0 Km<1. This value sets the recursion level in the recursive noise reduction process. The closer the value of the IIR coefficient is to one, the greater the recursion level and the noise reduction effect become. If the IIR coefficient Km is zero (Km=0), the recursion level is zero and noise reduction is not performed.

The coefficient generator 612 accordingly generates the IIR coefficient Km by a multiplication process, for example, or by use of an LUT stored in a read-only memory (ROM) so that Km varies in response to the degree of motion indicated by the motion detection signal mds from the motion detection device 1. When the motion detection signal mds has a large value, indicating definite motion, the IIR coefficient is set to zero (Km=0). When the motion detection signal mds is zero, indicating a still image or noise component, Km is set to its maximum value Kmax (Kmax<1). When the motion detection signal mds has a value intermediate between zero and 'definite motion', the value of the IIR coefficient Km varies accordingly, becoming smaller as the mds value becomes larger. An IIR coefficient that takes account of motion is thereby obtained.

The IIR coefficient which thus varies between zero and Kmax is output from the coefficient generator 612 to the multiplier 613.

The multiplier 613 calculates the noise recursion quantity Nd by multiplying the noise component Dfn by the IIR coefficient Km (Nd=Km×Dfn). The noise recursion quantity Nd thus obtained is output to the operation unit 614.

When the motion detection signal mds indicates motion, the IIR coefficient Km, which is calculated from the mds value, is output as zero, so that the noise recursion quantity Nd is zero and no noise reduction is performed. When a pixel in a still part of the image is detected, Km has its maximum value Kmax, so that the value of the noise recursion quantity Nd is set to be as large as possible, enabling maximum noise reduction to be carried out. Between these extremes, the noise reduction effect varies gradually responsive to the amount of motion indicated by the motion detection signal.

The operation unit 614 adds (or subtracts) the noise recursion quantity Nd to (or from) the current frame signal Di0 to reduce noise in the video signal, thereby obtaining the noise-reduced signal Dnro. The operation unit 614 either adds or subtracts according to the sign (positive or negative) of the noise recursion quantity Nd so as to reduce noise.

Next, the noise-reduced signal Dnro output from the motion adaptive noise reducer 610, which is a signal for the same frame as the input video signal, is sent to frame delay unit 603.

As described above, the video signal processing device in the fourth embodiment uses the motion detection device 1 in the first embodiment to obtain a frame difference signal that has been appropriately smoothed and a motion detection signal mds that has been modified responsive to edge direction and pattern motion; the motion adaptive noise reducer 610 then obtains an IIR coefficient responsive to the motion detection signal mds and applies it to the noise component to carry out a frame recursive noise reduction process, thereby performing a motion adaptive process in which the noise reduction effect is controlled by the result of motion detection.

Accordingly, even when noise is present in the image, motion detection can be carried out with high accuracy, preventing motion from being mistakenly detected or missed, so that in the noise-reduced video signal obtained by motion adaptive processing, noise is reduced in still parts of the image without producing trails or ghosts in moving parts, and the noise-reduced signal is comparatively free of defects such as flicker and blur.

Although the motion adaptive processor 4 in the fourth embodiment shown in FIG. 23 is configured to detect motion in the video signal by use of the motion detection device 1 in FIG. 1, it may be configured to use the motion detection device 2 in the video signal processing device in the second embodiment (see FIG. 19) by adding another frame delay unit 15 to obtain a two-frame delayed signal d4f. In this case, since moving block coefficients are obtained over a two-frame interval and since both one-frame and two-frame differences are obtained, high-speed image motion can be detected and thus not misidentified as non-motion, and the results of this more accurate motion detection can be used to perform noise reduction by a motion adaptive process in which the noise reduction effect is controlled by the motion detection result.

Although the video signal processing device in the fourth embodiment was described as receiving an interlaced input video signal, if the input video signal is a progressive signal, the motion detection and noise reduction processes can be performed with substantially the same configuration. When a progressive signal is input, the out-of-phase one-field delayed signal d1f is not obtained and the frame delay unit 13 outputs only the one-frame delayed signal d2f obtained by delaying the current frame signal Di0 by one frame, so that the motion detection device 1 is configured to perform motion detection using only in-phase frame signals.

Whereas the motion adaptive processor 4 in the fourth embodiment was provided with frame delay units 13 and 603 configured to obtain a one-frame delayed signal d2f for the motion detection device 1 and a one-frame delayed low noise signal ln2 for the motion adaptive noise reducer 610, in a variation of the fourth embodiment, the motion adaptive processor 4b has only one frame delay unit 603, which delays the noise-reduced signal Dnro by one frame to obtain a one-frame delayed low noise signal ln2 for input to the motion adaptive noise reducer 610 and by one field to obtain a one-field delayed low noise signal ln1 for input to the motion detection device 1.

The configuration of the motion adaptive noise reducer 610 in the motion adaptive processor 4 in the fourth embodiment is not limited to the configuration shown in FIG. 23, in which the coefficient generator 612 generates an IIR coefficient responsive to the motion detection signal mds generated by the motion detection device 1, so that the IIR coefficient applied to the noise component varies according to the motion detection result. In another variation of the fourth embodiment, the IIR coefficient has a fixed value, and the input video signal is mixed with the signal resulting from fixed-strength recursive noise reduction in a mixing ratio that varies responsive to the motion detection signal mds generated by the motion detection device 1. The resulting mixed signal is again a noise-reduced signal in which recursive noise reduction is controlled according to motion, so that effects similar to those of the fourth embodiment shown in FIG. 23 are obtained.

Figure 25:
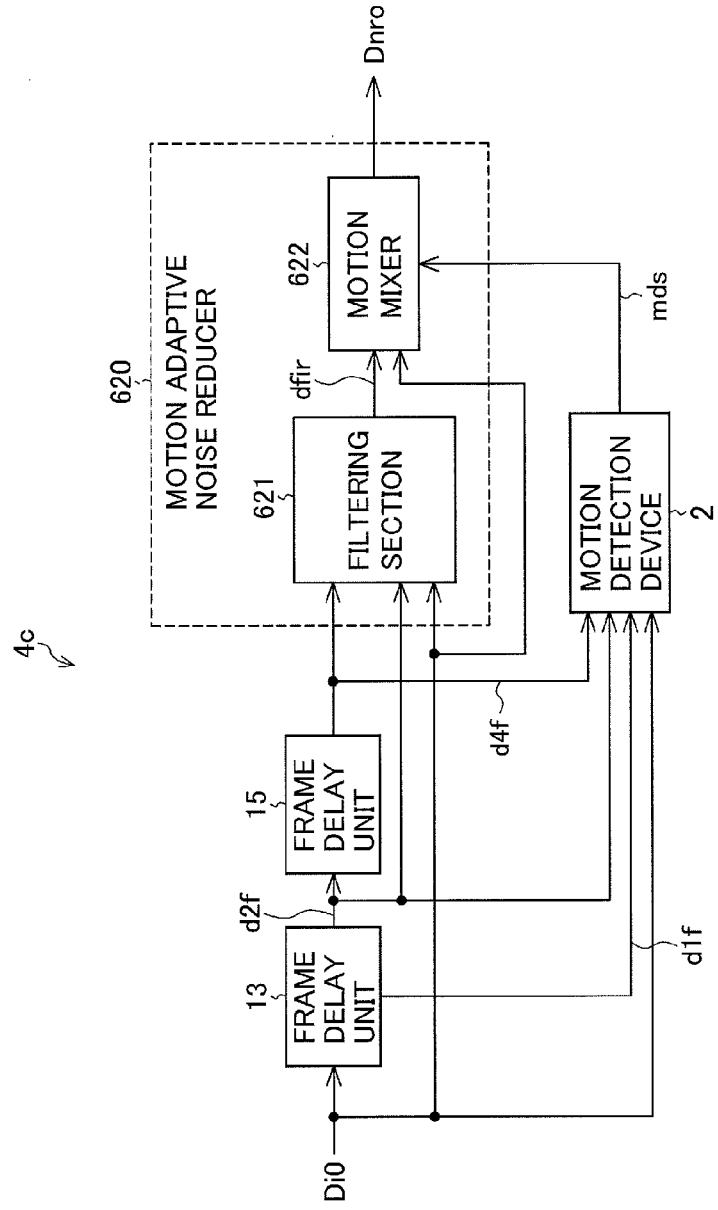

In another variation of the fourth embodiment, instead of performing recursive noise reduction as in FIG. 23, the motion detection result is applied to non-recursive or finite impulse response (FIR) noise reduction as in FIG. 25. Constituent elements of FIG. 25 that are identical to or correspond to constituent elements of FIG. 23 have the same reference characters. The motion adaptive processor 4c in FIG. 25 replaces the motion adaptive noise reducer 610 of FIG. 23 with a different motion adaptive noise reducer 620, adds a frame delay unit 15 to obtain a two-frame delayed signal d4f, and uses the motion detection device 2 of the second embodiment. The motion adaptive noise reducer 620 includes a filtering section 621 and a motion mixer 622.

The motion detection device 2 and the frame delay units 13, 15 are configured and operate as in the second embodiment, so that a description will be omitted.

The coefficient generator 612 in the motion adaptive noise reducer 620 performs noise reduction filtering on the current frame signal Di0, the one-frame delayed signal d2f, and the two-frame delayed signal d4f (by processing the three signals concurrently, for example) to obtain a filtered signal dfir. The motion mixer 622 mixes the filtered signal dfir with one of the unfiltered signals, e.g., the current frame signal Di0, in a mixing ratio responsive to the motion detection signal mds output from the motion detection device 2 to obtain the noise-reduced signal Dnro.

When the motion detection signal mds indicates motion, the motion mixer 622 uses a mixing ratio in which the current frame signal Di0 has a high proportion. When the motion detection signal mds is zero, indicating a still image or noise component, the motion mixer 622 uses a mixing ratio in which the filtered signal dfir has a high proportion.

When the value of the motion detection signal mds is intermediate between zero and the 'motion' value, the mixing ratio is varied so that the proportion of the filtered signal dfir decreases as the mds value increases.

A noise-reduced signal Dnro is thereby obtained in which FIR noise reduction has been carried out with motion taken into consideration. The same effects as in FIG. 23 are accordingly obtained.

If the coefficients used in the filtering section 621 in the motion adaptive noise reducer 620 are varied according to the motion detection signal mds output from the motion detection device 2, the motion mixer 622 may be omitted, still obtaining a noise-reduced signal Dnro in which FIR noise reduction has been carried out with motion taken into consideration.

The constituent units of the motion adaptive processors 4, 4b, 4c described above may be configured either as hardware or as software, in the form of a programmed computing device.

Fifth Embodiment

Video signal processing devices in which the video signal processing methods can be carried out have been described in the first to fourth embodiments, but the invention can also be applied in a video display device that detects motion in an input video signal, performs motion adaptive processing, and generates a high-quality display. The video display device described in the fifth embodiment below processes a TV broadcast signal or a video signal input from a recording and reproduction device such as a DVD or VTR or a TV broadcast receiver etc. and displays the video signal using the motion adaptive processor 3 or 4 of the video signal processing device in the third or fourth embodiment.

Figure 26:
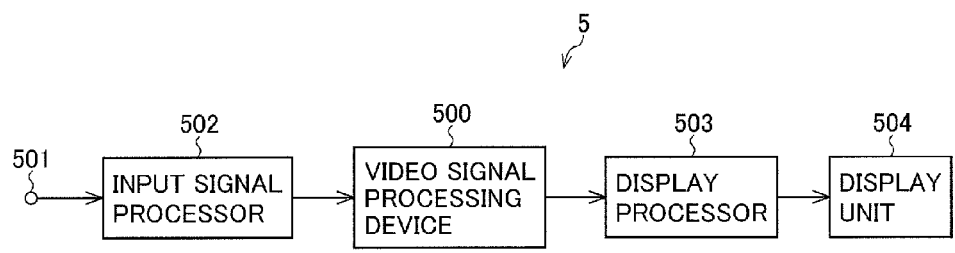
FIG. 26 is a block diagram showing an exemplary configuration of a video display device in a fifth embodiment of the invention.

FIG. 26 is a block diagram showing an exemplary configuration of the video display device in the fifth embodiment of the invention. The illustrated video display device 5 has a video signal processing device 500 configured in the same way as the motion adaptive processor 3 in the third embodiment (or the motion adaptive processor 4 in the fourth embodiment). The video display device 5 is also provided with an input terminal 501, an input signal processor 502, a display processor 503, and a display unit 504, enabling it to display a video signal by motion adaptive processing. Aside from these additional parts 501, 502, 503, 504, the video display device 5 is configured and operates as in the first to fourth embodiments; a detailed description will be omitted.

The TV broadcast signal or the video signal from a recording, reproducing, or receiving device such as a video tape recorder (VTR), a digital versatile disc (DVD) player, or a TV broadcast receiver is input at the input terminal 501. The signal input at the input terminal 501 is sent to the input signal processor 502.

The input signal processor 502 processes of the TV broadcast signal or video signal from the recording, reproducing, or receiving device (VTR, DVD player, TV broadcast receiver, etc.) by, for example, converting the signal to a digital signal, if an analog signal is input, separating synchronizing signals, decoding MPEG data when MPEG data are received, and so on. After this input signal processing, the video signal is sent to the video signal processing device 500.

The video signal resulting from the input signal processing may be either an interlaced signal or a progressive signal.

Besides frame-delaying the video signal from the input signal processor 502 and performing motion detection by use of frame differences, the video signal processing device 500 carries out motion adaptive noise reduction processing process and/or motion adaptive scanning line interpolation processing. When the input signal is interlaced, the video signal processing device 500 carries out three dimensional noise reduction and IP conversion, using the motion detection results in both processes. Alternatively, only IP conversion may be carried out. When the input signal is progressive, only noise reduction processing is carried out. The operation of the video signal processing device 500 in motion detection, motion adaptive noise reduction, and motion adaptive IP conversion are as described in the first to fourth embodiments; details will be omitted.

After motion adaptive processing in the video signal processing device 500, the video signal is input to the display processor 503. The display processor 503 carries out the signal processing necessary for conversion to a picture signal, such as scaling, conversion of the gradation scale of the video signal by a gray scale correction process, etc., and outputs the result for display by the display unit 504.

The display unit 504 displays a video picture based on the picture signal from the display processor 503.

Since, as described above, the video display device in the fifth embodiment uses the video signal processing devices and video signal processing methods of the first to fourth embodiments, even in pictures with small amounts of motion or noise, it does not mistake still parts of the picture for moving parts or moving parts for still parts, so that its motion detection is highly accurate, motion is not missed, and a video picture of high quality can be displayed, based on a video signal with less picture quality degradation than before due to problems such as flicker, blur, combing, and jitter arising from motion adaptive processing.

Several variations of the preceding embodiments have been described above, but those skilled in the art will recognize that further variations are possible within the scope of the invention, which is defined in the appended claims.

What is claimed is:

1. A motion detection device for detecting motion in a video signal including temporally differing first and second frames, the motion detection device comprising:
    a pattern matching detector that calculates pattern similarity between a pixel block in the first frame and a pixel block in the second frame and generates a moving block coefficient indicating movement within a range centered on a pixel of interest at which motion is to be detected, based on the similarity, the pixel block in the first frame being centered on the pixel of interest, the pixel block in the second frame being positioned at a pixel position corresponding to the pixel of interest;
    an edge detector that detects edges in a vicinity of the pixel of interest from the video signal in the first and second frames and generates a horizontal edge decision coefficient indicating a degree of horizontal edge presence, and a vertical edge decision coefficient indicating a degree of vertical edge presence, as edge decision coefficients indicating the edge direction and the degree of edge presence;
    a frame difference detector that selects, based on the movement within the range centered on the pixel of interest indicated by the moving block coefficient generated by the pattern matching detector and the edge direction and the degree of edge presence indicated by the horizontal edge decision coefficient and the vertical edge decision coefficient, generated by the edge detector, an extent of horizontally aligned pixels centered on the pixel of interest or an extent of vertically aligned pixels centered on the pixel of interest, performs a smoothing process and a frame-to-frame difference calculation within the selected extent, thereby generating a frame difference signal for the pixel of interest; and
    a motion information corrector that generates motion information for the pixel of interest from the frame difference signal generated by the frame difference detector;
    wherein the pattern matching detector comprises:
    a block matching operation unit that takes absolute differences between pixel values of pixels in corresponding positions in the pixel block in the first frame and the pixel block in the second frame, calculates a sum of the absolute differences at all pixel positions in the first and second blocks, and generates a value based on the sum of the absolute differences as a value of the similarity;
    a moving block coefficient conversion unit that obtains the moving block coefficient by converting the value of the similarity generated by the block matching operation unit;
    a matching vertical high frequency component generator that generates a matching vertical high frequency component by dividing the pixel block vertically into a plurality of sub-blocks, taking a sub-block sum of the absolute differences in each sub-block, and taking differences between the sub-block sums of vertically adjacent sub-blocks; and a matching horizontal high frequency component generator that generates a matching horizontal high frequency component by dividing the pixel block horizontally into a plurality of sub-blocks, taking a sub-block sum of the absolute differences in each sub-block, and taking differences between the sub-block sums of horizontally adjacent sub-blocks;

wherein the moving block coefficient conversion unit converts the value of the similarity generated by the block matching operation unit to generate the moving block coefficient according to values of the matching vertical high frequency component generated by the matching vertical high frequency component generator or the matching horizontal high frequency component generated by the matching horizontal high frequency component generator.

2. The motion detection device of claim 1, wherein the edge detector comprises:

a vertical edge detection section that extracts a vertical high frequency component in the vicinity of the pixel of interest in the first frame, extracts a vertical high frequency component in a vicinity of the pixel position in the second frame corresponding to the pixel of interest, and generates the vertical edge decision coefficient from the extracted vertical high frequency components; and a horizontal edge detection section that extracts a horizontal high frequency component in the vicinity of the pixel of interest in the first frame, extracts a horizontal high frequency component in the vicinity of the pixel position in the second frame corresponding to the pixel of interest, and generates the horizontal edge decision coefficient from the extracted horizontal high frequency components.

3. The motion detection device of claim 1, wherein the frame difference detector comprises:

a subtractor that obtains a difference between the signal of the pixel of interest in the first frame and the signal of the pixel at the same position as the pixel of interest in the second frame;

a first smoothing processor that smoothes the difference obtained by the subtractor in a first direction, the first direction being one of a horizontal direction and a vertical direction;

a first mixer that mixes the signal smoothed by the first smoothing processor and the difference obtained by the subtractor in a ratio responsive to at least one of the coefficients generated by the pattern matching detector and the edge detector;

a second smoothing processor that smoothes the output of the first mixer in a second direction, the second direction being another one of the horizontal direction and the vertical direction; and a second mixer that mixes the signal smoothed by the second smoothing processor and the output of the first mixer in a ratio responsive to at least one of the coefficients generated by the pattern matching detector and the edge detector;

the frame difference signal being generated from the output of the second mixer.

4. The motion detection device of claim 1, wherein the frame difference detector comprises:

a first smoothing processor that smoothes the signal of the pixel of interest in the first frame in a first direction, the first direction being one of a horizontal direction and a vertical direction;

a first mixer that mixes the signal smoothed by the first smoothing processor and the signal of the pixel of interest in the first frame in a ratio responsive to at least one of the coefficients generated by the pattern matching detector and the edge detector;

a second smoothing processor that smoothes the output of the first mixer in a second direction, the second direction being another one of the horizontal direction and the vertical direction;

a second mixer that mixes the signal smoothed by the second smoothing processor and the output of the first mixer in a ratio responsive to at least one of the coefficients generated by the pattern matching detector and the edge detector;

a third smoothing processor that smoothes the signal of the pixel position corresponding to the pixel of interest in the second frame in the first direction;

a third mixer that mixes the signal smoothed by the third smoothing processor and the signal of the pixel corresponding to the pixel of interest in the second frame in a ratio responsive to at least one of the coefficients generated by the pattern matching detector and the edge detector;

a fourth smoothing processor that smoothes the output of the third mixer in the second direction;

a fourth mixer that mixes the signal smoothed by the fourth smoothing processor and the output of the third mixer in a ratio responsive to at least one of the coefficients generated by the pattern matching detector and the edge detector; and a subtractor that takes a difference between the output of the second mixer and the output of the fourth mixer;

the frame difference signal being generated from the output of the subtractor.

5. The motion detection device of claim 1, wherein the motion information corrector generates the motion information of the pixel of interest by modifying the frame difference signal generated by the frame difference detector according to the moving block coefficient generated by the pattern matching detector and the horizontal edge decision coefficient and the vertical edge decision coefficient generated by the edge detector.

6. The motion detection device of claim 5, wherein the motion information corrector generates the motion information for the pixel of interest by calculating a conversion value that varies according to the moving block coefficient and the horizontal edge decision coefficient and the vertical edge decision coefficient, and modifying the frame difference signal generated by the frame difference detector by adding the conversion value to the frame difference signal or multiplying the frame difference signal by the conversion value.

7. The motion detection device of claim 6, wherein the motion information corrector comprises:

a horizontal line motion adjuster that calculates a first conversion value having a value that varies responsive to the moving block coefficient and the vertical edge decision coefficient, and adds the calculated first conversion value to the frame difference signal; and a vertical correlation adjuster that calculates a second conversion value having a value that varies responsive to the moving block coefficient, the vertical edge decision coefficient, and the horizontal edge decision coefficient, and adds the calculated second conversion value to the output of the horizontal line motion adjuster or multiplying the output of the horizontal line motion adjuster by the second conversion value;

wherein the motion information corrector outputs the output of the vertical correlation adjuster as the motion information.

8. The motion detection device of claim 1, wherein a motion detection signal is generated from the motion information.

9. A video signal processing device for performing motion adaptive scanning line interpolation based on the motion detection signal output by the motion detection device of claim 8 to convert an interlaced scanning video signal to a progressive video signal, the video signal processing device comprising:
a motion adaptive interpolator that receives the motion detection signal output from the motion detection device and generates a scanning line interpolation signal responsive to a result of motion detection for each pixel; and
a rate doubler that generates the progressive video signal based on the scanning line interpolation signal generated by the motion adaptive interpolator.

10. A video signal processing device for performing three dimensional noise reduction based on the motion detection signal output by the motion detection device of claim 8 to eliminate noise components lacking frame-to-frame correlation from the video signal, comprising a motion adaptive noise reducer that receives the motion detection signal output from the motion detection device and controls the noise reduction effect.

11. A video display device comprising:
the video signal processing device of claim 9;
a display unit that displays a video picture; and
a display processor that causes the display unit to display the video picture responsive to the video signal output by the video signal processing device.

12. A video display device comprising:
the video signal processing device of claim 10;
a display unit that displays a video picture; and
a display processor that causes the display unit to display the video picture responsive to the video signal output by the video signal processing device.

13. A motion detection method for detecting motion in a video signal including temporally differing first and second frames, the motion detection method comprising:
a pattern matching detection step for calculating pattern similarity between a pixel block in the first frame and a pixel block in the second frame and generating a moving block coefficient indicating movement within a range centered on a pixel of interest at which motion is to be detected, based on the similarity, the pixel block in the first frame being centered on the pixel of interest, the pixel block in the second frame being positioned at a pixel position corresponding to the pixel of interest;
an edge detection step for detecting edges in a vicinity of the pixel of interest from the video signal in the first and second frames and generating a horizontal edge decision coefficient indicating a degree of horizontal edge presence, and a vertical edge decision coefficient indicating a degree of vertical edge presence, as edge decision coefficients indicating the edge direction and the degree of edge presence;
a frame difference detection step for selecting, based on the movement within the range centered on the pixel of interest indicated by the moving block coefficient and the edge direction and the degree of edge presence indicated by the horizontal edge decision coefficient and the vertical edge decision coefficient generated by the edge detection step, an extent of horizontally aligned pixels centered on the pixel of interest or an extent of vertically aligned pixels centered on the pixel of interest, performing a smoothing process and a frame-to-frame difference calculation within the selected extent, thereby generating a frame difference signal for the pixel of interest; and
a motion information correction step for generating motion information for the pixel of interest from the frame difference signal generated in the frame difference detection step;

wherein the pattern matching detection step comprises:
a block matching operation step that takes absolute differences between pixel values of pixels in corresponding positions in the pixel block in the first frame and the pixel block in the second frame, calculates a sum of the absolute differences at all pixel positions in the first and second blocks, and generates a value based on the sum of the absolute differences as a value of the similarity; and
a moving block coefficient conversion step that obtains the moving block coefficient by converting the value of the similarity generated by the block matching operation step;
a matching vertical high frequency component generating step that generates a matching vertical high frequency component by dividing the pixel block vertically into a plurality of sub-blocks, taking a sub-block sum of the absolute differences in each sub-block, and taking differences between the sub-block sums of vertically adjacent sub-blocks; and
a matching horizontal high frequency component generating step that generates a matching horizontal high frequency component by dividing the pixel block horizontally into a plurality of sub-blocks, taking a sub-block sum of the absolute differences in each sub-block, and taking differences between the sub-block sums of horizontally adjacent sub-blocks;
wherein the moving block coefficient conversion step converts the value of the similarity generated by the block matching operation step to generate the moving block coefficient according to values of the matching vertical high frequency component generated by the matching vertical high frequency component generating step or the matching horizontal high frequency component generated by the matching horizontal high frequency component generating step.

* * * * *